United States Patent
Carrigan et al.

(10) Patent No.: US 12,405,717 B2
(45) Date of Patent: Sep. 2, 2025

(54) METHODS AND USER INTERFACES FOR HANDLING USER REQUESTS

(71) Applicant: Apple Inc., Cupertino, CA (US)

(72) Inventors: Taylor G. Carrigan, San Francisco, CA (US); Patrick L. Coffman, San Francisco, CA (US); Jeffrey D. Tanner, Walnut Creek, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/489,508

(22) Filed: Sep. 29, 2021

(65) Prior Publication Data

US 2022/0129144 A1 Apr. 28, 2022

Related U.S. Application Data

(60) Provisional application No. 63/105,805, filed on Oct. 26, 2020.

(51) Int. Cl.
*G06F 3/0484* (2022.01)
*G06F 3/0482* (2013.01)
*G06F 3/04847* (2022.01)

(52) U.S. Cl.
CPC ........ *G06F 3/04847* (2013.01); *G06F 3/0482* (2013.01)

(58) Field of Classification Search
CPC .... G06F 3/04883; G06F 3/0482; G06F 21/31; G06F 3/04847
See application file for complete search history.

(56) References Cited

U.S. PATENT DOCUMENTS

| | | |
|---|---|---|
| 4,803,487 A | 2/1989 | Willard et al. |
| 5,202,961 A | 4/1993 | Mills et al. |
| 5,345,552 A | 9/1994 | Brown |
| 5,745,116 A | 4/1998 | Pisutha-Arnond |
| 5,943,055 A | 8/1999 | Sylvan |
| 6,052,709 A | 4/2000 | Paul |

(Continued)

FOREIGN PATENT DOCUMENTS

| | | |
|---|---|---|
| AU | 2007100826 A4 | 9/2007 |
| AU | 2008100011 A4 | 2/2008 |

(Continued)

OTHER PUBLICATIONS

Hoffman, Chris. "How to Ungroup Notifications on iPhone or iPad" [published Sep. 17, 2018], [online], [retrieved on Oct. 10, 2022]. Retrieved from the internet <URL: https://www.howtogeek.com/366566/how-to-ungroup-notifications-on-iphone-or-ipad/ > (Year: 2018).*

(Continued)

*Primary Examiner* — Irete F Ehichioya
*Assistant Examiner* — Samuel Shen
(74) *Attorney, Agent, or Firm* — DLA Piper LLP (US)

(57) ABSTRACT

The present disclosure generally relates to methods and user interfaces for managing user requests for specific operations. In some embodiments, a computer system, after receiving a request of a first type performs a requested operation and, when notification criteria are met, initiates display of a notification on an external electronic device. In some embodiments, a computer system displays a configuration user interface that includes user-specific examples of requests and/or responses to requests.

30 Claims, 32 Drawing Sheets

(56) References Cited

U.S. PATENT DOCUMENTS

| | | |
|---|---|---|
| 6,181,837 B1 | 1/2001 | Cahill et al. |
| 6,253,075 B1 | 6/2001 | Beghtol et al. |
| 6,385,644 B1 | 5/2002 | Devine et al. |
| 6,396,513 B1 | 5/2002 | Helfman et al. |
| 6,489,977 B2 | 12/2002 | Sone et al. |
| 6,498,835 B1 | 12/2002 | Skladman et al. |
| 6,792,085 B1 | 9/2004 | Rigaldies et al. |
| 6,941,345 B1 | 9/2005 | Kapil et al. |
| 6,999,469 B1 | 2/2006 | Chu et al. |
| 7,017,119 B1 | 3/2006 | Johnston et al. |
| 7,996,045 B1 | 8/2011 | Bauer et al. |
| 8,060,571 B2 | 11/2011 | Rao |
| 8,099,669 B2 | 1/2012 | Nixon et al. |
| 8,234,395 B2 | 7/2012 | Millington |
| 8,504,114 B1 | 8/2013 | Tseng |
| 8,533,066 B2 | 9/2013 | Wei et al. |
| 8,612,294 B1 | 12/2013 | Treyz et al. |
| 8,924,735 B2 | 12/2014 | Forbes et al. |
| 8,983,539 B1 | 3/2015 | Kim et al. |
| 9,219,620 B2 | 12/2015 | Nixon |
| 9,247,363 B2 | 1/2016 | Triplett et al. |
| 9,292,310 B2 | 3/2016 | Chaudhri et al. |
| 9,405,766 B2 | 8/2016 | Robbin et al. |
| 9,407,624 B1 | 8/2016 | Myers et al. |
| 9,451,144 B2 | 9/2016 | Dye |
| 9,507,608 B2 | 11/2016 | Block et al. |
| 9,588,661 B1 | 3/2017 | Jauhal et al. |
| 9,602,545 B2 | 3/2017 | Pitre |
| 9,628,950 B1 | 4/2017 | Noeth et al. |
| 9,652,741 B2 | 5/2017 | Goldberg et al. |
| 9,710,639 B1 | 7/2017 | Saini |
| 9,721,239 B1 | 8/2017 | Ho |
| 9,727,749 B2 | 8/2017 | Tzeng et al. |
| 9,812,128 B2 | 11/2017 | Mixter et al. |
| 9,820,323 B1 | 11/2017 | Young et al. |
| 9,826,083 B2 | 11/2017 | Kanevsky et al. |
| 9,847,999 B2 | 12/2017 | Van Os et al. |
| 9,954,989 B2 | 4/2018 | Zhou |
| 10,089,983 B1 | 10/2018 | Gella et al. |
| 10,104,089 B2 | 10/2018 | Kim et al. |
| 10,129,044 B2 | 11/2018 | Kangshang et al. |
| 10,198,563 B2 | 2/2019 | Wang et al. |
| 10,284,812 B1 | 5/2019 | Van Os et al. |
| 10,304,463 B2 | 5/2019 | Mixter et al. |
| 10,374,804 B2 | 8/2019 | Lee et al. |
| 10,412,206 B1 | 9/2019 | Liang et al. |
| 10,490,195 B1 | 11/2019 | Krishnamoorthy et al. |
| 10,558,546 B2 | 2/2020 | Cranfill et al. |
| 10,567,515 B1 | 2/2020 | Bao |
| 10,581,771 B2 | 3/2020 | Rosenberg et al. |
| 10,616,726 B1 | 4/2020 | Freeman et al. |
| 10,715,604 B1 | 7/2020 | Bao |
| 10,732,819 B2 | 8/2020 | Wang et al. |
| 10,742,645 B2 | 8/2020 | Hevizi et al. |
| 10,742,648 B2 | 8/2020 | Magyar et al. |
| 10,757,531 B1 | 8/2020 | Parshin et al. |
| 10,802,843 B1 | 10/2020 | Carrigan et al. |
| 10,824,299 B2 | 11/2020 | Bai |
| 10,833,887 B2 | 11/2020 | Wu |
| 10,885,091 B1 | 1/2021 | Meng et al. |
| 11,070,644 B1 | 7/2021 | Teng et al. |
| 11,157,143 B2 | 10/2021 | Yang et al. |
| 11,200,894 B2 | 12/2021 | Smith et al. |
| 11,343,370 B1 | 5/2022 | Gordon et al. |
| 11,431,834 B1 | 8/2022 | Gordon et al. |
| 11,463,576 B1 | 10/2022 | Gordon et al. |
| 11,544,366 B2 | 1/2023 | Shinkawa et al. |
| 11,838,344 B2 | 12/2023 | Jacobson et al. |
| 2001/0030597 A1 | 10/2001 | Inoue et al. |
| 2002/0162005 A1 | 10/2002 | Ueda et al. |
| 2002/0198906 A1 | 12/2002 | Press |
| 2003/0098776 A1 | 5/2003 | Friedli |
| 2003/0128237 A1 | 7/2003 | Sakai |
| 2003/0151982 A1 | 8/2003 | Brewer et al. |
| 2003/0220835 A1 | 11/2003 | Barnes |
| 2004/0100389 A1 | 5/2004 | Naito et al. |
| 2004/0103167 A1 | 5/2004 | Grooters et al. |
| 2004/0261010 A1 | 12/2004 | Matsuishi |
| 2005/0018823 A1 | 1/2005 | Adamczyk et al. |
| 2005/0117601 A1 | 6/2005 | Anderson et al. |
| 2005/0172319 A1 | 8/2005 | Reichardt et al. |
| 2005/0233780 A1 | 10/2005 | Jani et al. |
| 2005/0268237 A1* | 12/2005 | Crane .................. H04L 51/224 715/833 |
| 2006/0099970 A1 | 5/2006 | Morgan et al. |
| 2006/0101350 A1 | 5/2006 | Scott et al. |
| 2006/0123427 A1 | 6/2006 | Harold et al. |
| 2006/0143716 A1 | 6/2006 | Ikemoto |
| 2006/0205518 A1 | 9/2006 | Malabuyo et al. |
| 2006/0224985 A1 | 10/2006 | Baek et al. |
| 2006/0229014 A1 | 10/2006 | Harada et al. |
| 2007/0157097 A1 | 7/2007 | Peters et al. |
| 2007/0259654 A1 | 11/2007 | Oijer |
| 2007/0288932 A1 | 12/2007 | Horvitz et al. |
| 2008/0004113 A1 | 1/2008 | Avery et al. |
| 2008/0032703 A1 | 2/2008 | Krumm et al. |
| 2008/0043958 A1 | 2/2008 | May et al. |
| 2008/0077673 A1 | 3/2008 | Thomas et al. |
| 2008/0081558 A1 | 4/2008 | Dunko et al. |
| 2008/0094371 A1 | 4/2008 | Forstall et al. |
| 2008/0119176 A1 | 5/2008 | Chen et al. |
| 2008/0153464 A1 | 6/2008 | Morris |
| 2008/0165136 A1 | 7/2008 | Christie et al. |
| 2008/0220752 A1 | 9/2008 | Forstall et al. |
| 2008/0301580 A1 | 12/2008 | Hjelmeland Alams et al. |
| 2009/0005011 A1 | 1/2009 | Christie et al. |
| 2009/0037093 A1 | 2/2009 | Kurihara et al. |
| 2009/0088207 A1 | 4/2009 | Sweeney et al. |
| 2009/0125571 A1 | 5/2009 | Killerich et al. |
| 2009/0133051 A1 | 5/2009 | Hildreth |
| 2009/0207743 A1 | 8/2009 | Huq et al. |
| 2009/0222748 A1 | 9/2009 | Lejeune et al. |
| 2009/0228868 A1 | 9/2009 | Forstall et al. |
| 2009/0249247 A1 | 10/2009 | Tseng et al. |
| 2009/0284476 A1 | 11/2009 | Bull et al. |
| 2009/0307715 A1 | 12/2009 | Santamaria et al. |
| 2009/0325630 A1 | 12/2009 | Tiltola et al. |
| 2009/0327151 A1 | 12/2009 | Carlson et al. |
| 2010/0017474 A1 | 1/2010 | Kandekar et al. |
| 2010/0020035 A1 | 1/2010 | Ryu et al. |
| 2010/0082374 A1 | 4/2010 | Charania et al. |
| 2010/0088140 A1 | 4/2010 | Gil et al. |
| 2010/0088692 A1 | 4/2010 | Rathi et al. |
| 2010/0103125 A1 | 4/2010 | Kim et al. |
| 2010/0123724 A1 | 5/2010 | Moore et al. |
| 2010/0144368 A1 | 6/2010 | Sullivan et al. |
| 2010/0146384 A1 | 6/2010 | Peev et al. |
| 2010/0146437 A1 | 6/2010 | Woodcock et al. |
| 2010/0149090 A1 | 6/2010 | Morris et al. |
| 2010/0159995 A1 | 6/2010 | Stallings et al. |
| 2010/0162169 A1 | 6/2010 | Skarp |
| 2010/0178873 A1 | 7/2010 | Lee et al. |
| 2010/0178956 A1 | 7/2010 | Safadi |
| 2010/0199359 A1 | 8/2010 | Miki |
| 2010/0216509 A1 | 8/2010 | Riemer et al. |
| 2010/0227600 A1 | 9/2010 | Vander Veen et al. |
| 2010/0228836 A1 | 9/2010 | Lehtovirta et al. |
| 2010/0257490 A1 | 10/2010 | Lyon et al. |
| 2010/0269040 A1 | 10/2010 | Lee |
| 2010/0281409 A1 | 11/2010 | Rainisto et al. |
| 2010/0287513 A1 | 11/2010 | Singh et al. |
| 2010/0306705 A1 | 12/2010 | Nilsson |
| 2010/0321178 A1 | 12/2010 | Deeds |
| 2011/0004845 A1 | 1/2011 | Ciabarra |
| 2011/0045813 A1 | 2/2011 | Choi |
| 2011/0047368 A1 | 2/2011 | Sundaramurthy et al. |
| 2011/0054647 A1 | 3/2011 | Chipchase |
| 2011/0059769 A1 | 3/2011 | Brunolli |
| 2011/0088003 A1 | 4/2011 | Swink et al. |
| 2011/0103598 A1 | 5/2011 | Fukui et al. |
| 2011/0106921 A1 | 5/2011 | Brown et al. |
| 2011/0111728 A1 | 5/2011 | Ferguson et al. |
| 2011/0153628 A1 | 6/2011 | Basu et al. |
| 2011/0163972 A1 | 7/2011 | Anzures et al. |

(56) References Cited

U.S. PATENT DOCUMENTS

| | | |
|---|---|---|
| 2011/0167383 A1 | 7/2011 | Schuller et al. |
| 2011/0185048 A1 | 7/2011 | Yew et al. |
| 2011/0260964 A1 | 10/2011 | Mujkic |
| 2012/0050185 A1 | 3/2012 | Davydov et al. |
| 2012/0071146 A1 | 3/2012 | Shrivastava et al. |
| 2012/0077463 A1 | 3/2012 | Robbins et al. |
| 2012/0084691 A1 | 4/2012 | Yun |
| 2012/0126974 A1 | 5/2012 | Phillips et al. |
| 2012/0129496 A1 | 5/2012 | Park et al. |
| 2012/0135726 A1 | 5/2012 | Luna et al. |
| 2012/0149342 A1 | 6/2012 | Cohen et al. |
| 2012/0192094 A1 | 7/2012 | Goertz et al. |
| 2012/0204191 A1 | 8/2012 | Shia et al. |
| 2012/0236037 A1 | 9/2012 | Lessing et al. |
| 2012/0272230 A1 | 10/2012 | Lee |
| 2012/0276878 A1 | 11/2012 | Othmer et al. |
| 2013/0076591 A1 | 3/2013 | Sirpal et al. |
| 2013/0094666 A1 | 4/2013 | Haaff et al. |
| 2013/0094770 A1 | 4/2013 | Lee et al. |
| 2013/0124207 A1 | 5/2013 | Sarin et al. |
| 2013/0125016 A1 | 5/2013 | Pallakoff et al. |
| 2013/0138334 A1 | 5/2013 | Meredith et al. |
| 2013/0141325 A1 | 6/2013 | Bailey et al. |
| 2013/0141331 A1 | 6/2013 | Shiu et al. |
| 2013/0219285 A1 | 8/2013 | Iwasaki et al. |
| 2013/0219303 A1 | 8/2013 | Eriksson et al. |
| 2013/0246275 A1 | 9/2013 | Joyce et al. |
| 2013/0268353 A1 | 10/2013 | Zeto et al. |
| 2013/0272511 A1 | 10/2013 | Mateer et al. |
| 2013/0305354 A1 | 11/2013 | King et al. |
| 2013/0316744 A1 | 11/2013 | Newham et al. |
| 2013/0325951 A1 | 12/2013 | Chakra et al. |
| 2013/0329924 A1 | 12/2013 | Fleizach et al. |
| 2013/0339436 A1 | 12/2013 | Gray |
| 2013/0346882 A1 | 12/2013 | Shiplacoff et al. |
| 2014/0006949 A1 | 1/2014 | Briand et al. |
| 2014/0047020 A1 | 2/2014 | Matus et al. |
| 2014/0118272 A1 | 5/2014 | Gunn |
| 2014/0122471 A1 | 5/2014 | Houston et al. |
| 2014/0136633 A1 | 5/2014 | Murillo et al. |
| 2014/0141721 A1 | 5/2014 | Kim et al. |
| 2014/0149859 A1 | 5/2014 | Van Dyken et al. |
| 2014/0156801 A1 | 6/2014 | Fernandes et al. |
| 2014/0160033 A1 | 6/2014 | Brikman et al. |
| 2014/0164544 A1 | 6/2014 | Gagneraud |
| 2014/0173455 A1 | 6/2014 | Shimizu et al. |
| 2014/0176298 A1 | 6/2014 | Kumar et al. |
| 2014/0181104 A1 | 6/2014 | Chin et al. |
| 2014/0181654 A1 | 6/2014 | Kumar et al. |
| 2014/0210708 A1 | 7/2014 | Simmons et al. |
| 2014/0213295 A1 | 7/2014 | Conklin |
| 2014/0228063 A1 | 8/2014 | Harris et al. |
| 2014/0237389 A1 | 8/2014 | Ryall et al. |
| 2014/0240216 A1 | 8/2014 | Bukurak et al. |
| 2014/0244714 A1 | 8/2014 | Heiby |
| 2014/0244715 A1 | 8/2014 | Hodges et al. |
| 2014/0247928 A1 | 9/2014 | Gupta et al. |
| 2014/0267002 A1 | 9/2014 | Luna |
| 2014/0273975 A1 | 9/2014 | Barat et al. |
| 2014/0282068 A1 | 9/2014 | Levkovitz et al. |
| 2014/0315163 A1 | 10/2014 | Ingrassia et al. |
| 2014/0320387 A1 | 10/2014 | Eriksson et al. |
| 2014/0333414 A1 | 11/2014 | Kursun |
| 2014/0337450 A1 | 11/2014 | Choudhary et al. |
| 2014/0337748 A1 | 11/2014 | Lee |
| 2014/0351339 A1 | 11/2014 | Kaneoka et al. |
| 2014/0351346 A1 | 11/2014 | Barton |
| 2014/0359481 A1 | 12/2014 | Graham et al. |
| 2014/0362702 A1 | 12/2014 | Luna |
| 2014/0365904 A1 | 12/2014 | Kim et al. |
| 2014/0368333 A1 | 12/2014 | Touloumtzis et al. |
| 2014/0380187 A1 | 12/2014 | Gardenfors et al. |
| 2015/0017956 A1 | 1/2015 | Jeong |
| 2015/0029089 A1 | 1/2015 | Kim |
| 2015/0033361 A1 | 1/2015 | Choi et al. |
| 2015/0035762 A1 | 2/2015 | Lu |
| 2015/0061862 A1 | 3/2015 | Shin et al. |
| 2015/0061972 A1 | 3/2015 | Kang et al. |
| 2015/0065035 A1 | 3/2015 | Son et al. |
| 2015/0067580 A1 | 3/2015 | Um et al. |
| 2015/0085057 A1 | 3/2015 | Ouyang et al. |
| 2015/0089359 A1 | 3/2015 | Brisebois |
| 2015/0094031 A1 | 4/2015 | Liu |
| 2015/0094050 A1 | 4/2015 | Bowles et al. |
| 2015/0094093 A1 | 4/2015 | Pierce et al. |
| 2015/0095979 A1 | 4/2015 | Windust |
| 2015/0113407 A1 | 4/2015 | Hoffert et al. |
| 2015/0133098 A1 | 5/2015 | Warr |
| 2015/0176998 A1* | 6/2015 | Huang ............... H04W 4/021 |
| | | 701/400 |
| 2015/0181373 A1 | 6/2015 | Xie et al. |
| 2015/0189426 A1 | 7/2015 | Pang |
| 2015/0242837 A1 | 8/2015 | Yarbrough et al. |
| 2015/0243246 A1 | 8/2015 | Mun et al. |
| 2015/0286360 A1 | 10/2015 | Wachter |
| 2015/0287403 A1 | 10/2015 | Holzer Zaslansky et al. |
| 2015/0296368 A1 | 10/2015 | Kaufman et al. |
| 2015/0317977 A1 | 11/2015 | Manjunath et al. |
| 2015/0334533 A1 | 11/2015 | Luo et al. |
| 2015/0347738 A1 | 12/2015 | Ulrich et al. |
| 2015/0350031 A1 | 12/2015 | Burks et al. |
| 2015/0350129 A1 | 12/2015 | Cary et al. |
| 2015/0350140 A1 | 12/2015 | Garcia et al. |
| 2015/0350146 A1 | 12/2015 | Cary et al. |
| 2015/0356283 A1 | 12/2015 | Kress |
| 2015/0382047 A1 | 12/2015 | Van Os et al. |
| 2016/0004417 A1 | 1/2016 | Bates |
| 2016/0026429 A1 | 1/2016 | Triplett |
| 2016/0026779 A1 | 1/2016 | Grigg et al. |
| 2016/0043905 A1 | 2/2016 | Fiedler |
| 2016/0048705 A1 | 2/2016 | Yang |
| 2016/0061613 A1 | 3/2016 | Jung et al. |
| 2016/0061623 A1 | 3/2016 | Pahwa et al. |
| 2016/0062487 A1 | 3/2016 | Foss et al. |
| 2016/0062606 A1 | 3/2016 | Vega et al. |
| 2016/0073230 A1 | 3/2016 | Rahman et al. |
| 2016/0085565 A1 | 3/2016 | Arcese et al. |
| 2016/0094678 A1 | 3/2016 | Kumar et al. |
| 2016/0112557 A1 | 4/2016 | Nixon et al. |
| 2016/0119389 A1 | 4/2016 | Gil et al. |
| 2016/0134737 A1 | 5/2016 | Pulletikurty |
| 2016/0154549 A1 | 6/2016 | Chaudhri |
| 2016/0156597 A1 | 6/2016 | Meng et al. |
| 2016/0156992 A1 | 6/2016 | Kuper |
| 2016/0157225 A1 | 6/2016 | Joshi et al. |
| 2016/0165002 A1 | 6/2016 | Lebeau et al. |
| 2016/0212138 A1 | 7/2016 | Lehane |
| 2016/0226674 A1 | 8/2016 | Kangshang et al. |
| 2016/0232638 A1 | 8/2016 | Chen |
| 2016/0241983 A1 | 8/2016 | Lambourne et al. |
| 2016/0259489 A1 | 9/2016 | Yang |
| 2016/0260414 A1 | 9/2016 | Yang |
| 2016/0269176 A1 | 9/2016 | Pang et al. |
| 2016/0299669 A1 | 10/2016 | Bates |
| 2016/0299736 A1 | 10/2016 | Bates et al. |
| 2016/0350839 A1 | 12/2016 | Avidor et al. |
| 2016/0358134 A1 | 12/2016 | Van Os et al. |
| 2016/0358162 A1 | 12/2016 | Park et al. |
| 2016/0360344 A1 | 12/2016 | Shim et al. |
| 2016/0364600 A1 | 12/2016 | Shah et al. |
| 2017/0010794 A1 | 1/2017 | Cho et al. |
| 2017/0011210 A1 | 1/2017 | Cheong et al. |
| 2017/0013562 A1 | 1/2017 | Lim et al. |
| 2017/0025124 A1 | 1/2017 | Mixter et al. |
| 2017/0060359 A1 | 3/2017 | Chaudhri et al. |
| 2017/0060402 A1 | 3/2017 | Bates |
| 2017/0061965 A1 | 3/2017 | Penilla et al. |
| 2017/0068507 A1 | 3/2017 | Kim et al. |
| 2017/0094049 A1 | 3/2017 | Kanevsky et al. |
| 2017/0115940 A1 | 4/2017 | Byeon |
| 2017/0134567 A1 | 5/2017 | Jeon et al. |
| 2017/0185375 A1 | 6/2017 | Martel et al. |
| 2017/0188065 A1 | 6/2017 | Major |
| 2017/0195772 A1 | 7/2017 | Han et al. |

(56) References Cited

U.S. PATENT DOCUMENTS

| | | |
|---|---|---|
| 2017/0242653 A1 | 8/2017 | Lang et al. |
| 2017/0242657 A1 | 8/2017 | Jarvis et al. |
| 2017/0263249 A1 | 9/2017 | Akbacak et al. |
| 2017/0280223 A1 | 9/2017 | Cavarra et al. |
| 2017/0293610 A1 | 10/2017 | Tran |
| 2017/0295476 A1 | 10/2017 | Webb |
| 2017/0331869 A1 | 11/2017 | Bendahan et al. |
| 2017/0339151 A1 | 11/2017 | Van Os et al. |
| 2017/0339272 A1 | 11/2017 | Obaidi et al. |
| 2017/0353836 A1 | 12/2017 | Gordon et al. |
| 2017/0357420 A1 | 12/2017 | Dye et al. |
| 2017/0357434 A1 | 12/2017 | Coffman et al. |
| 2017/0357439 A1 | 12/2017 | Lemay et al. |
| 2017/0357478 A1 | 12/2017 | Piersol et al. |
| 2017/0359555 A1 | 12/2017 | Irani et al. |
| 2017/0374004 A1* | 12/2017 | Holmes ............... G06F 3/04842 |
| 2018/0019973 A1 | 1/2018 | Mikhailov et al. |
| 2018/0032997 A1 | 2/2018 | Gordon et al. |
| 2018/0039916 A1 | 2/2018 | Ravindra |
| 2018/0040322 A1 | 2/2018 | Mixter et al. |
| 2018/0061421 A1 | 3/2018 | Sarikaya |
| 2018/0067528 A1 | 3/2018 | Wang et al. |
| 2018/0067712 A1 | 3/2018 | Behzadi et al. |
| 2018/0082682 A1 | 3/2018 | Erickson et al. |
| 2018/0096690 A1 | 4/2018 | Mixter et al. |
| 2018/0096696 A1 | 4/2018 | Mixter |
| 2018/0103239 A1 | 4/2018 | Siminoff et al. |
| 2018/0144590 A1 | 5/2018 | Mixter et al. |
| 2018/0182389 A1 | 6/2018 | Devaraj et al. |
| 2018/0190264 A1 | 7/2018 | Mixter et al. |
| 2018/0206122 A1 | 7/2018 | Bradley et al. |
| 2018/0213354 A1 | 7/2018 | Wang et al. |
| 2018/0218201 A1* | 8/2018 | Siminoff ............... G06V 40/172 |
| 2018/0253281 A1 | 9/2018 | Jarvis et al. |
| 2018/0268072 A1 | 9/2018 | Rathod |
| 2018/0288115 A1 | 10/2018 | Asnis et al. |
| 2018/0330589 A1 | 11/2018 | Horling |
| 2018/0335903 A1* | 11/2018 | Coffman ............ G06F 3/04847 |
| 2018/0336275 A1 | 11/2018 | Graham et al. |
| 2018/0336904 A1 | 11/2018 | Piercy et al. |
| 2018/0336905 A1 | 11/2018 | Kim et al. |
| 2018/0341448 A1 | 11/2018 | Behzadi et al. |
| 2018/0351762 A1 | 12/2018 | Iyengar et al. |
| 2019/0012069 A1 | 1/2019 | Bates |
| 2019/0012966 A1 | 1/2019 | Shi |
| 2019/0043508 A1 | 2/2019 | Sak et al. |
| 2019/0080698 A1 | 3/2019 | Miller |
| 2019/0102145 A1 | 4/2019 | Wilberding et al. |
| 2019/0124049 A1* | 4/2019 | Bradley ............... H04L 12/2809 |
| 2019/0172467 A1 | 6/2019 | Kim et al. |
| 2019/0187861 A1 | 6/2019 | Yang |
| 2019/0221227 A1 | 7/2019 | Mixter |
| 2019/0251975 A1* | 8/2019 | Choi .................. G10L 17/06 |
| 2019/0288867 A1* | 9/2019 | Mese .................. G06F 3/165 |
| 2019/0310820 A1 | 10/2019 | Bates |
| 2019/0311721 A1 | 10/2019 | Edwards |
| 2019/0318069 A1 | 10/2019 | Mitic et al. |
| 2019/0327225 A1 | 10/2019 | Wahlberg et al. |
| 2019/0332229 A1 | 10/2019 | Chaudhri et al. |
| 2019/0347181 A1 | 11/2019 | Cranfill et al. |
| 2019/0361982 A1 | 11/2019 | Jacobson et al. |
| 2019/0370781 A1 | 12/2019 | Van Os et al. |
| 2019/0370805 A1 | 12/2019 | Van Os et al. |
| 2019/0371313 A1 | 12/2019 | Naughton et al. |
| 2019/0378500 A1 | 12/2019 | Miller et al. |
| 2020/0008010 A1 | 1/2020 | Pai et al. |
| 2020/0075026 A1 | 3/2020 | Peeler et al. |
| 2020/0076939 A1* | 3/2020 | Lambourne ............. G06F 3/165 |
| 2020/0126560 A1* | 4/2020 | Ho ..................... G06F 3/167 |
| 2020/0143017 A1 | 5/2020 | Yoon et al. |
| 2020/0151601 A1 | 5/2020 | Niewczas |
| 2020/0177593 A1* | 6/2020 | Bender ................. H04L 63/101 |
| 2020/0184964 A1 | 6/2020 | Myers et al. |
| 2020/0186378 A1 | 6/2020 | Six et al. |
| 2020/0186960 A1 | 6/2020 | Nolan |
| 2020/0218486 A1 | 7/2020 | Behzadi et al. |
| 2020/0275144 A1 | 8/2020 | Major |
| 2020/0294499 A1 | 9/2020 | Deluca et al. |
| 2020/0336909 A1* | 10/2020 | Seel ..................... H04W 76/14 |
| 2020/0379711 A1 | 12/2020 | Graham et al. |
| 2020/0379714 A1 | 12/2020 | Graham et al. |
| 2020/0379729 A1 | 12/2020 | Graham et al. |
| 2020/0379730 A1 | 12/2020 | Graham et al. |
| 2020/0380436 A1 | 12/2020 | Bonomo |
| 2020/0380972 A1 | 12/2020 | Carrigan et al. |
| 2020/0380983 A1* | 12/2020 | Sundaram ............. G16Y 40/35 |
| 2020/0382513 A1 | 12/2020 | Biswas et al. |
| 2020/0382647 A1* | 12/2020 | Krochmal ......... H04M 3/42263 |
| 2020/0382908 A1 | 12/2020 | Behzadi et al. |
| 2020/0409537 A1 | 12/2020 | Story et al. |
| 2020/0410584 A1 | 12/2020 | Frost et al. |
| 2020/0412679 A1 | 12/2020 | Han et al. |
| 2021/0011586 A1 | 1/2021 | Chaudhri et al. |
| 2021/0011587 A1 | 1/2021 | Chaudhri et al. |
| 2021/0090578 A1 | 3/2021 | Trapp et al. |
| 2021/0255816 A1 | 8/2021 | Behzadi et al. |
| 2021/0255819 A1 | 8/2021 | Graham et al. |
| 2021/0266723 A1* | 8/2021 | Gray .................... H04M 3/527 |
| 2021/0312464 A1* | 10/2021 | Peng .................. G06Q 20/3674 |
| 2021/0352172 A1 | 11/2021 | Kim et al. |
| 2022/0062704 A1 | 3/2022 | D'Auria et al. |
| 2022/0078552 A1 | 3/2022 | Delhoume et al. |
| 2022/0116399 A1 | 4/2022 | Carrigan et al. |
| 2022/0172187 A1* | 6/2022 | Kanehana ............. G06Q 20/14 |
| 2022/0191162 A1* | 6/2022 | Hegarty ................ H04L 51/224 |
| 2022/0254120 A1 | 8/2022 | Berliner et al. |
| 2022/0351733 A1 | 11/2022 | Bates |
| 2022/0357964 A1 | 11/2022 | Carrigan et al. |
| 2022/0391520 A1 | 12/2022 | Ma et al. |
| 2022/0392455 A1 | 12/2022 | Ma et al. |
| 2023/0017600 A1 | 1/2023 | Story et al. |
| 2023/0017837 A1 | 1/2023 | Behzadi et al. |
| 2023/0043078 A1 | 2/2023 | Chaudhri et al. |
| 2023/0208929 A1 | 6/2023 | Cary et al. |
| 2023/0315495 A1 | 10/2023 | Carrigan et al. |
| 2023/0393809 A1 | 12/2023 | Carrigan et al. |
| 2024/0012536 A1 | 1/2024 | Chen et al. |
| 2024/0231566 A1 | 7/2024 | Chaudhri et al. |

FOREIGN PATENT DOCUMENTS

| | | |
|---|---|---|
| CN | 1429364 A | 7/2003 |
| CN | 1556955 A | 12/2004 |
| CN | 1848988 A | 10/2006 |
| CN | 1932768 A | 3/2007 |
| CN | 101068384 A | 11/2007 |
| CN | 101433034 A | 5/2009 |
| CN | 101442433 A | 5/2009 |
| CN | 101625620 A | 1/2010 |
| CN | 101835026 A | 9/2010 |
| CN | 101981987 A | 2/2011 |
| CN | 101997972 A | 3/2011 |
| CN | 102075571 A | 5/2011 |
| CN | 102075619 A | 5/2011 |
| CN | 102395128 A | 3/2012 |
| CN | 102523213 A | 6/2012 |
| CN | 102830795 A | 12/2012 |
| CN | 103260059 A | 8/2013 |
| CN | 103778082 A | 5/2014 |
| CN | 103839023 A | 6/2014 |
| CN | 203930358 U | 11/2014 |
| CN | 104205785 A | 12/2014 |
| CN | 104272854 A | 1/2015 |
| CN | 104281430 A | 1/2015 |
| CN | 104346297 A | 2/2015 |
| CN | 104503688 A | 4/2015 |
| CN | 106170783 A | 11/2016 |
| CN | 106254625 A | 12/2016 |
| CN | 106415630 A | 2/2017 |
| CN | 106416142 A | 2/2017 |
| CN | 107210033 A | 9/2017 |
| CN | 107250949 A | 10/2017 |
| CN | 104012150 B | 5/2018 |
| CN | 108292203 A | 7/2018 |

(56) References Cited

FOREIGN PATENT DOCUMENTS

| | | |
|---|---|---|
| CN | 108304106 A | 7/2018 |
| CN | 108604180 A | 9/2018 |
| CN | 108924038 A | 11/2018 |
| CN | 109219793 A | 1/2019 |
| CN | 109302531 A | 2/2019 |
| CN | 109314795 A | 2/2019 |
| CN | 109688442 A | 4/2019 |
| EP | 1406176 A1 | 4/2004 |
| EP | 1662760 A1 | 5/2006 |
| EP | 1708464 A2 | 10/2006 |
| EP | 1858238 A2 | 11/2007 |
| EP | 2063674 A1 | 5/2009 |
| EP | 2219105 A1 | 8/2010 |
| EP | 2306262 A1 | 4/2011 |
| EP | 2428947 A2 | 3/2012 |
| EP | 2632131 A1 | 8/2013 |
| EP | 2650808 A1 | 10/2013 |
| EP | 2720442 A1 | 4/2014 |
| EP | 3163495 A1 | 5/2017 |
| EP | 3420441 A1 | 1/2019 |
| FR | 3069679 A1 | 2/2019 |
| GB | 2341698 A | 3/2000 |
| JP | 6-202842 A | 7/1994 |
| JP | 2001-309455 A | 11/2001 |
| JP | 2003-169372 A | 6/2003 |
| JP | 2006-171799 A | 6/2006 |
| JP | 2006-172464 A | 6/2006 |
| JP | 2006-185154 A | 7/2006 |
| JP | 2006-235957 A | 9/2006 |
| JP | 2006-288027 A | 10/2006 |
| JP | 2007-3293 A | 1/2007 |
| JP | 2007-304983 A | 11/2007 |
| JP | 2007-334301 A | 12/2007 |
| JP | 2008-104068 A | 5/2008 |
| JP | 2008-522262 A | 6/2008 |
| JP | 2009-502048 A | 1/2009 |
| JP | 2009-521753 A | 6/2009 |
| JP | 2009-164794 A | 7/2009 |
| JP | 2010-503127 A | 1/2010 |
| JP | 2011-43401 A | 3/2011 |
| JP | 2011-60281 A | 3/2011 |
| JP | 2011-101097 A | 5/2011 |
| JP | 2011-516936 A | 5/2011 |
| JP | 2012-511282 A | 5/2012 |
| JP | 2012-248090 A | 12/2012 |
| JP | 2014-502454 A | 1/2014 |
| JP | 2014-53692 A | 3/2014 |
| JP | 2014-123169 A | 7/2014 |
| JP | 2015-171114 A | 9/2015 |
| JP | 2015-533441 A | 11/2015 |
| JP | 2016-40716 A | 3/2016 |
| JP | 2018-506769 A | 3/2018 |
| JP | 2019-62374 A | 4/2019 |
| KR | 2003-0097321 A | 12/2003 |
| KR | 10-2006-0105441 A | 10/2006 |
| KR | 10-2010-0036351 A | 4/2010 |
| KR | 10-2015-0031010 A | 3/2015 |
| KR | 10-2015-0121177 A | 10/2015 |
| KR | 10-2016-0012008 A | 2/2016 |
| KR | 10-2016-0141847 A | 12/2016 |
| KR | 10-2017-0027999 A | 3/2017 |
| KR | 10-2011177 B1 | 8/2019 |
| KR | 10-2022-0004223 A | 1/2022 |
| TW | 201012152 A | 3/2010 |
| TW | 201215086 A | 4/2012 |
| TW | M474482 U | 3/2014 |
| TW | 201509168 A | 3/2015 |
| WO | 2007/008321 A2 | 1/2007 |
| WO | 2007/076210 A1 | 7/2007 |
| WO | 2008/030976 A2 | 3/2008 |
| WO | 2009/005563 A1 | 1/2009 |
| WO | 2009/010827 A2 | 1/2009 |
| WO | 2009/097555 A2 | 8/2009 |
| WO | 2009/137419 A2 | 11/2009 |
| WO | 2009/140095 A2 | 11/2009 |
| WO | 2010/065752 A2 | 6/2010 |
| WO | 2011/063516 A1 | 6/2011 |
| WO | 2012/170446 A2 | 12/2012 |
| WO | 2012/172970 A1 | 12/2012 |
| WO | 2013/169875 A2 | 11/2013 |
| WO | 2014/151089 A1 | 9/2014 |
| WO | 2015/034163 A1 | 3/2015 |
| WO | 2016/057117 A1 | 4/2016 |
| WO | 2016/122902 A2 | 8/2016 |
| WO | 2017/173155 A1 | 10/2017 |
| WO | 2017/197184 A1 | 11/2017 |
| WO | 2017/218192 A1 | 12/2017 |
| WO | 2017/218199 A1 | 12/2017 |
| WO | 2018/025030 A2 | 2/2018 |
| WO | 2018/067531 A1 | 4/2018 |
| WO | 2018/085671 A1 | 5/2018 |
| WO | 2018/089700 A1 | 5/2018 |
| WO | 2018/213401 A1 | 11/2018 |
| WO | 2018/213415 A1 | 11/2018 |
| WO | 2020/076365 A1 | 4/2020 |
| WO | 2020/242577 A1 | 12/2020 |

OTHER PUBLICATIONS

Advisory Action received for U.S. Appl. No. 14/475,446, mailed on Sep. 20, 2019, 12 pages.
Advisory Action received for U.S. Appl. No. 15/348,204, mailed on Feb. 4, 2019, 4 pages.
Advisory Action received for U.S. Appl. No. 16/583,989, mailed on Sep. 22, 2020, 5 pages.
Advisory Action received for U.S. Appl. No. 16/584,347, mailed on Aug. 28, 2020, 2 pages.
Akshay, "Control your SmartThings compatible devices on the Gear S2 and S3 with the Smarter Things app", Online available at: https://iotgadgets.com/2017/09/control-smartthings-compatible-devices-gear-s2-s3-smarter-things-app/, Sep. 7, 2017, 4 pages.
Applicant Initiated Interview Summary received for U.S. Appl. No. 14/475,471, mailed on Mar. 18, 2020, 5 pages.
Applicant Initiated Interview Summary received for U.S. Appl. No. 14/475,471, mailed on Oct. 28, 2019, 5 pages.
Applicant Initiated Interview Summary received for U.S. Appl. No. 16/507,664, mailed Aug. 26, 2020, 5 pages.
Applicant Initiated Interview Summary received for U.S. Appl. No. 16/583,989, mailed on Aug. 3, 2020, 6 pages.
Applicant Initiated Interview Summary received for U.S. Appl. No. 16/583,989, mailed on Mar. 25, 2020, 4 pages.
Applicant Initiated Interview Summary received for U.S. Appl. No. 16/584,490, mailed on Jul. 28, 2020, 4 pages.
Applicant Initiated Interview Summary received for U.S. Appl. No. 16/669,187, mailed on Jul. 2, 2021, 3 pages.
Applicant-Initiated Interview Summary received for U.S. Appl. No. 14/475,446, mailed on May 3, 2021, 3 pages.
Applicant-Initiated Interview Summary received for U.S. Appl. No. 16/281,838, maiied on Jun. 2, 2020, 5 pages.
Applicant-Initiated Interview Summary received for U.S. Appl. No. 16/584,321, maiied on Apr. 8, 2020, 5 pages.
Applicant-Initiated Interview Summary received for U.S. Appl. No. 16/584,347, mailed on Sep. 1, 2020, 3 pages.
Applicant-Initiated Interview Summary received for U.S. Appl. No. 16/584,490, mailed on Jan. 31, 2020, 4 pages.
Applicant-Initiated Interview Summary received for U.S. Appl. No. 16/669,187, maiied on Nov. 23, 2020, 3 pages.
Applicant-Initiated Interview Summary received for U.S. Appl. No. 16/922,675, mailed on Dec. 16, 2020, 3 pages.
Applicant-Initiated Interview Summary received for U.S. Appl. No. 16/922,675, mailed on Nov. 2, 2020, 3 pages.
Applicant-Initiated Interview Summary received for U.S. Appl. No. 16/922,675, mailed on Sep. 3, 2021, 2 pages.
Chenzai, "Apple, please don't screw up notifications on the Apple Watch", Available online at: https://digi.tech.qq.com/a/20140918/060747.htm. also published on the English webpage https://www.theverge.com/2014/9/9/6127913/apple-please-dont-screw-up-notifications-on-the-apple-watch, Sep. 18, 2014, 8 pages (4 pages of English Translation and 4 pages of Official Copy).

(56) References Cited

OTHER PUBLICATIONS

Corrected Notice of Allowance received for U.S. Appl. No. 14/839,897, mailed on Jan. 23, 2019, 6 pages.
Corrected Notice of Allowance received for U.S. Appl. No. 14/839,903, mailed on Feb. 13, 2019, 2 pages.
Corrected Notice of Allowance received for U.S. Appl. No. 14/839,903, mailed on Mar. 1, 2019, 2 pages.
Corrected Notice of Allowance received for U.S. Appl. No. 15/005,945, mailed on Oct. 18, 2016, 6 pages.
Corrected Notice of Allowance received for U.S. Appl. No. 15/348,204, mailed on Apr. 11, 2019, 8 pages.
Corrected Notice of Allowance received for U.S. Appl. No. 15/348,204, mailed on May 31, 2019, 8 pages.
Corrected Notice of Allowance received for U.S. Appl. No. 16/281,838, mailed on Oct. 30, 2020, 2 pages.
Corrected Notice of Allowance received for U.S. Appl. No. 16/507,664, mailed on Nov. 27, 2020, 7 pages.
Corrected Notice of Allowance received for U.S. Appl. No. 16/584,347, mailed on Nov. 9, 2020, 2 pages.
Corrected Notice of Allowance received for U.S. Appl. No. 16/584,347, mailed on Sep. 23, 2020, 5 pages.
"Customize Notifications and Content on Your Galaxy Phone's Lock Screen", Online Available at: https://www.samsung.com/us/support/answer/ANS00062636, Oct. 4, 2017, 5 pages.
Decision to Grant received for European Patent Application No. 12727053.6, mailed on Aug. 27, 2020, 2 pages.
Decision to Grant received for European Patent Application No. 15787091.6, mailed on Dec. 3, 2020, 2 pages.
Decision to Grant received for Japanese Patent Application No. 2014-513804, mailed on Jul. 31, 2015, 6 pages (3 pages of English Translation and 3 pages of Official Copy).
"Dell Streak Softbank001DL Manua"l, Softbank Corp., vol. 2, Mar. 2011, 28 pages (Official Copy Only). {See Communication under 37 CFR § 1.98(a) (3)}.
European Search Report received for European Patent Application No. 20192404.0, mailed on Nov. 20, 2020, 4 pages.
Examiner's Answer to Appeal Brief received for U.S. Appl. No. 14/475,471, mailed on Apr. 23, 2021, 12 pages.
Extended European Search Report received for European Patent Application No. 20195339.5, mailed on Dec. 11, 2020, 7 pages.
Final Office Action received for U.S. Appl. No. 09/735,499, mailed on Dec. 9, 2010, 13 pages.
Final Office Action received for U.S. Appl. No. 09/735,499, mailed on Dec. 18, 2003, 12 pages.
Final Office Action received for U.S. Appl. No. 09/735,499, mailed on May 17, 2005, 12 pages.
Final Office Action received for U.S. Appl. No. 13/312,618, mailed on Dec. 12, 2014, 13 pages.
Final Office Action received for U.S. Appl. No. 13/489,415, mailed on Jun. 11, 2014, 34 pages.
Final Office Action received for U.S. Appl. No. 14/475,446, mailed on Apr. 18, 2019, 28 pages.
Final Office Action received for U.S. Appl. No. 14/475,446, mailed on Jul. 14, 2017, 20 pages.
Final Office Action received for U.S. Appl. No. 14/475,446, mailed on Jun. 11, 2021, 23 pages.
Final Office Action received for U.S. Appl. No. 14/475,471, mailed on Jul. 11, 2019, 18 pages.
Final Office Action received for U.S. Appl. No. 14/475,471, mailed on Jun. 28, 2017, 16 pages.
Final Office Action received for U.S. Appl. No. 14/475,471, mailed on May 15, 2020, 19 pages.
Final Office Action received for U.S. Appl. No. 14/839,897, mailed on Jan. 10, 2018, 16 pages.
Final Office Action received for U.S. Appl. No. 14/977,219, mailed on Dec. 13, 2018, 9 pages.
Final Office Action received for U.S. Appl. No. 15/348,204, mailed on Oct. 13, 2017, 26 pages.
Final Office Action received for U.S. Appl. No. 15/348,204, mailed on Sep. 13, 2018, 29 pages.
Final Office Action received for U.S. Appl. No. 16/583,989, mailed on Jul. 10, 2020, 23 pages.
Final Office Action received for U.S. Appl. No. 16/584,321, mailed on May 22, 2020, 12 pages.
Final Office Action received for U.S. Appl. No. 16/584,347, mailed on Jun. 10, 2020, 20 pages.
Final Office Action received for U.S. Appl. No. 16/584,490, mailed on May 1, 2020, 48 pages.
Final Office Action received for U.S. Appl. No. 16/669,187, mailed on Mar. 31, 2021, 46 pages.
Final Office Action received for U.S. Appl. No. 16/922,675, mailed on Dec. 3, 2020, 21 pages.
Final Office Action received for U.S. Appl. No. 16/922,675, mailed on Nov. 30, 2020, 12 pages.
Final Office Action received for U.S. Appl. No. 14/839,903, mailed on Sep. 18, 2018, 11 pages.
Gookin, Dan, "Lock Screen Settings on Your Android Phone", Online Available at: https://www.dummies.com/consumer-electronics/smartphones/droid/lock-screen-settings-on-your-android-phone/, Sep. 23, 2015, 6 pages.
Intention to Grant received for Danish Patent Application No. PA201570773, mailed on Mar. 9, 2018, 2 pages.
Intention to Grant received for European Patent Application No. 15787091.6, mailed on Apr. 23, 2020, 7 pages.
Intention to Grant received for European Patent Application No. 15787091.6, mailed on Sep. 30, 2020, 7 pages.
Intention to Grant received for European Patent Application No. 12727053.6, mailed on Aug. 4, 2020, 8 pages.
Intention to Grant Received for European Patent Application No. 12727053.6, mailed on Mar. 6, 2020, 8 pages.
International Preliminary Report on Patentability received for PCT Patent Application No. PCT/US2012/040962, issued on Dec. 10, 2013, 11 pages.
International Preliminary Report on Patentability received for PCT Patent Application No. PCT/US2015/030591, mailed on Dec. 8, 2016, 10 pages.
International Preliminary Report on Patentability received for PCT Patent Application No. PCT/US2015/055165, mailed on Sep. 21, 2017, 15 pages.
International Search Report and Written Opinion received for PCT Application No. PCT/US2015/030591, mailed on Jul. 21, 2015, 11 pages.
International Search Report and Written Opinion received for PCT Patent Application No. PCT/US2012/040962, Jan. 3, 2013, 15 pages.
International Search Report and Written Opinion received for PCT Patent Application No. PCT/US2015/055165, mailed on Apr. 20, 2016, 22 pages.
International Search Report and Written Opinion received for PCT Patent Application No. PCT/US2020/025526, mailed on Aug. 11, 2020, 18 pages.
International Search Report and Written Opinion received for PCT Patent Application No. PCT/US2020/034155, mailed on Sep. 17, 2020, 19 pages.
International Search Report and Written Opinion received for PCT Patent Application No. PCT/US2020/035488, mailed on Nov. 17, 2020, 21 pages.
International Search Report and Written Opinion received for PCT Patent Application No. PCT/US2020/052041, mailed on Feb. 8, 2021, 18 pages.
Invitation to Pay Additional Fees received for PCT Patent Application No. PCT/US2015/055165, mailed on Jan. 18, 2016, 6 pages.
Invitation to Pay Additional Fees received for PCT Patent Application No. PCT/US2020/025526, mailed on Jun. 15, 2020, 12 pages.
Invitation to Pay Additional Fees received for PCT Patent Application No. PCT/US2020/034155, mailed on Jul. 27, 2020, 12 pages.
Invitation to Pay Additional Fees received for PCT Patent Application No. PCT/US2020/035488, mailed on Sep. 23, 2020, 15 pages.

(56) References Cited

OTHER PUBLICATIONS

Kern et al., "Context-Aware Notification for Wearable Computing", Perceptual Computing and Computer Vision, Proceedings of the Seventh IEEE International Symposium on Wearable Computers, 2003, 8 pages.
Locklear, Mallory, "Samsung to bring SmartThings control to its Gear smartwatches", Online available at: https://www.engadget.com/2018-01-08-samsung-smartthings-app-gear-smartwatches.html, Jan. 8, 2018, 12 pages.
Low, Cherlynn, "So you bought a smartwatch. Now what?", Online available at: https://www.engadget.com/2018-02-06-how-to-set-up-your-smartwatch.html, Feb. 6, 2018, 19 pages.
Miller, Eric, "Background Polling", Microsoft Outlook Express, Jul. 30, 1998, 1 page.
Non-Final Office Action received for U.S. Appl. No. 14/977,219, mailed on Apr. 6, 2018, 6 pages.
Non-Final Office Action received for U.S. Appl. No. 16/507,664, mailed on May 11, 2020, 16 pages.
Office Action received for U.S. Appl. No. 09/735,499, mailed on Jul. 21, 2004, 11 pages.
Non-Final Office Action received for U.S. Appl. No. 09/735,499, mailed on Jun. 21, 2010, 11 pages.
Non-Final Office Action received for U.S. Appl. No. 09/735,499, mailed on May 22, 2003, 12 pages.
Non-Final Office Action received for U.S. Appl. No. 09/735,499, mailed on Nov. 16, 2007, 11 pages.
Non-Final Office Action received for U.S. Appl. No. 13/489,415, mailed on Dec. 5, 2013, Dec. 5, 2013, 25 pages.
Non-Final Office Action received for U.S. Appl. No. 13/489,415, mailed on Feb. 11, 2015, 30 pages.
Non-Final Office Action received for U.S. Appl. No. 14/475,446, mailed on Jun. 28, 2018, 21 pages.
Office Action received for U.S. Appl. No. 14/475,446, mailed on Mar. 9, 2021, 22 pages.
Office Action received for U.S. Appl. No. 14/475,446, mailed on Mar. 18, 2020, 20 pages.
Office Action received for U.S. Appl. No. 14/475,446, mailed on Nov. 18, 2016, 24 pages.
Office Action received for U.S. Appl. No. 14/475,471, mailed on Dec. 19, 2019, 20 pages.
Office Action received for U.S. Appl. No. 14/475,471, mailed on Nov. 18, 2016, 19 pages.
Office Action received for U.S. Appl. No. 14/475,471, mailed on Sep. 18, 2018, 25 pages.
Office Action received for U.S. Appl. No. 14/839,897, mailed on May 18, 2017, 11 pages.
Office Action received for U.S. Appl. No. 14/839,903, mailed on Feb. 26, 2018, 10 pages.
Office Action received for U.S. Appl. No. 14/977,219, mailed on Feb. 7, 2020, 10 pages.
Office Action received for U.S. Appl. No. 14/977,219, mailed on Sep. 6, 2019, 8 pages.
Office Action received for U.S. Appl. No. 15/005,945, mailed on May 17, 2016, 9 pages.
Office Action received for U.S. Appl. No. 15/348,204, mailed on Apr. 28, 2017, 22 pages.
Non-Final Office Action received for U.S. Appl. No. 15/348,204, mailed on Feb. 20, 2018, 28 pages.
Non-Final Office Action received for U.S. Appl. No. 16/281,838, mailed on Mar. 26, 2020, 18 pages.
Non-Final Office Action received for U.S. Appl. No. 16/583,989, mailed on Jan. 24, 2020, 20 pages.
Non-Final Office Action received for U.S. Appl. No. 16/584,321, mailed on Jan. 7, 2020, 19 pages.
Non-Final Office Action received for U.S. Appl. No. 16/584,347, mailed on Dec. 20, 2019, 16 pages.
Non-Final Office Action received for U.S. Appl. No. 16/584,490, mailed on Dec. 10, 2019, 27 pages.
Non-Final Office Action received for U.S. Appl. No. 16/669,187, mailed on Sep. 25, 2020, 40 pages.
Non-Final Office Action received for U.S. Appl. No. 16/922,675, mailed on Aug. 13, 2020, 17 pages.
Non-Final Office Action received for U.S. Appl. No. 16/922,675, mailed on May 4, 2021, 23 pages.
Non-Final Office Action received for U.S. Appl. No. 17/031,700, mailed on May 11, 2021, 10 pages.
Non-Final Office Action received for U.S. Appl. No. 17/031,702, mailed on Apr. 26, 2021, 13 pages.
Non-Final Office Action received for U.S. Appl. No. 17/062,891, mailed on Jul. 13, 2021, 12 pages.
Non-Final Office Action received for U.S. Appl. No. 13/312,618, mailed on Jun. 11, 2014, 11 pages.
Notice of Acceptance received for Australian Patent Application No. 2012268312, mailed on Feb. 3, 2016, 2 pages.
Notice of Acceptance received for Australian Patent Application No. 2015385757, mailed on Jul. 16, 2018, 3 pages.
Notice of Acceptance received for Australian Patent Application No. 2016203250, mailed on Mar. 15, 2018, 3 pages.
Notice of Acceptance received for Australian Patent Application No. 2018204028, mailed on Jun. 12, 2019, 3 pages.
Notice of Acceptance received for Australian Patent Application No. 2018247345, mailed on May 15, 2019, 3 pages.
Notice of Acceptance received for Australian Patent Application No. 2020200028, mailed on Nov. 10, 2020, 3 pages.
Notice of Allowance received for Chinese Patent Application No. 2012800272819, mailed on Jun. 13, 2017, 4 pages (2 pages of English Translation and 2 pages of Official Copy).
Notice of Allowance received for Chinese Patent Application No. 201580028073.4, mailed on Oct. 22, 2019, 2 pages (1 page of English Translation and 1 page of Official Copy).
Notice of Allowance received for Chinese Patent Application No. 201580077218.X, mailed on Nov. 13, 2020, 2 pages (1 page of English Translation and 1 page of Official Copy).
Notice of Allowance received for Chinese Patent Application No. 201710734839.1, mailed on Dec. 4, 2020, 3 pages (1 page of English Translation and 2 pages of Official Copy).
Notice of Allowance received for Chinese Patent Application No. 201810321928.8, mailed on Sep. 11, 2019, 2 pages (1 page of English Translation and 1 page of Official Copy).
Notice of Allowance received for Danish Patent Application No. PA201570771, mailed on Sep. 2, 2016, 2 pages.
Notice of Allowance received for Danish Patent Application No. PA201570773, mailed on Apr. 26, 2018, 2 pages.
Notice of Allowance received for Japanese Patent Application No. 2015-171114, mailed on Mar. 1, 2019, 3 pages (1 page of English Translation and 2 pages of Official Copy).
Notice of Allowance received for Japanese Patent Application No. 2017-545733, mailed on Jun. 1, 2018, 4 pages (1 page of English Translation and 3 pages of Official Copy).
Notice of Allowance received for Japanese Patent Application No. 2018-071908, mailed on Nov. 25, 2019, 8 pages (5 pages of English Translation and 3 pages of Official Copy).
Notice of Allowance received for Japanese Patent Application No. 2018-126311, mailed on Feb. 1, 2019, 4 pages (1 page of English Translation and 3 pages of Official Copy).
Notice of Allowance received for Korean Patent Application No. 10-2013-7034852, issued on Aug. 24, 2016, 3 pages (1 page of English Translation and 2 pages of Official Copy).
Notice of Allowance received for Korean Patent Application No. 10-2015-7007065, mailed on Aug. 28, 2019, 4 pages (2 pages of English Translation and 2 pages of Official Copy).
Notice of Allowance received for Korean Patent Application No. 1020157037047, mailed on Oct. 30, 2017, 3 pages (Official Copy Only). {See Communication under 37 CFR § 1.98(a) (3)}.
Notice of Allowance received for Taiwanese Patent Application No. 104133756, mailed on Nov. 30, 2017, 5 pages (2 pages of English Translation and 3 pages of Official Copy).
Notice of Allowance received for Taiwanese Patent Application No. 104133757, mailed on Jan. 18, 2017, 3 pages (Official Copy only). {See Communication under 37 CFR § 1.98(a) (3)}.
Notice of Allowance received for U.S. Appl. No. 09/735,499, mailed on Aug. 30, 2011, 8 pages.

(56) References Cited

OTHER PUBLICATIONS

Notice of Allowance received for U.S. Appl. No. 13/489,415, mailed on Nov. 17, 2015, 12 pages.
Notice of Allowance received for U.S. Appl. No. 13/489,415, mailed on Oct. 22, 2015, 15 pages.
Notice of Allowance received for U.S. Appl. No. 14/839,897, mailed on Jun. 8, 2018, 11 pages.
Notice of Allowance received for U.S. Appl. No. 14/839,903, mailed on Jan. 3, 2019, 7 pages.
Notice of Allowance received for U.S. Appl. No. 15/005,945, mailed on Aug. 12, 2016, 9 pages.
Notice of Allowance received for U.S. Appl. No. 15/348,204, mailed on Mar. 14, 2019, 11 pages.
Notice of Allowance received for U.S. Appl. No. 16/281,838, mailed on Aug. 26, 2020, 9 pages.
Notice of Allowance received for U.S. Appl. No. 16/281,838, mailed on May 20, 2021, 9 pages.
Notice of Allowance received for U.S. Appl. No. 16/507,664, mailed on Oct. 15, 2020, 11 pages.
Notice of Allowance received for U.S. Appl. No. 16/583,989, mailed on Apr. 1, 2021, 5 pages.
Notice of Allowance received for U.S. Appl. No. 16/583,989, mailed on Dec. 24, 2020, 7 pages.
Notice of Allowance received for U.S. Appl. No. 16/584,321, mailed on Aug. 25, 2020, 9 pages.
Notice of Allowance received for U.S. Appl. No. 16/584,347, mailed on Sep. 15, 2020, 9 pages.
Notice of Allowance received for U.S. Appl. No. 16/584,490, mailed on Aug. 27, 2020, 13 pages.
Notice of Allowance received for U.S. Appl. No. 16/584,490, mailed on Mar. 26, 2021, 13 pages.
Notice of Allowance received for U.S. Appl. No. 16/888,775, mailed on Jul. 26, 2021, 5 pages.
Notice of Allowance received for U.S. Appl. No. 16/888,775, mailed on Jun. 3, 2021, 11 pages.
Notice of Allowance received for U.S. Appl. No. 16/922,675, mailed on Jan. 21, 2021, 7 pages.
Notice of Allowance received for U.S. Appl. No. 16/922,675, mailed on Sep. 27, 2021, 10 pages.
Notice of Allowance received for U.S. Appl. No. 13/312,618, mailed on Aug. 14, 2015, 9 pages.
Nozawa, Naoki et al., "iPad Perfect Manual for iOS 4", JPN, SOTEC Ltd., Yanagisawa Junichi, Dec. 31, 2010, pp. 189-190 (Official Copy Only). {See Communication under 37 CFR § 1.98(a) (3)}.
Office Action received for Australian Patent Application No. 2012268312, issued on Feb. 16, 2015, 3 pages.
Office Action received for Australian Patent Application No. 2015267514 mailed on May 25, 2017, 3 pages.
Office Action received for Australian Patent Application No. 2015267514, mailed on May 22, 2018, 3 pages.
Office Action received for Australian Patent Application No. 2015385757, mailed on Sep. 11, 2017, 3 pages.
Office Action received for Australian Patent Application No. 2016203250, mailed on May 26, 2017, 2 pages.
Office Action received for Australian Patent Application No. 2018203708, mailed on Aug. 15, 2019, 5 pages.
Office Action received for Australian Patent Application No. 2018203708, mailed on Jan. 3, 2019, 4 pages.
Office Action received for Australian Patent Application No. 2018204028, mailed on Apr. 17, 2019, 2 pages.
Office Action received for Australian Patent Application No. 2018247345, mailed on May 6, 2019, 2 pages.
Office Action received for Australian Patent Application No. 2020200028, mailed on Sep. 24, 2020, 3 pages.
Office Action received for Chinese Patent Application No. 2012800272819, mailed on Jan. 4, 2016, 9 pages (English Translation only).
Office Action received for Chinese Patent Application No. 2012800272819, mailed on Sep. 21, 2016, 12 pages (4 pages of English Translation and 8 pages of Official Copy).
Office Action received for Chinese Patent Application No. 201580028073.4, mailed on Feb. 2, 2019, 18 pages (10 pages of English Translation and 8 pages of official Copy).
Office Action received for Chinese Patent Application No. 201580077218.X, mailed on Feb. 3, 2020, 23 pages (8 pages of English Translation and 15 pages of Official Copy).
Office Action received for Chinese Patent Application No. 201710734839.1, mailed on Apr. 14, 2020, 20 pages (11 pages of English Translation and 9 pages of Official Copy).
Office Action received for Chinese Patent Application No. 201710734839.1, mailed on Aug. 24, 2020, 6 pages (3 pages of English Translation and 3 pages of Official Copy).
Office Action received for Chinese Patent Application No. 201810321928.8, mailed on Jul. 2, 2019, 10 pages (5 pages of English Translation and 5 pages of Official Copy).
Office Action received for Chinese Patent Application No. 202010009882.3, mailed on Aug. 9, 2021, 11 pages (5 pages of English Translation and 6 pages of Official Copy).
Office Action received for Chinese Patent Application No. 201280027281.9, mailed on Mar. 2, 2017, 5 pages (2 pages of English Translation and 3 pages of Official Copy).
Office Action received for Danish Patent Application No. PA201570771, mailed on Jun. 13, 2016, 3 pages.
Office Action received for Danish Patent Application No. PA201570771, mailed on Mar. 17, 2016, 8 pages.
Office Action received for Danish Patent Application No. PA201570773, mailed on Aug. 28, 2017, 3 pages.
Office Action received for Danish Patent Application No. PA201570773, mailed on Feb. 15, 2017, 3 pages.
Office Action Received for Danish Patent Application No. PA201570773, mailed on Mar. 18, 2016, 9 pages.
Office Action received for Danish Patent Application No. PA201570773, mailed on Sep. 12, 2016, 3 pages.
Office Action received for European Patent Application No. 15727130.5, mailed on Feb. 14, 2020, 4 pages.
Office Action received for European Patent Application No. 15727130.5, mailed on Jun. 8, 2018, 5 pages.
Office Action received for European Patent Application No. 15727130.5, mailed on Mar. 13, 2019, 4 pages.
Office Action received for European Patent Application No. 15727130.5, mailed on Nov. 19, 2020, 5 pages.
Office Action received for European Patent Application No. 15787091.6, mailed on Aug. 2, 2019, 8 pages.
Office Action received for European Patent Application No. 15787091.6, mailed on Oct. 8, 2018, 7 pages.
Office Action received for European Patent Application No. 20192404.0, mailed on Dec. 2, 2020, 8 pages.
Office Action received for European Patent Application No. 20192404.0, mailed on Jun. 8, 2021, 7 pages.
Office Action Received for European Patent Application No. 12727053.6, mailed on Jul. 4, 2018, 5 pages.
Office Action Received for European Patent Application No. 127270536, mailed on Mar. 21, 2016, 6 pages.
Office Action received for Japanese Patent Application No. 2018-126311, mailed on Nov. 2, 2018, 4 pages (2 pages of English Translation and 2 pages of Official Copy).
Office Action received for Japanese Patent Application No. 2014-513804, mailed on Nov. 28, 2014, 7 pages (4 pages of English Translation and 3 pages of Official Copy).
Office Action received for Japanese Patent Application No. 2015-171114, mailed on Dec. 22, 2017, 16 pages (8 pages of English Translation and 8 pages of Official Copy).
Office Action received for Japanese Patent Application No. 2015171114, mailed on May 19, 2017, 11 pages (6 pages of English Translation and 5 pages of Official Copy).
Office Action received for Japanese Patent Application No. 2015-171114, mailed on May 22, 2018, 11 pages (6 pages of English Translation and 5 Pages of Official Copy).

(56) References Cited

OTHER PUBLICATIONS

Office Action received for Japanese Patent Application No. 2015171114, mailed on Sep. 5, 2016, 6 pages (3 pages of English Translation and 3 pages of Official Copy).
Office Action received for Japanese Patent Application No. 2017-545733, mailed on Feb. 13, 2018, 7 pages (3 pages of English Translation and 4 pages of Official Copy).
Office Action received for Japanese Patent Application No. 2018-071908, mailed on Jan. 28, 2019, 11 pages (5 pages of English Translation and 6 pages of Official Copy).
Office Action received for Japanese Patent Application No. 2019-234184, mailed on Jan. 29, 2021, 6 pages (3 pages of English Translation and 3 pages of Official Copy).
Office Action received for Korean Patent Application No. 10-2013-7034852, mailed on Apr. 26, 2016, 6 pages (3 pages of English Translation and 3 pages of Official Copy).
Office Action received for Korean Patent Application No. 10-2013-7034852, mailed on Jul. 30, 2015, 6 pages (3 pages English Translation and 3 pages of Official Copy).
Office Action received for Korean Patent Application No. 10-2013-7034852, mailed on Nov. 19, 2014, 7 pages (3 pages of English Translation and 4 pages of Official Copy).
Office Action received for Korean Patent Application No. 10-2015-7007065, mailed on Aug. 21, 2017, 5 pages (2 pages of English Translation and 3 pages of Official Copy).
Office Action received for Korean Patent Application No. 10-2015-7007065, mailed on Dec. 24, 2018, 9 pages (4 pages of English translation and 5 pages of Official Copy).
Office Action received for Korean Patent Application No. 10-2015-7007065, mailed on Feb. 28, 2018, 8 pages (4 page of English Translation and 4 pages of Official Copy).
Office Action received for Korean Patent Application No. 10-2015-7037047, mailed on Mar. 15, 2016, 11 pages (5 pages of English Translation and 6 pages of Official Copy).
Office Action received for Korean Patent Application No. 1020157037047, mailed on Nov. 29, 2016, 10 pages (5 pages of English translation and 5 pages of Official Copy).
Office Action received for Taiwanese Patent Application No. 104133756, issued on May 17, 2017, 13 pages (6 pages of English Translation and 7 pages of Official Copy).
Office Action received for Taiwanese Patent Application No. 104133757, issued on Jul. 6, 2016, 22 pages (9 pages of English Translation and 13 pages of Official Copy).
Restriction Requirement received for U.S. Appl. No. 14/475,446, mailed on Jul. 18, 2016, 8 pages.
Restriction Requirement received for U.S. Appl. No. 14/475,471, mailed on Jul. 15, 2016, 8 pages.
Saitou, Kazuo, "Web Site expert", vol. 32, Oct. 25, 2010, 8 pages (Official Copy Only). {See Communication under 37 CFR § 1.98(a)(3)}.
Samsung, "Control an individual smart device on your watch", Online Available at: https://www.samsung.com/us/support/troubleshooting/TSG01003208/, Nov. 9, 2018, 1 page.
Samsung, "Problems with SmartThings on your Samsung Smartwatch", Online Available at: https://www.samsung.com/us/support/troubleshooting/TSG01003169/#smartthings-error-on-samsung-smartwatch, Nov. 9, 2018, 10 pages.
Samsung, "Samsung—User manual—Galaxy Watch", Online available at: https://content.abt.com/documents/90234/SM-R810NZDAXAR-use.pdf, Aug. 24, 2018, 102 pages.
"Smart Home App -What is the Widget", Online Available at: https://support.vivint.com/s/article/Vivint-Smart-Home-App-What-is-the-Widget, Jan. 26, 2019, 4 pages.
Stroud, Forrest, "Screen Lock Meaning & Definition", Online Available at: https://www.webopedia.com/definitions/screen-lock, Jan. 30, 2014, 3 pages.
Supplemental Notice of Allowance received for U.S. Appl. No. 16/584,490, mailed on Apr. 13, 2021, 2 pages.
Advisory Action received for U.S. Appl. No. 16/669,187, mailed on Jan. 4, 2022, 4 pages.
Advisory Action received for U.S. Appl. No. 17/031,702, mailed on Jan. 10, 2022, 3 pages.
Applicant-Initiated Interview Summary received for U.S. Appl. No. 17/031,702, mailed on Dec. 29, 2021, 5 pages.
Applicant-Initiated Interview Summary received for U.S. Appl. No. 17/062,891, mailed on Apr. 5, 2022, 4 pages.
Interview Summary received for U.S. Appl. No. 17/062,891, mailed on Nov. 22, 2021, 4 pages.
Corrected Notice of Allowance received for U.S. Appl. No. 16/922,675, mailed on Mar. 4, 2022, 6 pages.
Decision on Appeal received for U.S. Appl. No. 14/475,471, mailed on Nov. 16, 2021, 12 pages.
Decision to Grant received for European Patent Application No. 15727130.5, mailed on Mar. 3, 2022, 3 pages.
Final Office Action received for U.S. Appl. No. 17/031,702, mailed on Oct. 21, 2021, 16 pages.
Final Office Action received for U.S. Appl. No. 17/062,891, mailed on Jan. 3, 2022, 13 pages.
Intention to Grant received for European Patent Application No. 15727130.5, mailed on Oct. 19, 2021, 8 pages.
International Preliminary Report on Patentability received for PCT Patent Application No. PCT/US2020/025526, mailed on Dec. 9, 2021, 13 pages.
International Preliminary Report on Patentability received for PCT Patent Application No. PCT/US2020/034155, mailed on Dec. 16, 2021, 14 pages.
International Preliminary Report on Patentability received for PCT Patent Application No. PCT/US2020/035488, mailed on Dec. 9, 2021, 16 pages.
Non-Final Office Action received for U.S. Appl. No. 17/020,382, mailed on Mar. 3, 2022, 12 pages.
Non-Final Office Action received for U.S. Appl. No. 17/031,702, mailed on Jan. 26, 2022, 19 pages.
Notice of Acceptance received for Australian Patent Application No. 2020282362, mailed on Jan. 4, 2022, 3 pages.
Notice of Acceptance received for Australian Patent Application No. 2020285521, mailed on Mar. 15, 2022, 3 pages.
Notice of Allowance received for Chinese Patent Application No. 202010009882.3 mailed on Jan. 14, 2022, 4 pages (1 page of English Translation and 3 pages of Official Copy).
Notice of Allowance received for Chinese Patent Application No. 202110011509.6, mailed on Mar. 2, 2022, 2 pages (1 page of English Translation and 1 page of Official Copy).
Notice of Allowance received for Japanese Patent Application No. 2019-234184, mailed on Mar. 22, 2022, 4 pages (1 page of English Translation and 3 pages of Official Copy).
Notice of Allowance received for Japanese Patent Application No. 2021-563716, mailed on Mar. 14, 2022, 4 pages (1 page of English Translation and 3 pages of Official Copy).
Notice of Allowance received for Korean Patent Application No. 10-2021-7035472, mailed on Nov. 23, 2021, 4 pages (2 pages of English Translation and 2 pages of Official Copy).
Notice of Allowance received for Korean Patent Application No. 10-2021-7041874, mailed on Mar. 24, 2022, 4 pages (1 page of English Translation and 3 pages of Official Copy).
Notice of Allowance received for U.S. Appl. No. 14/475,471, mailed on Jan. 26, 2022, 6 pages.
Notice of Allowance received for U.S. Appl. No. 14/475,471, mailed on Mar. 30, 2022, 3 pages.
Notice of Allowance received for U.S. Appl. No. 16/888,775, mailed on Jan. 12, 2022, 5 pages.
Notice of Allowance received for U.S. Appl. No. 17/031,700, mailed on Feb. 10, 2022, 8 pages.
Notice of Allowance received for U.S. Appl. No. 17/031,700, mailed on Oct. 14, 2021, 11 pages.
Office Action received for Australian Patent Application No. 2020282362, mailed on Nov. 25, 2021, 3 pages.
Office Action received for Australian Patent Application No. 2020285521, mailed on Dec. 20, 2021, 3 pages.
Office Action received for Australian Patent Application No. 2021201059, mailed on Feb. 15, 2022, 4 pages.

(56) References Cited

OTHER PUBLICATIONS

Office Action received for Chinese Patent Application No. 202110011509.6, mailed on Oct. 11, 2021, 10 pages (5 pages of English Translation and 5 pages of Official Copy).
Office Action received for European Patent Application No. 20195339.5, mailed on Jan. 20, 2022, 5 pages.
Office Action received for Japanese Patent Application No. 2019-234184, mailed on Oct. 15, 2021, 8 pages (4 pages of English Translation and 4 pages of Official Copy).
Office Action received for Korean Patent Application No. 10-2021-7041874, mailed on Jan. 19, 2022, 5 pages (2 pages of English Translation and 3 pages of Official Copy).
Record of Oral Hearing received for U.S. Appl. No. 14/475,471, mailed on Dec. 9, 2021, 22 pages.
Summons to Attend Oral Proceedings received for European Patent Application No. 20192404.0, mailed on Feb. 2, 2022, 11 pages.
Applicant-Initiated Interview Summary received for U.S. Appl. No. 16/922,675, mailed on Nov. 15, 2022, 2 pages.
Office Action received for Chinese Patent Application No. 202111646465.0, mailed on Oct. 21, 2022, 11 pages (6 pages of English Translation and 5 pages of Official Copy).
Notice of Allowance received for Japanese Patent Application No. 2022-135126, mailed on Nov. 18, 2022, 4 pages (1 page of English Translation and 3 pages of Official Copy).
Record of Oral Hearing received for U.S. Appl. No. 14/475,446, mailed on Nov. 18, 2022, 15 pages.
Applicant-Initiated Interview Summary received for U.S. Appl. No. 17/020,382, mailed on May 10, 2022, 2 pages.
Applicant-Initiated Interview Summary received for U.S. Appl. No. 17/031,702, mailed on Jun. 1, 2022, 4 pages.
Brief Communication Regarding Oral Proceedings received for European Patent Application No. 20192404.0, mailed on May 4, 2022, 3 pages.
Brief Communication Regarding Oral Proceedings received for European Patent Application No. 20192404.0, mailed on May 18, 2022, 1 page.
Corrected Notice of Allowance received for U.S. Appl. No. 16/669,187, mailed on Sep. 6, 2022, 2 pages.
Corrected Notice of Allowance received for U.S. Appl. No. 17/020,382, mailed on Jul. 7, 2022, 2 pages.
Corrected Notice of Allowance received for U.S. Appl. No. 17/031,700, mailed on Aug. 18, 2022, 7 pages.
Corrected Notice of Allowance received for U.S. Appl. No. 17/062,891, mailed on Aug. 2, 2022, 2 pages.
Decision to Refuse received for European Patent Application No. 20192404.0, mailed on Jun. 14, 2022, 15 pages.
Examiner's Answer to Appeal Brief received for U.S. Appl. No. 14/475,446, mailed on Apr. 29, 2022, 12 pages.
Extended European Search Report received for European Patent Application No. 22157146.6, mailed on Sep. 7, 2022, 9 pages.
International Search Report and Written Opinion received for PCT Patent Application No. PCT/US2021/054470, mailed on Feb. 2, 2022, 12 pages.
International Search Report and Written Opinion received for PCT Patent Application No. PCT/US2021/056674, mailed on Jan. 26, 2022, 10 pages.
Non-Final Office Action received for U.S. Appl. No. 16/922,675, mailed on Jun. 8, 2022, 21 pages.
Notice of Acceptance received for Australian Patent Application No. 2021201059, mailed on Aug. 10, 2022, 3 pages.
Notice of Acceptance received for Australian Patent Application No. 2022202458, mailed on May 6, 2022, 3 pages.
Notice of Allowance received for Japanese Patent Application No. 2021-569562, mailed on Jul. 29, 2022, 4 pages (1 page of English Translation and 3 pages of Official Copy).
Notice of Allowance received for Japanese Patent Application No. 2022-079682, mailed on Jul. 15, 2022, 4 pages (1 page of English Translation and 3 pages of Official Copy).
Notice of Allowance received for U.S. Appl. No. 16/669,187, mailed on Apr. 25, 2022, 9 pages.
Notice of Allowance received for U.S. Appl. No. 16/669,187, mailed on Aug. 8, 2022, 5 pages.
Notice of Allowance received for U.S. Appl. No. 16/888,775, mailed on Oct. 19, 2022, 6 pages.
Notice of Allowance received for U.S. Appl. No. 17/020,382, mailed on Jun. 24, 2022, 8 pages.
Notice of Allowance received for U.S. Appl. No. 17/031,702, mailed on Jul. 11, 2022, 12 pages.
Notice of Allowance received for U.S. Appl. No. 17/062,891, mailed on Apr. 25, 2022, 9 pages.
Office Action received for Australian Patent Application No. 2021201059, mailed on May 25, 2022, 3 pages.
Office Action received for European Patent Application No. 20720675.6, mailed on Sep. 8, 2022, 6 pages.
Office Action received for Indian Patent Application No. 202118054338, mailed on Jun. 21, 2022, 5 pages.
Office Action received for Japanese Patent Application No. 2021-569562, mailed on May 13, 2022, 6 pages (3 pages of English Translation and 3 pages of Official Copy).
Office Action received for Korean Patent Application No. 10-2022-7006175, mailed on May 27, 2022, 7 pages (3 pages of English Translation and 4 pages of Official Copy).
Corrected Notice of Allowance received for U.S. Appl. No. 17/952,171, mailed on Dec. 21, 2023, 7 pages.
International Preliminary Report on Patentability received for PCT Patent Application No. PCT/US2022/032340, mailed on Dec. 21, 2023, 13 pages.
Applicant-Initiated Interview Summary received for U.S. Appl. No. 17/306,354, mailed on Jun. 28, 2023, 3 pages.
Applicant-Initiated Interview Summary received for U.S. Appl. No. 17/952,171, mailed on Sep. 18, 2023, 4 pages.
Cohn Emily, "Sonos Just Fixed the Most Annoying Thing About Its iPhone App", online available at https://www.businessinsider.com/sonos-mobile-app-works-on-lock-screen-2016-6, Jun. 27, 2016, 2 pages.
Corrected Notice of Allowance received for U.S. Appl. No. 16/922,675, mailed on Apr. 14, 2023, 6 pages.
Corrected Notice of Allowance received for U.S. Appl. No. 16/922,675, mailed on Jan. 9, 2023, 3 pages.
Corrected Notice of Allowance received for U.S. Appl. No. 16/922,675, mailed on Jan. 20, 2023, 3 pages.
Corrected Notice of Allowance received for U.S. Appl. No. 17/871,627, mailed on Apr. 11, 2023, 3 pages.
Corrected Notice of Allowance received for U.S. Appl. No. 17/871,627, mailed on Feb. 8, 2023, 2 pages.
Corrected Notice of Allowance received for U.S. Appl. No. 17/871,627, mailed on Mar. 7, 2023, 2 pages.
Corrected Notice of Allowance received for U.S. Appl. No. 17/871,627, mailed on May 3, 2023, 2 pages.
Decision on Appeal received for U.S. Appl. No. 14/475,446, mailed on Dec. 30, 2022, 28 pages.
Extended European Search Report received for European Patent Application No. 22195584.2, mailed on Jan. 5, 2023, 13 pages.
Extended European Search Report received for European Patent Application No. 23168537.1, mailed on Jul. 25, 2023, 13 pages.
Fingas Jon, "Sonos Puts Speaker Controls on Your iPhone's Lock Screen", online available at https://www.engadget.com/2016-06-21-sonos-ios-lock-screen-controls.html, Jun. 21, 2016, 3 pages.
Intention to Grant received for European Patent Application No. 20195339.5, mailed on May 2, 2023, 8 pages.
Intention to Grant received for European Patent Application No. 20195339.5, mailed on Oct. 20, 2023, 9 pages.
Intention to Grant received for European Patent Application No. 20720675.6, mailed on Oct. 5, 2023, 9 pages.
Intention to Grant received for European Patent Application No. 20720675.6, mailed on Mar. 24, 2023, 9 pages.
International Preliminary Report on Patentability received for PCT Patent Application No. PCT/US2020/052041, mailed on Mar. 23, 2023, 15 pages.
International Preliminary Report on Patentability received for PCT Patent Application No. PCT/US2021/054470, mailed on Apr. 27, 2023, 9 pages.

(56) References Cited

OTHER PUBLICATIONS

International Preliminary Report on Patentability received for PCT Patent Application No. PCT/US2021/056674, mailed on May 11, 2023, 7 pages.
International Search Report and Written Opinion received for PCT Patent Application No. PCT/US2022/032340, mailed on Jan. 12, 2023, 18 pages.
Invitation to Pay Additional Fees and Partial International Search Report received for PCT Patent Application No. PCT/US2022/032340, mailed on Nov. 21, 2022, 14 pages.
Invitation to Pay Search Fees received for European Patent Application No. 20760624.5, mailed on Jan. 2, 2023, 3 pages.
Kazmucha Allyson, "Sonos Controller App for iPhone and iPad Review", online available at https://www.imore.com/sonos-controller-app-iphone-and-ipad-review, Mar. 1, 2018, 4 pages.
Non-Final Office Action received for U.S. Appl. No. 17/306,354, mailed on Jun. 2, 2023, 21 pages.
Non-Final Office Action received for U.S. Appl. No. 17/468,286, mailed on Oct. 5, 2023, 15 pages.
Non-Final Office Action received for U.S. Appl. No. 17/952,171, mailed on Aug. 2, 2023, 14 pages.
Non-Final Office Action received for U.S. Appl. No. 18/115,683, mailed on Oct. 4, 2023, 14 pages.
Notice of Acceptance received for Australian Patent Application No. 2022203561, mailed on Feb. 27, 2023, 3 pages.
Notice of Acceptance received for Australian Patent Application No. 2022218540, mailed on Oct. 16, 2023, 3 pages.
Notice of Allowance received for Chinese Patent Application No. 202111483033.2, mailed on Oct. 7, 2023, 4 pages (1 page of English Translation and 3 pages of Official Copy).
Notice of Allowance received for Chinese Patent Application No. 202111646465.0, mailed on Feb. 6, 2023, 3 pages (1 page of English Translation and 2 pages of Official Copy).
Notice of Allowance received for Japanese Patent Application No. 2022-070241, mailed on Oct. 23, 2023, 4 pages (1 page of English Translation and 3 pages of Official Copy).
Notice of Allowance received for Japanese Patent Application No. 2022-201453, mailed on Jun. 5, 2023, 4 pages (1 page of English Translation and 3 pages of Official Copy).
Notice of Allowance received for Korean Patent Application No. 10-2022-7006175, mailed on Jan. 12, 2023, 7 pages (2 pages of English Translation and 5 pages of Official Copy).
Notice of Allowance received for U.S. Appl. No. 16/888,775, mailed on Feb. 21, 2023, 5 pages.
Notice of Allowance received for U.S. Appl. No. 16/922,675, mailed on Dec. 8, 2022, 9 pages.
Notice of Allowance received for U.S. Appl. No. 16/922,675, mailed on Jul. 19, 2023, 13 pages.
Notice of Allowance received for U.S. Appl. No. 16/922,675, mailed on Mar. 22, 2023, 8 pages.
Notice of Allowance received for U.S. Appl. No. 17/306,354, mailed on Jul. 24, 2023, 7 pages.
Notice of Allowance received for U.S. Appl. No. 17/871,627, mailed on Jan. 20, 2023, 11 pages.
Notice of Allowance received for U.S. Appl. No. 17/952,171, mailed on Oct. 23, 2023, 10 pages.
Office Action received for Australian Patent Application No. 2022203561, mailed on Dec. 16, 2022, 2 pages.
Office Action received for Australian Patent Application No. 2022218540, mailed on Aug. 3, 2023, 5 pages.
Office Action received for Australian Patent Application No. 2022235611, mailed on Sep. 8, 2023, 3 pages.
Office Action received for Australian Patent Application No. 2023201189, mailed on Sep. 8, 2023, 2 pages.
Office Action received for European Patent Application No. 20732041.7, mailed on Dec. 6, 2022, 9 pages.
Office Action received for European Patent Application No. 20760624.5, mailed on Mar. 7, 2023, 13 pages.
Office Action received for Japanese Patent Application No. 2022-070241, mailed on May 22, 2023, 8 pages (4 pages of English Translation and 4 pages of Official Copy).
Office Action received for Japanese Patent Application No. 2022-201453, mailed on Mar. 6, 2023, 8 pages (5 pages of English Translation and 3 pages of Official Copy).
Supplemental Notice of Allowance received for U.S. Appl. No. 16/888,775, mailed on Mar. 1, 2023, 2 pages.
Notice of Acceptance received for Australian Patent Application No. 2023201189, mailed on Nov. 2, 2023, 3 pages.
Office Action received for Japanese Patent Application No. 2022-129377, mailed on Nov. 10, 2023, 6 pages (3 pages of English Translation and 3 pages of Official Copy).
Applicant-Initiated Interview Summary received for U.S. Appl. No. 17/468,286, mailed on Nov. 24, 2023, 4 pages.
Applicant-Initiated Interview Summary received for U.S. Appl. No. 18/115,683, mailed on Nov. 21, 2023, 4 pages.
Corrected Notice of Allowance received for U.S. Appl. No. 17/952,171, mailed on Dec. 4, 2023, 7 pages.
Office Action received for Japanese Patent Application No. 2023-109549, mailed on Sep. 8, 2023, 6 pages (3 pages of English Translation and 3 pages of Official Copy).
Non-Final Office Action received for U.S. Appl. No. 17/481,030, mailed on Dec. 12, 2023, 16 pages.
Notice of Allowance received for Korean Patent Application No. 10-2022-7018896, mailed on Nov. 24, 2023, 7 pages (2 pages of English Translation and 5 pages of Official Copy).
Office Action received for Australian Patent Application No. 2022235611, mailed on Dec. 6, 2023, 3 pages.
Office Action received for Korean Patent Application No. 10-2023-7008877, mailed on Nov. 29, 2023, 7 pages (3 pages of English Translation and 4 pages of Official Copy).
Corrected Notice of Allowance received for U.S. Appl. No. 17/468,286, mailed on Feb. 8, 2024, 7 pages.
Intention to Grant received for European Patent Application No. 20732041.7, mailed on Feb. 5, 2024, 9 pages.
Notice of Allowance received for Japanese Patent Application No. 2023-109549, mailed on Jan. 9, 2024, 4 pages (1 page of English Translation and 3 pages of Official Copy).
Notice of Allowance received for U.S. Appl. No. 17/468,286, mailed on Jan. 4, 2024, 18 pages.
Decision to Grant received for European Patent Application No. 20195339.5, mailed on Jan. 25, 2024, 2 pages.
Decision to Grant received for European Patent Application No. 20720675.6, mailed on Jan. 18, 2024, 3 pages.
Extended European Search Report received for European Patent Application No. 23213039.3, mailed on Jan. 31, 2024, 10 pages.
Notice of Allowance received for Chinese Patent Application No. 202310465764.7, mailed on Jan. 18, 2024, 5 pages (1 page of English Translation and 4 pages of Official Copy).
Office Action received for Indian Patent Application No. 202117048581, mailed on Feb. 1, 2024, 6 pages.
Applicant-Initiated Interview Summary received for U.S. Appl. No. 17/481,030, mailed on Mar. 4, 2024, 2 pages.
Final Office Action received for U.S. Appl. No. 17/481,030, mailed on Mar. 12, 2024, 21 pages.
Notice of Allowance received for Korean Patent Application No. 10-2023-7008877, mailed on Feb. 20, 2024, 7 pages (2 pages of English Translation and 5 pages of Official Copy).
Notice of Allowance received for U.S. Appl. No. 18/207,053, mailed on Mar. 13, 2024, 10 pages.
Office Action received for Australian Patent Application No. 2022235611, mailed on Mar. 6, 2024, 2 pages.
Office Action received for Chinese Patent Application No. 202110190023.3, mailed on Jan. 18, 2024, 16 pages (6 pages of English Translation and 10 pages of Official Copy).
Corrected Notice of Allowance received for U.S. Appl. No. 18/207,053, mailed on Apr. 4, 2024, 4 pages.
Corrected Notice of Allowance received for U.S. Appl. No. 18/207,053, mailed on Mar. 22, 2024, 2 pages.
Extended European Search Report received for European Patent Application No. 24156380.8, mailed on Mar. 25, 2024, 8 pages.

(56) References Cited

OTHER PUBLICATIONS

Office Action received for Chinese Patent Application No. 202080040230.4, mailed on Feb. 24, 2024, 11 pages (5 pages of English Translation and 6 pages of Official Copy).
Office Action received for Chinese Patent Application No. 202311321231.8, mailed on Mar. 10, 2024, 15 pages (9 pages of English Translation and 6 pages of Official Copy).
Applicant-Initiated Interview Summary received for U.S. Appl. No. 17/832,657, mailed on Aug. 1, 2024, 3 pages.
Examiner-Initiated Interview Summary received for U.S. Appl. No. 18/234,613, mailed on Aug. 9, 2024, 2 pages.
Notice of Allowance received for Chinese Patent Application No. 202080040230.4, mailed on Jul. 31, 2024, 2 pages (1 page of English Translation and 1 page of Official Copy).
Advisory Action received for U.S. Appl. No. 17/481,030, mailed on May 28, 2024, 5 pages.
Applicant-Initiated Interview Summary received for U.S. Appl. No. 17/481,030, mailed on May 6, 2024, 2 pages.
Applicant-Initiated Interview Summary received for U.S. Appl. No. 18/115,683, mailed on Jul. 3, 2024, 3 pages.
"Create Confirmation Dialog Box—Matlab Ulconfirm", Online available at: https://www.mathworks.com/help/matlab/ref/uiconfirm.html, 2017, 19 pages.
Decision to Grant received for European Patent Application No. 20732041.7, mailed on May 31, 2024, 2 pages.
Extended European Search Report received for European Patent Application No. 24173644.6, mailed on Jul. 24, 2024, 8 pages.
Final Office Action received for U.S. Appl. No. 18/115,683, mailed on May 9, 2024, 13 pages.
Intention to Grant received for European Patent Application No. 23168537.1, mailed on Jul. 25, 2024, 8 pages.
Non-Final Office Action received for U.S. Appl. No. 17/481,030, mailed on Jul. 9, 2024, 19 pages.
Non-Final Office Action received for U.S. Appl. No. 17/832,657, mailed on Apr. 24, 2024, 38 pages.
Non-Final Office Action received for U.S. Appl. No. 18/234,613, mailed on Jul. 1, 2024, 19 pages.
Notice of Acceptance received for Australian Patent Application No. 2022235611, mailed on May 17, 2024, 3 pages.
Notice of Allowance received for Japanese Patent Application No. 2022-129377, mailed on Apr. 26, 2024, 4 pages (1 page of English Translation and 3 pages of Official Copy).
Notice of Allowance received for Japanese Patent Application No. 2023-197506, mailed on Jun. 24, 2024, 4 pages (1 page of English Translation and 3 pages of Official Copy).
Office Action received for Australian Patent Application No. 2023274186, mailed on Jul. 8, 2024, 2 pages.
Office Action received for Chinese Patent Application No. 202110190023.3, mailed on May 28, 2024, 9 pages (3 pages of English Translation and 6 pages of Official Copy).
Office Action received for European Patent Application No. 22157146.6, mailed on May 24, 2024, 5 pages.
Office Action received for Indian Patent Application No. 202117053967, mailed on May 31, 2024, 7 pages.
Office Action received for Indian Patent Application No. 202118049678, mailed on Apr. 18, 2024, 8 pages.
Office Action received for Korean Patent Application No. 10-2024-7000828, mailed on May 21, 2024, 6 pages (2 pages of English Translation and 4 pages of Official Copy).
"Window confirm()", Online available at: https://www.w3schools.com/jsref/met_win_confirm.asp, 2014, 5 pages.
Examiner-Initiated Interview Summary received for U.S. Appl. No. 17/481,030, mailed on Sep. 24, 2024, 2 pages.
Non-Final Office Action received for U.S. Appl. No. 18/115,683, mailed on Sep. 26, 2024, 14 pages.
Office Action received for Australian Patent Application No. 2023266353, mailed on Sep. 19, 2024, 2 pages.
Notice of Acceptance received for Australian Patent Application No. 2023274186, mailed on Aug. 22, 2024, 3 pages.
Notice of Allowance received for Chinese Patent Application No. 202110190023.3, mailed on Aug. 12, 2024, 2 pages (1 page of English Translation and 1 page of Official Copy).
Notice of Allowance received for Korean Patent Application No. 10-2024-7000828, mailed on Aug. 7, 2024, 7 pages (2 pages of English Translation and 5 pages of Official Copy).
Office Action received for Chinese Patent Application No. 202311321231.8, mailed on Jul. 28, 2024, 9 pages (5 pages of English Translation and 4 pages of Official Copy).
Applicant-Initiated Interview Summary received for U.S. Appl. No. 18/115,683, mailed on Nov. 14, 2024, 3 pages.
Corrected Notice of Allowance received for U.S. Appl. No. 17/955,366, mailed on Jan. 6, 2025, 2 pages.
Corrected Notice of Allowance received for U.S. Appl. No. 18/234,613, mailed on Jan. 10, 2025, 5 pages.
Corrected Notice of Allowance received for U.S. Appl. No. 18/234,613, mailed on Nov. 20, 2024, 2 pages.
r Corrected Notice of Allowance received for U.S. Appl. No. 18/234,613, mailed on Oct. 28, 2024, 2 pages.
Final Office Action received for U.S. Appl. No. 17/832,657, mailed on Oct. 18, 2024, 46 pages.
Final Office Action received for U.S. Appl. No. 18/115,683, mailed on Nov. 22, 2024, 14 pages.
Intention to Grant received for European Patent Application No. 23168537.1, mailed on Dec. 2, 2024, 8 pages.
Invitation to Pay Search Fees received for European Patent Application No. 22764901.9, mailed on Jan. 31, 2025, 3 pages.
Non-Final Office Action received for U.S. Appl. No. 17/481,030, mailed on Nov. 27, 2024, 23 pages.
Non-Final Office Action received for U.S. Appl. No. 17/955,366, mailed on Nov. 5, 2024, 10 pages.
Notice of Acceptance received for Australian Patent Application No. 2023266353, maiied on Oct. 1, 2024, 3 pages.
Notice of Allowance received for Chinese Patent Application No. 202410271615.1, mailed on Oct. 24, 2024, 5 pages (1 page of English Translation and 4 pages of Official Copy).
Notice of Allowance received for Chinese Patent Application No. 202410272195.9, mailed on Oct. 25, 2024. 5 pages (1 page of English Translation and 4 pages of Official Copy).
Notice of Allowance received for U.S. Appl. No. 17/950,817, mailed on Nov. 8, 2024, 9 pages.
Notice of Allowance received for U.S. Appl. No. 17/950,817, mailed on Nov. 27, 2024, 2 pages.
Notice of Allowance received for U.S. Appl. No. 17/955,366, mailed on Dec. 16, 2024, 5 pages.
Notice of Allowance received for U.S. Appl. No. 18/234,513, mailed on Dec. 12, 2024, 7 pages.
Notice of Allowance received for U.S. Appl. No. 18/234,613, mailed on Oct. 11, 2024, 10 pages.
Notice of Allowance received for Japanese Patent Application No. 2024-013230, mailed on Feb. 7, 2025, 4 pages (1 page of English Translation and 3 pages of Official Copy).
Notice of Allowance received for Korean Patent Application No. 10-2024-7033419, mailed on Feb. 20, 2025, 7 pages (2 pages of English Translation and 5 pages of Official Copy).
Notice of Allowance received for U.S. Appl. No. 17/481,030, mailed on Feb. 24, 2025, 13 pages.
Office Action received for Australian Patent Application No. 2024278098, mailed on Jan. 22, 2025, 3 pages.
Office Action received for Australian Patent Application No. 2024278098, mailed on Mar. 6, 2025, 3 pages.
Szogyenyi, Zina, "Improving the usability of multi-selecting from a long list", Available online at: https://medium.com/tripaneer-techblog/improving-the-usability-of-multi-selecting-from-a-long-list-63e1a67aab35, Jun. 13, 2018, 12 pages.
Office Action received for European Patent Application No. 21810840.5, mailed on May 6, 2025, 5 pages.

* cited by examiner

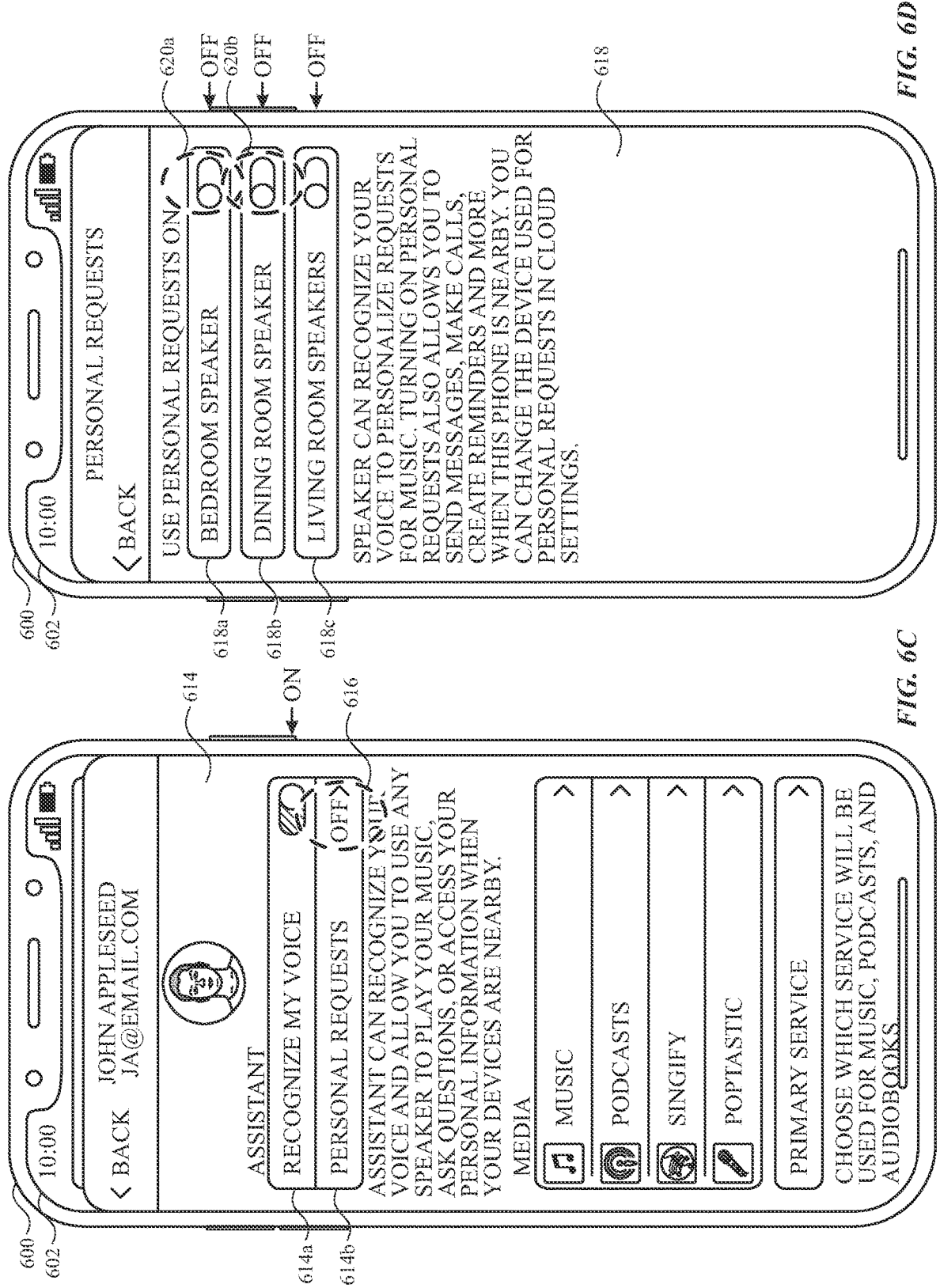

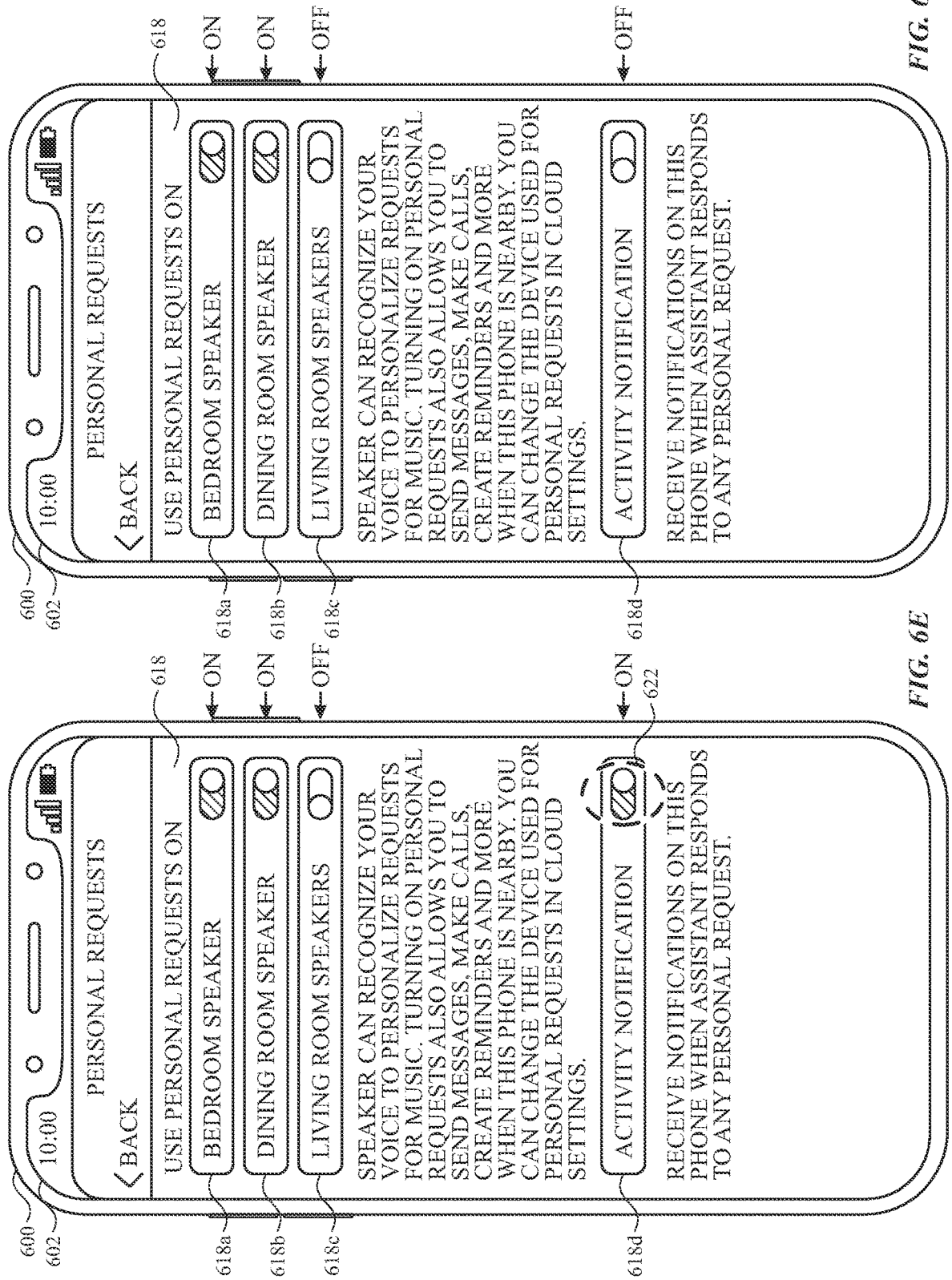

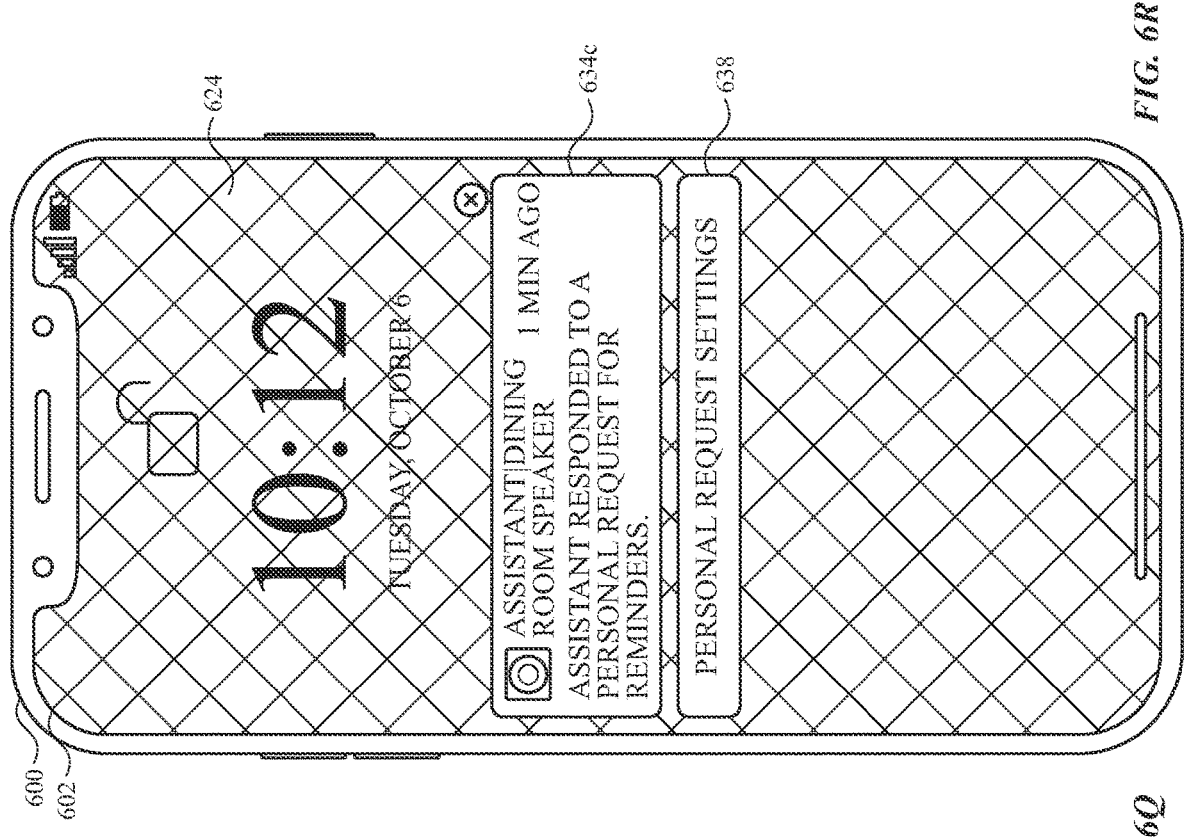
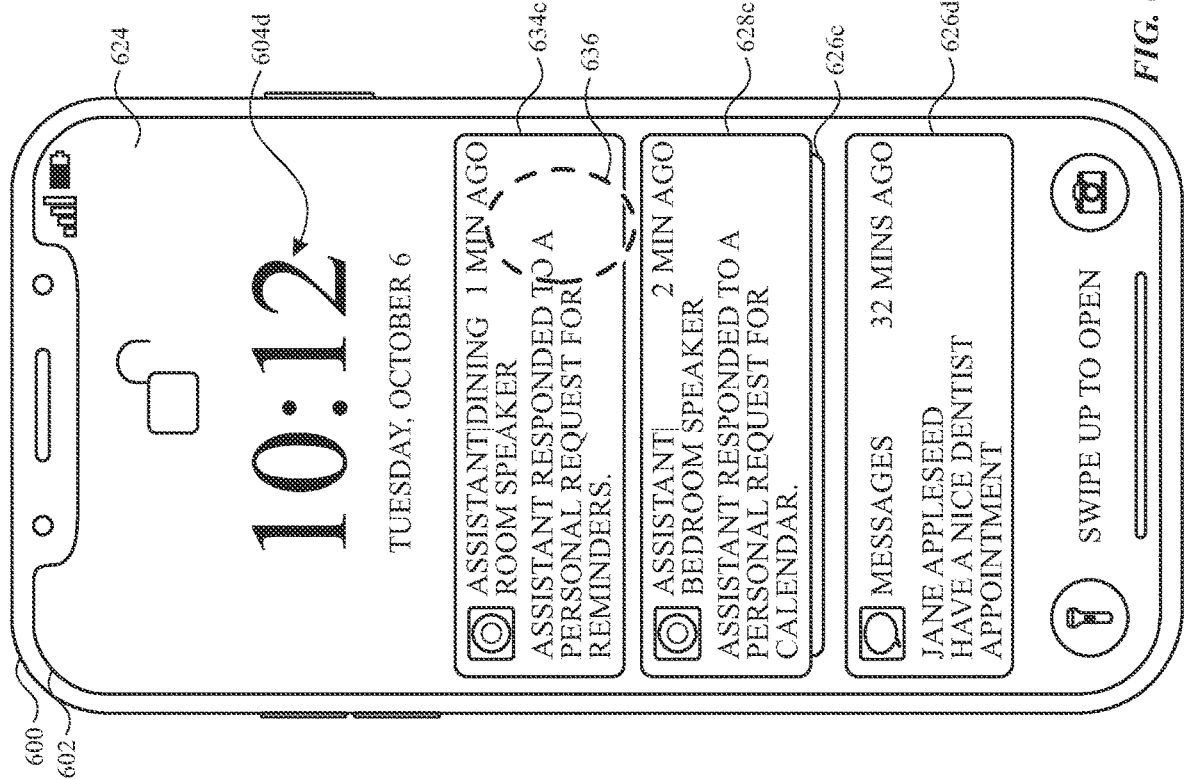
FIG. 6Q
FIG. 6R

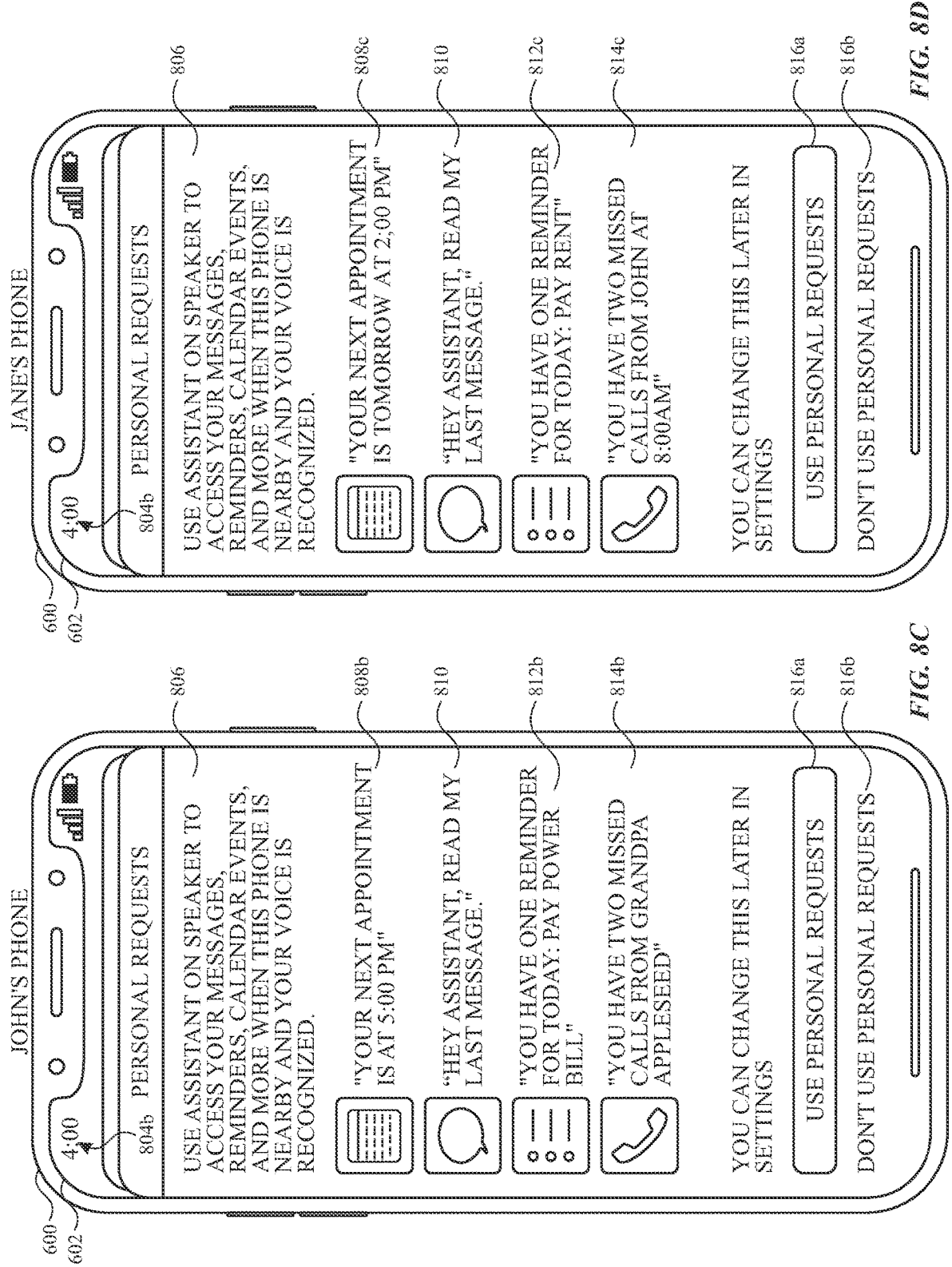

900 ⤴

902
Display, via the display generation component, a first configuration user interface associated with a process for configuring data request operations for a respective user, wherein the first configuration user interface includes a set of one or more indications personalized for the respective user, that includes a first indication, wherein:

904
In accordance with a determination that the respective user is a first user, the first indication includes a representation of first data that is associated with the first user

908
In accordance with a determination that the first configuration user interface is displayed at a first time, a representation of data associated with the first user that is relevant to the first time

910
In accordance with a determination that the first configuration user interface is displayed at a second time, different than the first time, a representation of data associated with the first user that is relevant to the second time

906
In accordance with a determination that the respective user is a second user, different from the first user, the first indication includes a representation of second data, different from the first data, that is associated with the second user

*FIG. 9*

METHODS AND USER INTERFACES FOR HANDLING USER REQUESTS

CROSS-REFERENCE TO RELATED APPLICATIONS

This application claims priority to U.S. Provisional Patent Application No. 63/105,805, entitled "METHODS AND USER INTERFACES FOR HANDLING USER REQUESTS", filed Oct. 26, 2020, the entire contents of which is hereby incorporated by reference.

FIELD

The present disclosure relates generally to computer user interfaces, and more specifically to methods and user interfaces for managing user requests for specific operations.

BACKGROUND

The number of electronic devices, and particularly smart devices, in users' homes continues to increase. These devices are required to perform increasingly complex tasks, including responding to user requests for specific operations.

BRIEF SUMMARY

Some techniques for managing user requests for specific operations using electronic devices, however, are generally cumbersome and inefficient. For example, some existing techniques use a complex and time-consuming user interface, which may include multiple key presses, keystrokes, and/or voice inputs. Some existing techniques do not sufficiently inform users that certain types of operations have been requested, based on certain criteria (e.g., user-defined notification criteria), thereby reducing security and/or potentially compromising privacy, when the operations relate to personal information. Some existing techniques also do not effectively leverage the interconnections between devices to optimize request performance and user notifications. Existing techniques require more time than necessary, wasting user time and device energy. This latter consideration is particularly important in battery-operated devices.

Accordingly, the present technique provides electronic devices with faster, more efficient methods and interfaces for responding to user requests for specific operations. Such methods and interfaces optionally complement or replace other methods for responding to user requests for specific operations. Such methods and interfaces reduce the cognitive burden on a user and produce a more efficient human-machine interface. For battery-operated computing devices, such methods and interfaces conserve power and increase the time between battery charges. For requests for operations that relate to personal and/or confidential data, such methods and interfaces can increase security and enhance privacy.

In accordance with some embodiments, a method, performed at a computer system that is in communication with one or more input devices and a first external electronic device is described. The method includes: receiving, via the one or more input devices, a first request, of a first type, to perform a first operation; and in response to receiving the first request of the first type: in accordance with a determination that a first set of notification criteria are met: performing the first operation; and initiating a process to display a notification on the first external electronic device; and in accordance with a determination that the first set of notification criteria are not met, performing the first operation without initiating the process to display the notification on the first external electronic device.

In accordance with some embodiments, a non-transitory computer-readable storage medium storing one or more programs configured to be executed by one or more processors of a computer system that is in communication with one or more input devices and a first external device is described. The one or more programs including instructions for: receiving, via the one or more input devices, a first request, of a first type, to perform a first operation; and in response to receiving the first request of the first type: in accordance with a determination that a first set of notification criteria are met: performing the first operation; and initiating a process to display a notification on the first external electronic device; and in accordance with a determination that the first set of notification criteria are not met, performing the first operation without initiating the process to display the notification on the first external electronic device.

In accordance with some embodiments, a transitory computer-readable storage medium storing one or more programs configured to be executed by one or more processors of a computer system that is in communication with one or more input devices and a first external device is described. The one or more programs including instructions for: receiving, via the one or more input devices, a first request, of a first type, to perform a first operation; and in response to receiving the first request of the first type: in accordance with a determination that a first set of notification criteria are met: performing the first operation; and initiating a process to display a notification on the first external electronic device; and in accordance with a determination that the first set of notification criteria are not met, performing the first operation without initiating the process to display the notification on the first external electronic device.

In accordance with some embodiments, a computer system, comprising: one or more input devices; one or more processors; and memory storing one or more programs configured to be executed by the one or more processors is described. The one or more programs including instructions for: receiving, via the one or more input devices, a first request, of a first type, to perform a first operation; and in response to receiving the first request of the first type: in accordance with a determination that a first set of notification criteria are met: performing the first operation; and initiating a process to display a notification on the first external electronic device; and in accordance with a determination that the first set of notification criteria are not met, performing the first operation without initiating the process to display the notification on the first external electronic device.

In accordance with some embodiments, a computer system is described. The computer system comprising: one or more input devices means for receiving, via the one or more input devices, a first request, of a first type, to perform a first operation; and means for, in response to receiving the first request of the first type: in accordance with a determination that a first set of notification criteria are met: performing the first operation; and initiating a process to display a notification on the first external electronic device; and in accordance with a determination that the first set of notification criteria are not met, performing the first operation without initiating the process to display the notification on the first external electronic device.

In accordance with some embodiments, a method performed at a computer system that is in communication with a display generation component is described. The method includes: displaying, via the display generation component, a first configuration user interface associated with a process for configuring data request operations for a respective user, wherein the first configuration user interface includes a set of one or more indications, personalized for the respective user, that includes a first indication, wherein: in accordance with a determination that the respective user is a first user, the first indication includes a representation of first data that is associated with the first user; and in accordance with a determination that the respective user is a second user, different from the first user, the first indication includes a representation of second data, different from the first data, that is associated with the second user.

In accordance with some embodiments, a non-transitory computer-readable storage medium storing one or more programs configured to be executed by one or more processors of a computer system that is in communication with a display generation component is described. The one or more programs including instructions for: displaying, via the display generation component, a first configuration user interface associated with a process for configuring data request operations for a respective user, wherein the first configuration user interface includes a set of one or more indications, personalized for the respective user, that includes a first indication, wherein: in accordance with a determination that the respective user is a first user, the first indication includes a representation of first data that is associated with the first user; and in accordance with a determination that the respective user is a second user, different from the first user, the first indication includes a representation of second data, different from the first data, that is associated with the second user.

In accordance with some embodiments, a transitory computer-readable storage medium storing one or more programs configured to be executed by one or more processors of a computer system that is in communication with a display generation component is described. The one or more programs including instructions for: displaying, via the display generation component, a first configuration user interface associated with a process for configuring data request operations for a respective user, wherein the first configuration user interface includes a set of one or more indications, personalized for the respective user, that includes a first indication, wherein: in accordance with a determination that the respective user is a first user, the first indication includes a representation of first data that is associated with the first user; and in accordance with a determination that the respective user is a second user, different from the first user, the first indication includes a representation of second data, different from the first data, that is associated with the second user.

In accordance with some embodiments, a computer system, comprising: a display generation component; one or more processors; and memory storing one or more programs configured to be executed by the one or more processors is described. The one or more programs including instructions for: displaying, via the display generation component, a first configuration user interface associated with a process for configuring data request operations for a respective user, wherein the first configuration user interface includes a set of one or more indications, personalized for the respective user, that includes a first indication, wherein: in accordance with a determination that the respective user is a first user, the first indication includes a representation of first data that is associated with the first user; and in accordance with a determination that the respective user is a second user, different from the first user, the first indication includes a representation of second data, different from the first data, that is associated with the second user.

In accordance with some embodiments, a computer system is described. The computer system comprising: a display generation component; means for displaying, via the display generation component, a first configuration user interface associated with a process for configuring data request operations for a respective user, wherein the first configuration user interface includes a set of one or more indications, personalized for the respective user, that includes a first indication, wherein: in accordance with a determination that the respective user is a first user, the first indication includes a representation of first data that is associated with the first user; and in accordance with a determination that the respective user is a second user, different from the first user, the first indication includes a representation of second data, different from the first data, that is associated with the second user.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for responding to user requests for specific operations, thereby increasing the effectiveness, efficiency, and user satisfaction with such devices. Such methods and interfaces may complement or replace other methods for responding to user requests for specific operations.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 8A-8D illustrate exemplary user interfaces for configuring management of user requests for specific operations.

FIG. 9 is a flow diagram illustrating a method for configuring management of user requests for specific operations, in accordance with some embodiments.

DESCRIPTION OF EMBODIMENTS

Figure 1A:
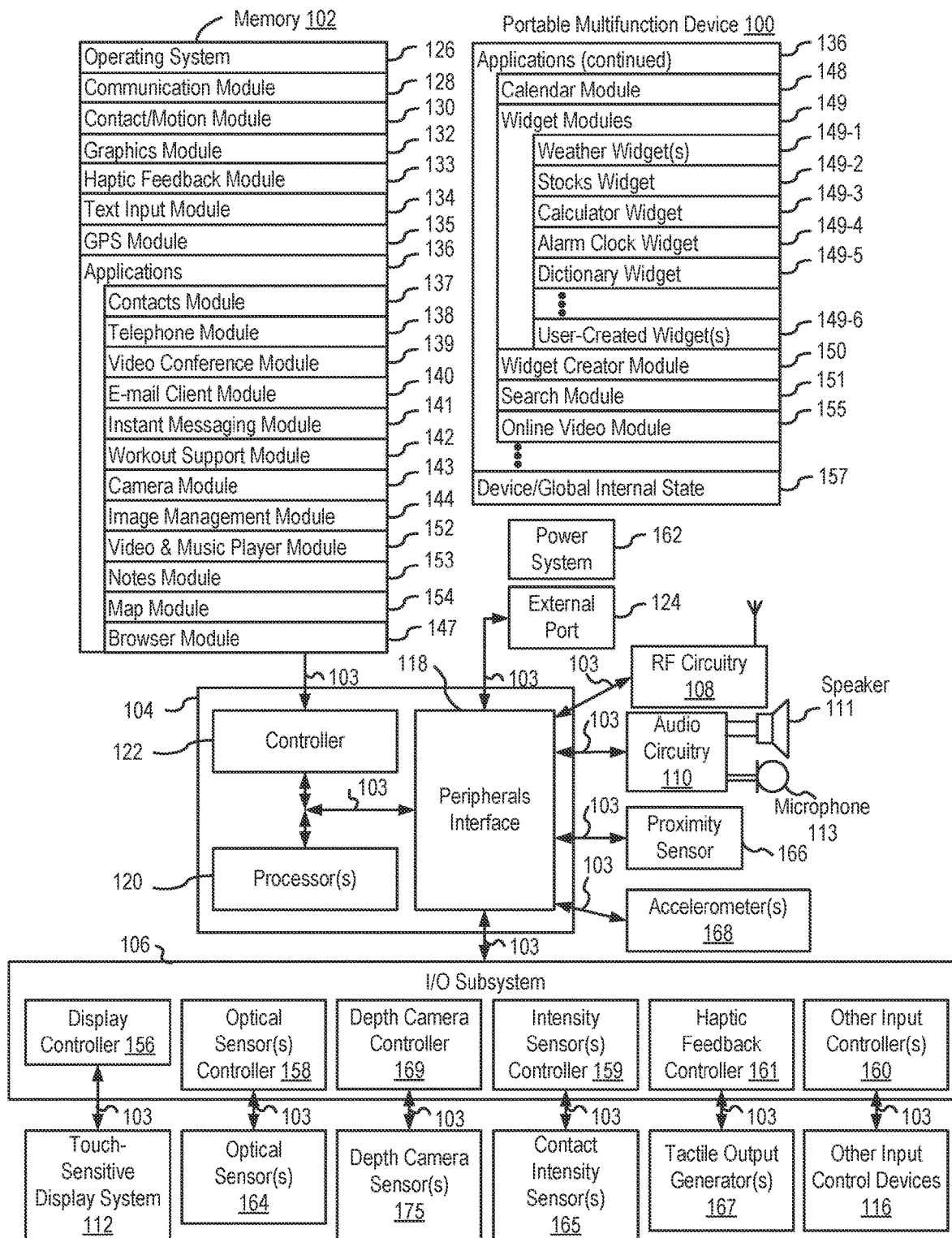
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for responding to user requests for specific operations. In particular, there is a need for devices and methods and provide users with options for managing notifications, using the interconnection between devices, to better inform users that specific operations have been requested. Such techniques can reduce the cognitive burden on a user who makes requests for specific operations and/or who wish to monitor the occurrence of such requests, thereby enhancing productivity and security. Further, such techniques can reduce processor and battery power otherwise wasted on redundant user inputs.

Below, FIGS. 1A-1B, 2, 3, 4A-4B, and 5A-5D provide a description of exemplary devices for performing the techniques for managing user requests for specific operations. FIGS. 6A-6V illustrate exemplary user interfaces for managing user requests for specific operations. FIG. 7 is a flow diagram illustrating methods of managing user requests for specific operations in accordance with some embodiments. The user interfaces and scenarios in FIGS. 6A-6V are used to illustrate the processes described below, including the processes in FIG. 7. FIGS. 8A-8D illustrate exemplary user interfaces for configuring management of user requests for specific operations. FIG. 9 is a flow diagram illustrating methods of configuring management of user requests for specific operations in accordance with some embodiments. The user interfaces in FIGS. 8A-8D are used to illustrate the processes described below, including the processes in FIG. 9.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
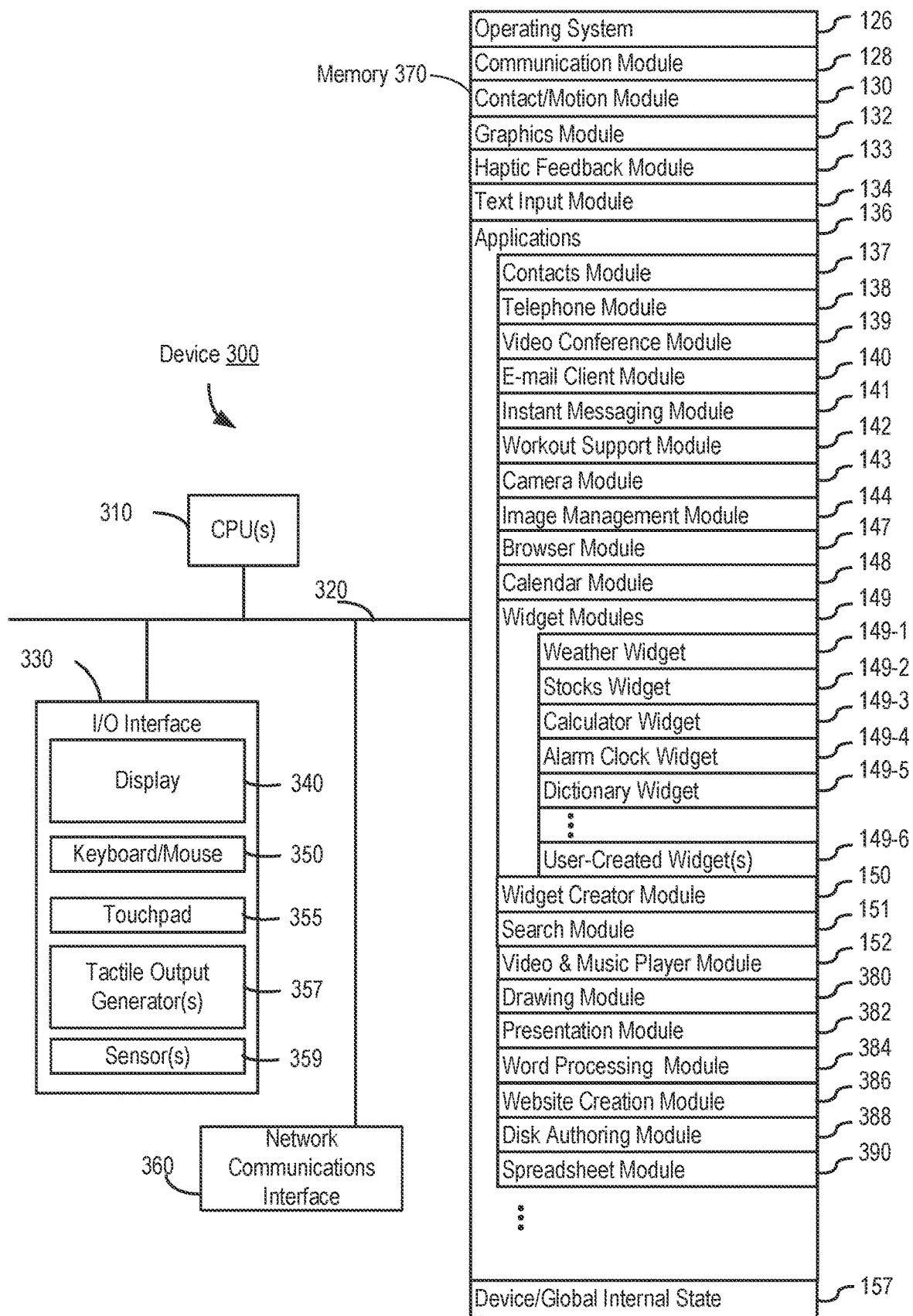
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
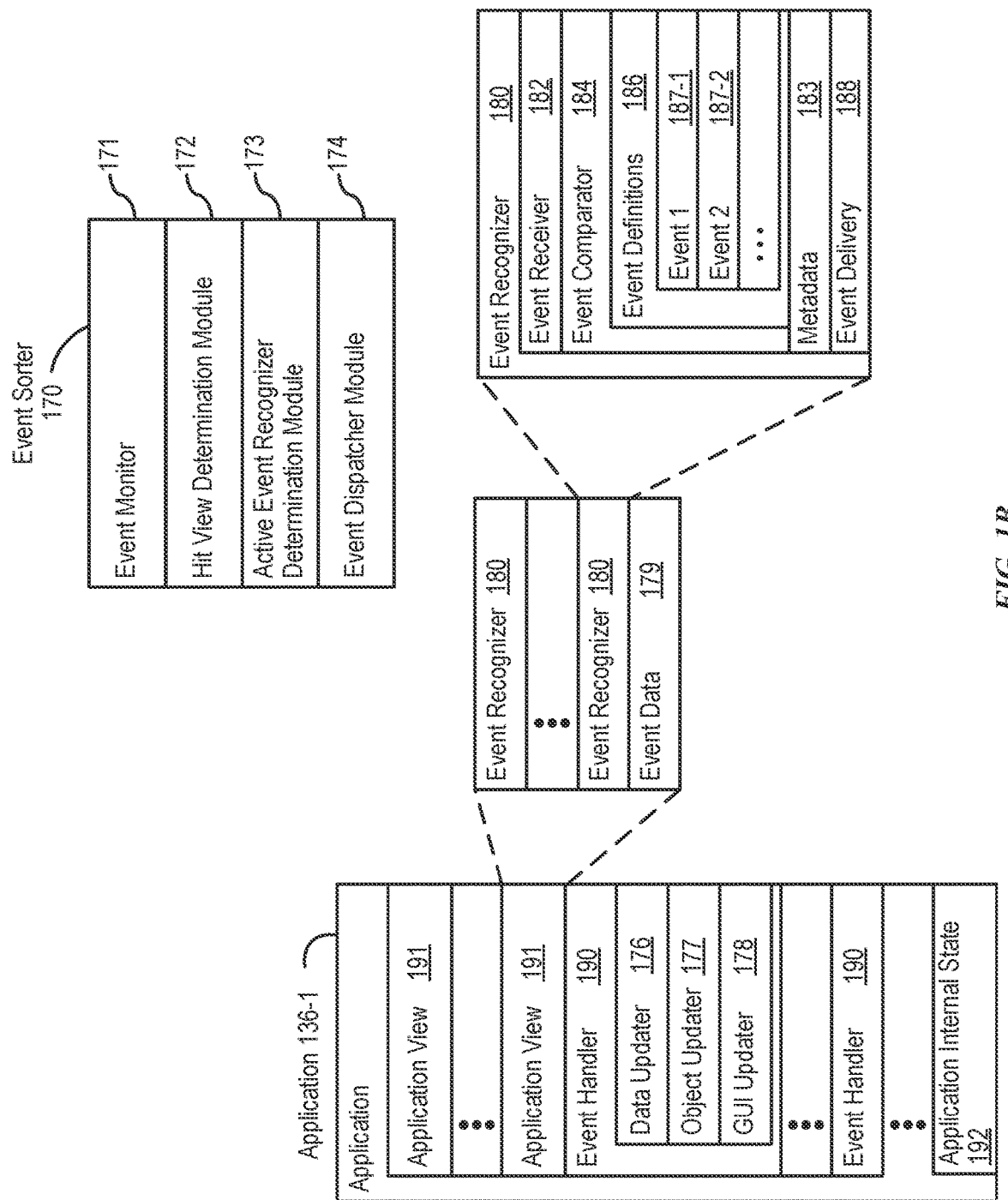
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
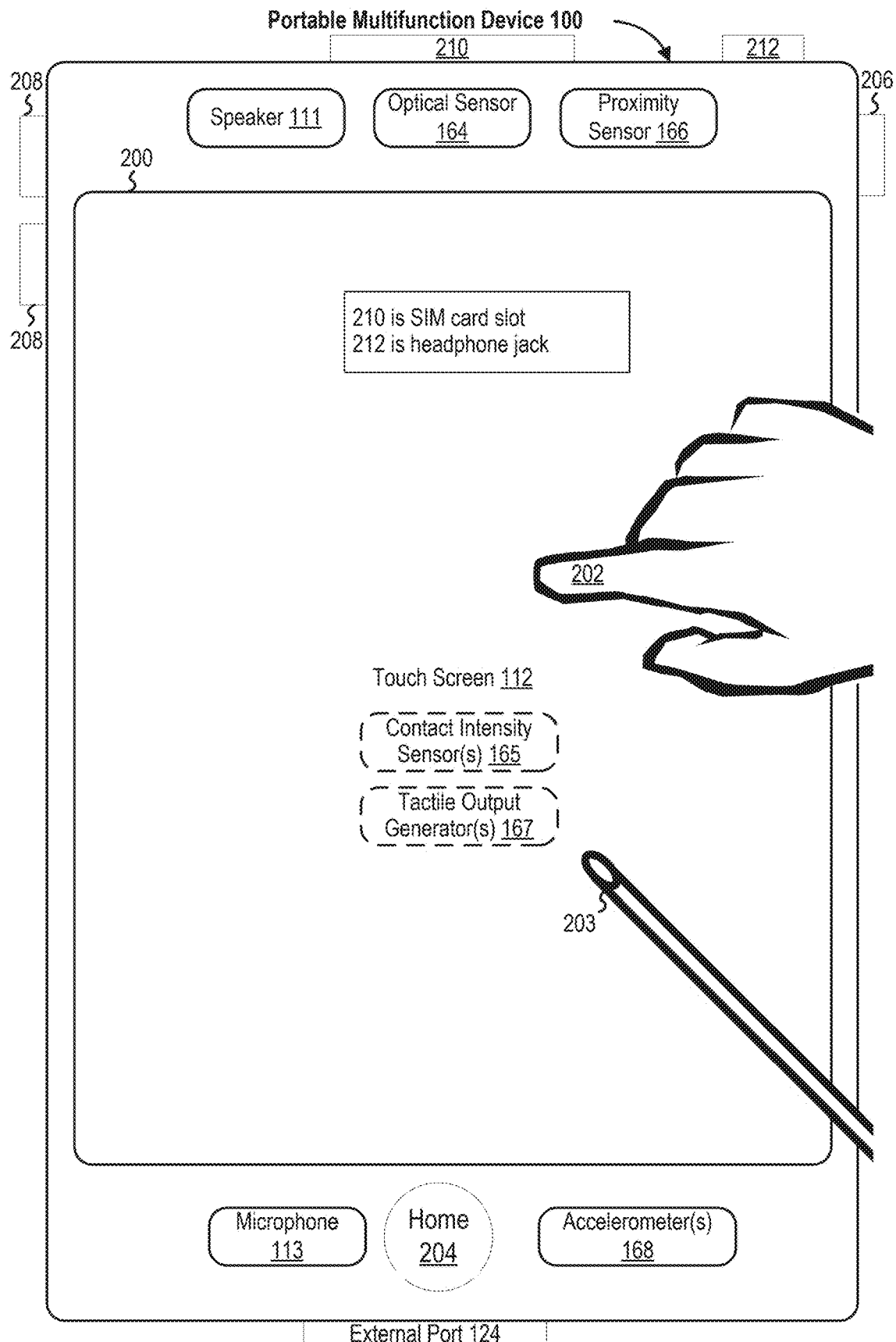
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
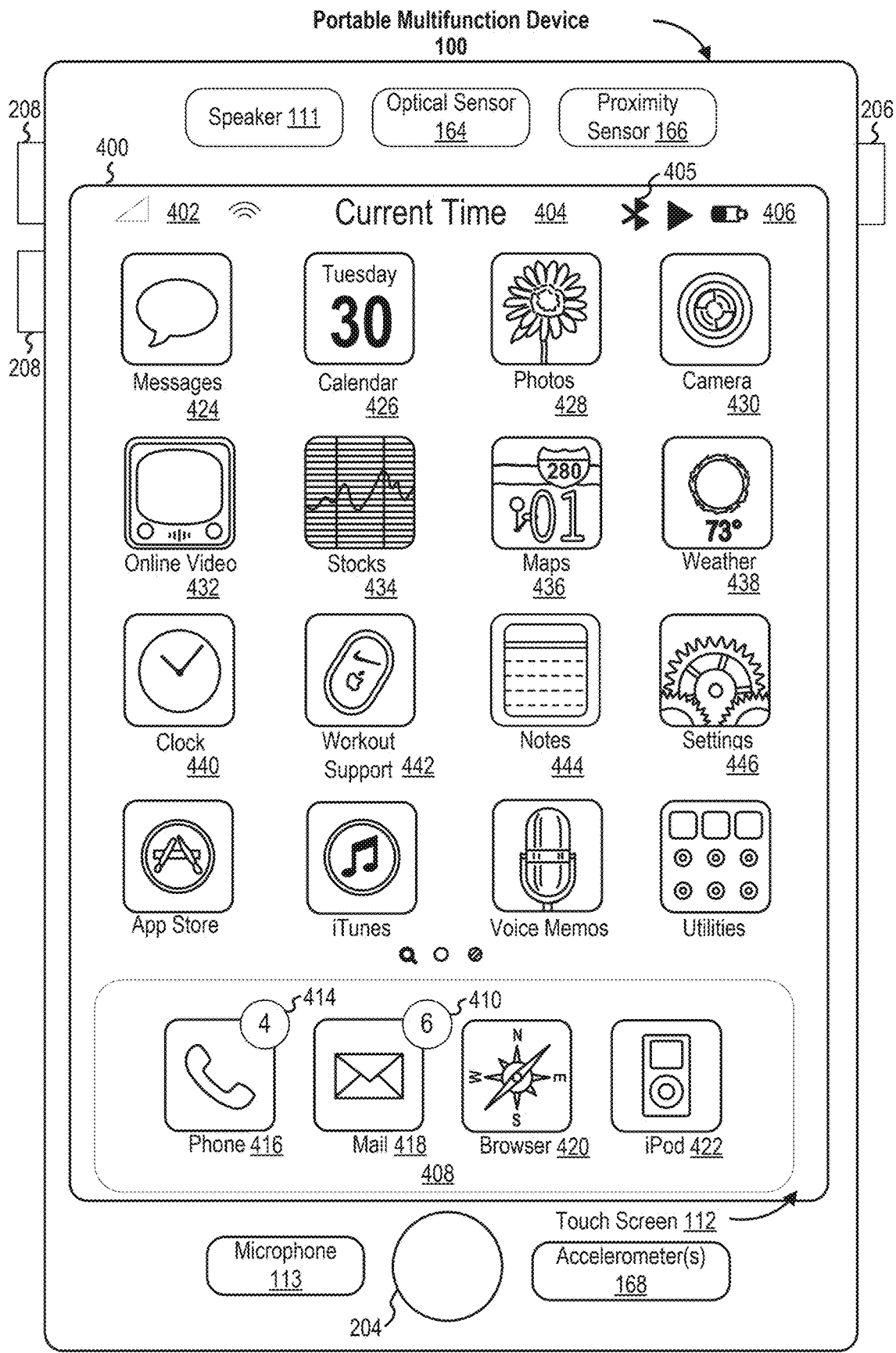
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
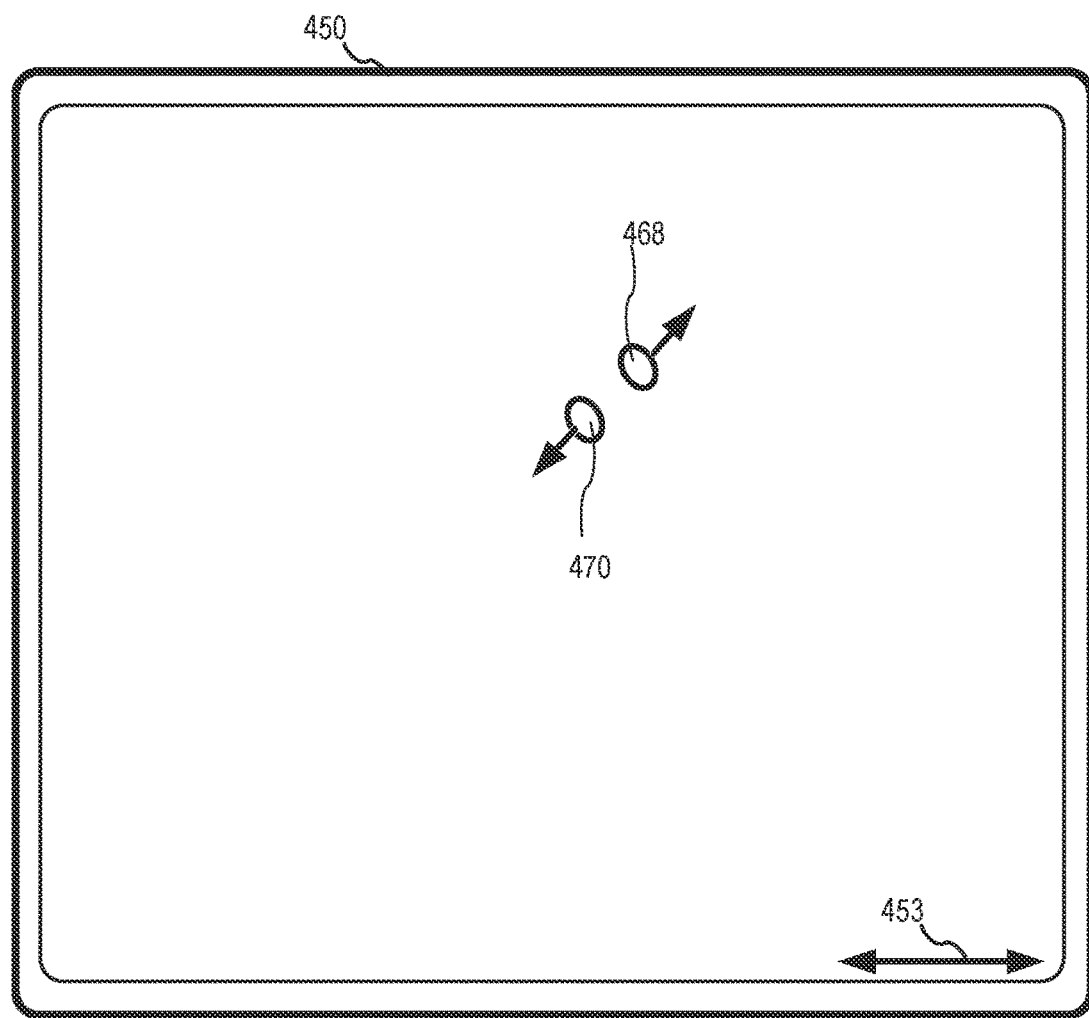
FIG. 4B illustrates an exemplary user interface for a multifunction device with a touch-sensitive surface that is separate from the display in accordance with some embodiments.
Figure 4B:
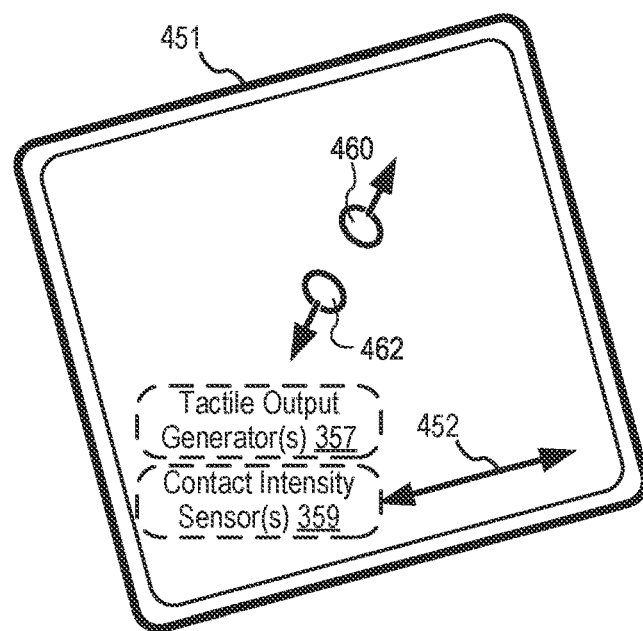

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
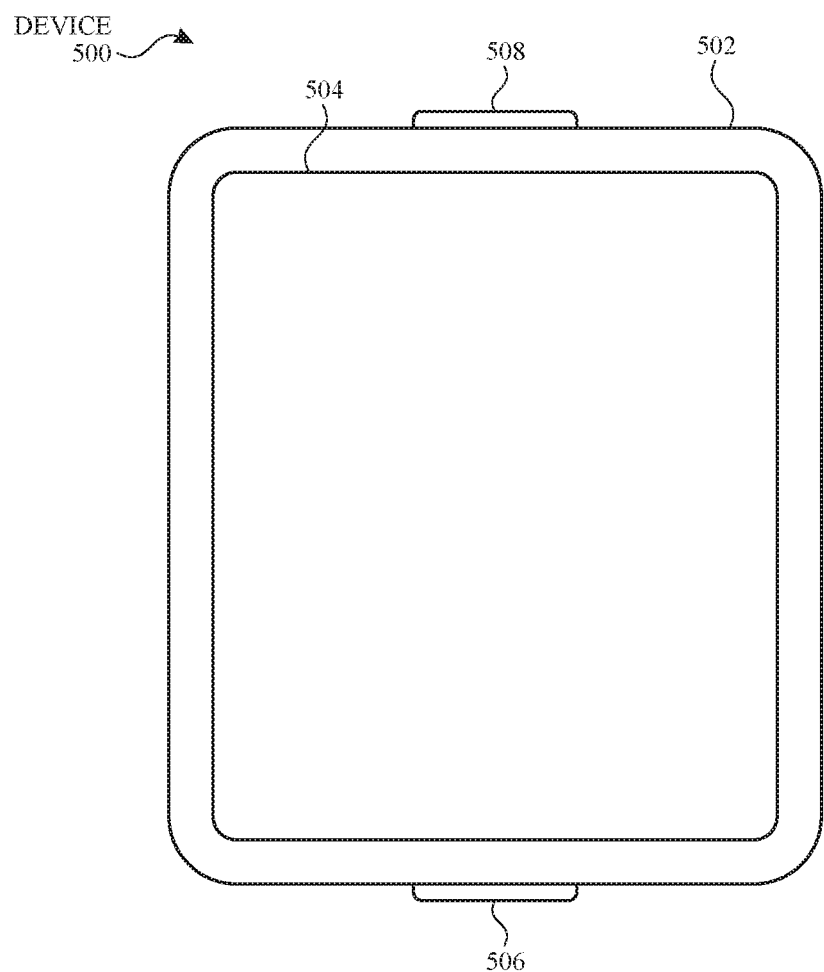
FIG. 5A illustrates a personal electronic device in accordance with some embodiments.
Figure 6A:
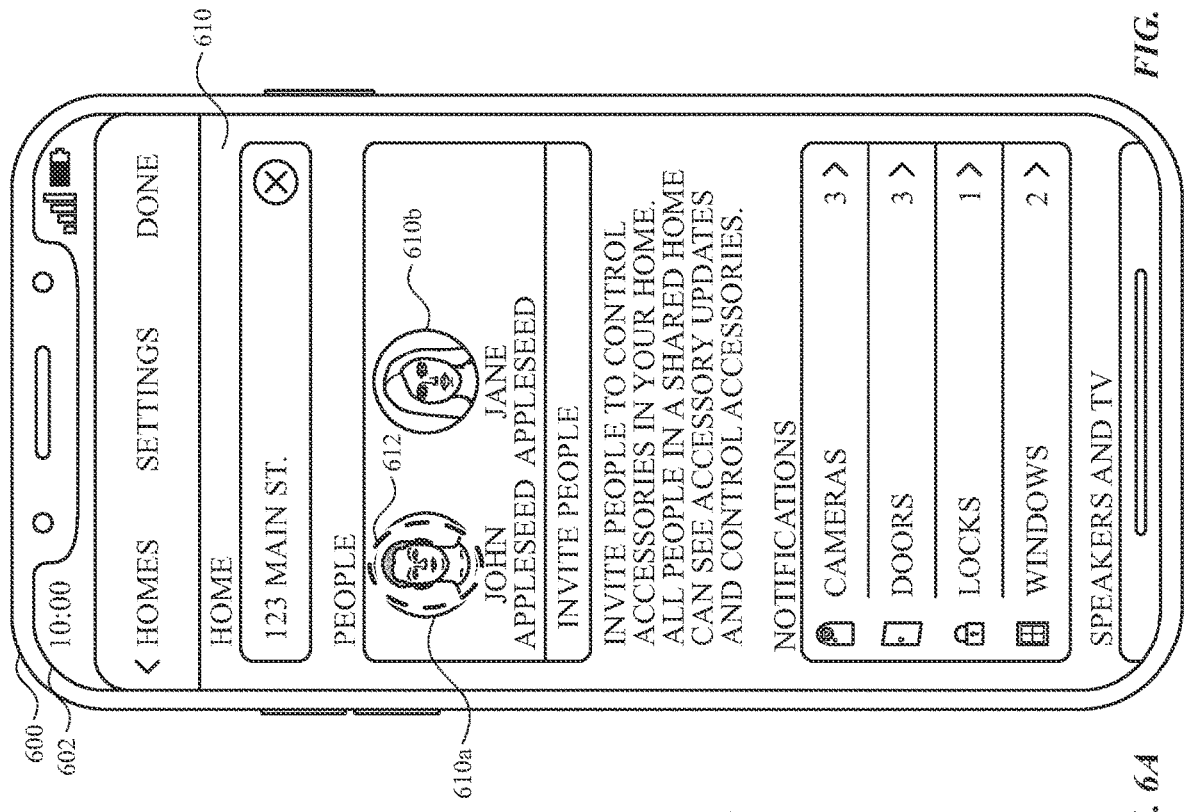
FIGS. 6A-6V illustrate exemplary user interfaces for managing user requests for specific operations and scenarios exemplifying the same.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
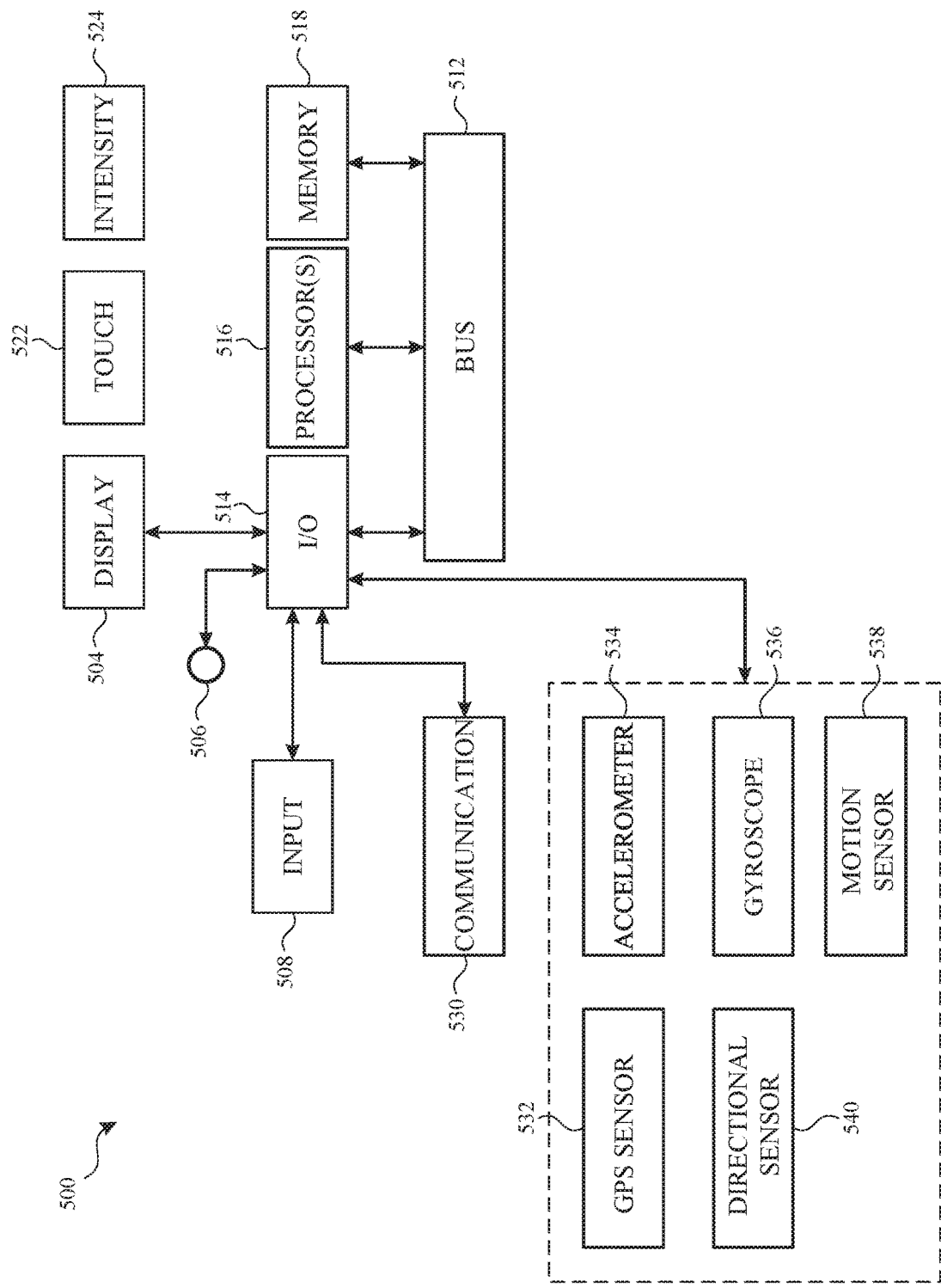
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700 (FIG. 7) and 900 (FIG. 9). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 5C:
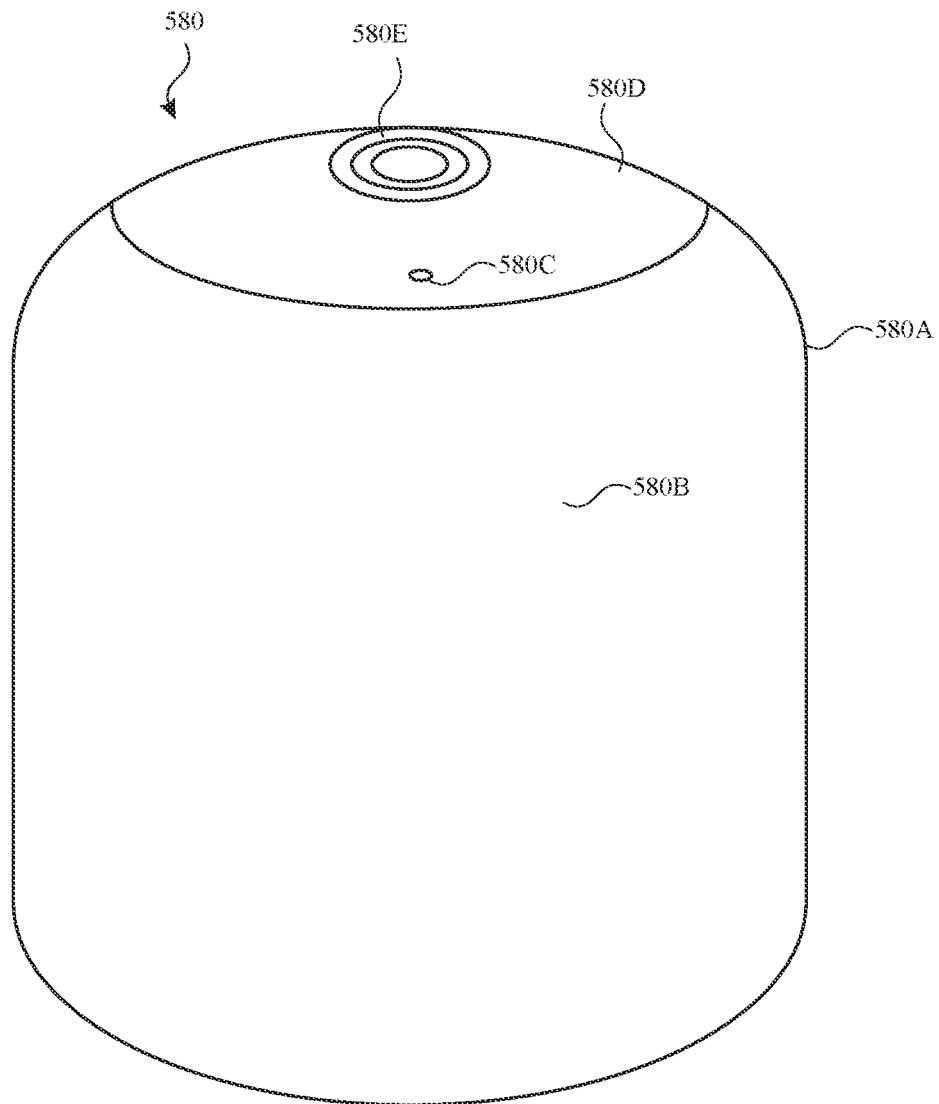
FIG. 5C illustrates an electronic device in accordance with some embodiments.

FIG. 5C illustrates exemplary electronic device 580. Device 580 includes body 580A. In some embodiments, device 580 can include some or all of the features described with respect to devices 100, 300, and 500 (e.g., FIGS. 1A-5B). In some embodiments, device 580 has one or more speakers 580B (concealed in body 580A), one or more microphones 580C, one or more touch-sensitive surfaces 580D, and one or more displays 580E. Alternatively, or in addition to a display and touch-sensitive surface 580D, the device has a touch-sensitive display (also referred to as a touchscreen). As with devices 100, 300, and 500, in some embodiments, touch-sensitive surface 580D (or the touch screen) optionally includes one or more intensity sensors for detecting intensity of contacts (e.g., touches) being applied. The one or more intensity sensors of touch-sensitive surface 580D (or the touchscreen) can provide output data that represents the intensity of touches. The user interface of device 580 can respond to touches based on their intensity, meaning that touches of different intensities can invoke different user interface operations on device 580. In some embodiments, the one or more displays 580E are one or more light-emitting diodes (LEDs). For example, a display can be a single LED, an LED cluster (e.g., a red, a green, and a blue LED), a plurality of discrete LEDs, a plurality of discrete LED clusters, or other arrangement of one or more LEDs. For example, the display 580E can be an array of nine discrete LED clusters arranged in a circular shape (e.g., a ring). In some examples, the one or more displays are comprised of one or more of another type of light-emitting elements.

Figure 5D:
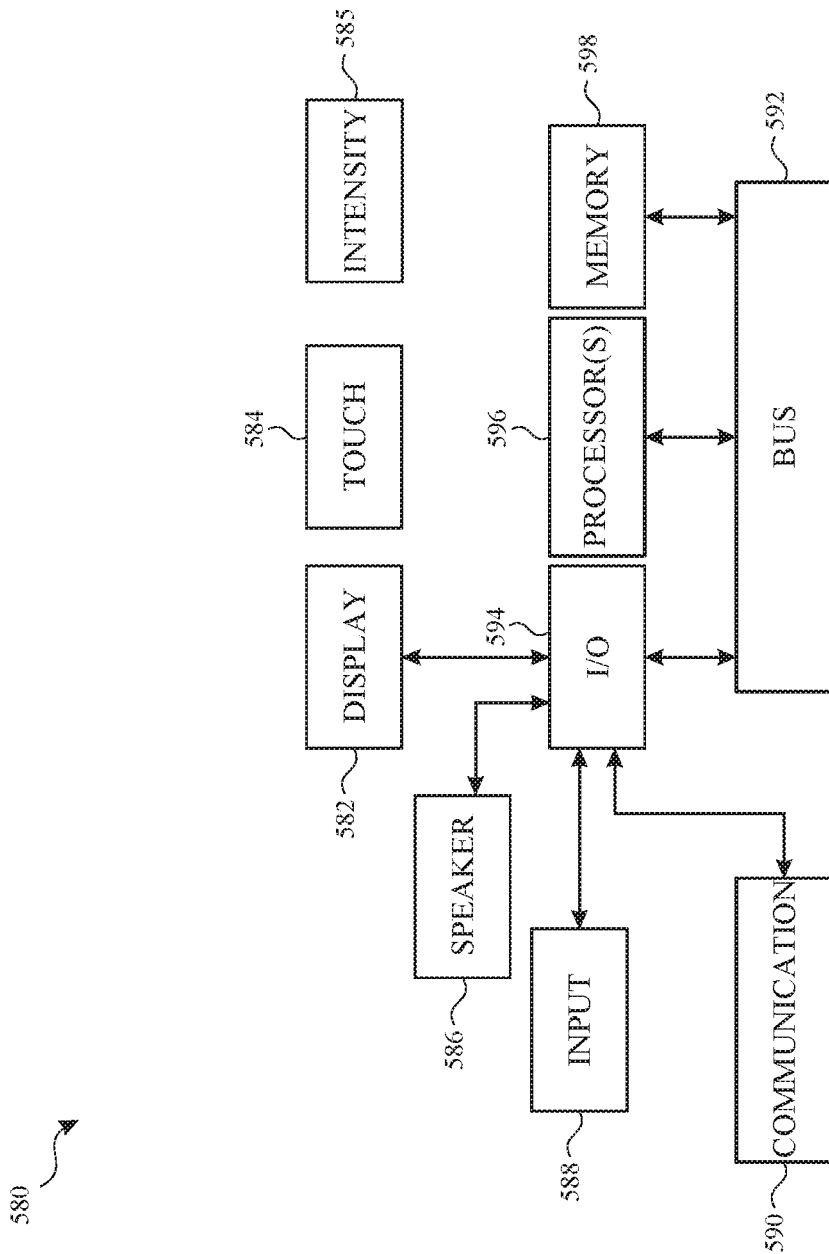
FIG. 5D is a block diagram illustrating an electronic device in accordance with some embodiments.

FIG. 5D depicts exemplary personal electronic device 580. In some embodiments, device 580 can include some or all of the components described with respect to FIGS. 1A, 1B, 3, and 5A-5B. Device 580 has bus 592 that operatively couples I/O section 594 with one or more computer processors 596 and memory 598. I/O section 594 can be connected to display 582, which can have touch-sensitive component 584 and, optionally, intensity sensor 585 (e.g., contact intensity sensor). In some embodiments, touch-sensitive component 584 is a separate component than display 582. In addition, I/O section 594 can be connected with communication unit 590 for receiving application and operating system data, using Wi-Fi, Bluetooth, near field communication (NFC), cellular, and/or other wireless communication techniques. Device 580 can include input mechanisms 588. Input mechanism 588 is, optionally, a button, in some examples. Input mechanism 588 is, optionally, a microphone, in some examples. Input mechanism 588 is, optionally, a plurality of microphones (e.g., a microphone array).

Electronic device 580 includes speaker 586 for outputting audio. Device 580 can include audio circuitry (e.g., in I/O section 594) that receives audio data, converts the audio data to an electrical signal, and transmits the electrical signal to speaker 586. Speaker 586 converts the electrical signal to human-audible sound waves. The audio circuitry (e.g., in I/O section 594) also receives electrical signals converted by a microphone (e.g., input mechanism 588) from sound waves. The audio circuitry (e.g., in I/O section 594) converts the electrical signal to audio data. Audio data is, optionally, retrieved from and/or transmitted to memory 598 and/or RF circuitry (e.g., in communication unit 590) by I/O section 594.

Memory 598 of personal electronic device 580 can include one or more non-transitory computer-readable storage mediums, for storing computer-executable instructions, which, when executed by one or more computer processors 596, for example, can cause the computer processors to perform the techniques described below, including processes 700 (FIG. 7) and 900 (FIG. 9). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 580 is not limited to the components and configuration of FIG. 5D, but can include other or additional components in multiple configurations.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, device 500, or device 580.

FIGS. 6A-6V illustrate exemplary user interfaces for managing user requests for specific operations, in accordance with some embodiments. The user interfaces in these figures are used to illustrate the processes described below, including the processes in FIG. 7.

FIGS. 6A-6F illustrate various user interfaces for configuring user-specific settings relating to personal requests (e.g., requests that require the output of personal data (e.g., media; voicemail; text messages; e-mails; events; to-do items/lists) associated with one or more specific users) within a home network. Each user account associated with a home network has configurable settings that are independent of other users associated with the home network. Devices associated with the home network have configurable settings that are independent of other devices and, in some embodiments, are dependent on the settings of users associated with the home network. In some embodiments, device settings can supersede settings configured for each user account, under certain circumstances as discussed in more detail, below.

In FIG. 6A, electronic device 600 (e.g., a smart phone) displays, on touchscreen display 602, time indication 604*a* (showing the current time of 10:00 (e.g., AM)) and home user interface 606. Device 600 is part of a home network (e.g., a collection of one or more networked devices that are associated with one or more users) called "123 MAIN ST.," which includes a variety of external devices (e.g., lights, speakers, sensors (e.g., smoke detectors; carbon monoxide detectors)) that can be controlled from home user interface 606. In some embodiments, additional external devices (e.g., door locks, window locks, security cameras, televisions, outlets) are connected to the home network. In particular, device 600 is connected to (e.g., in communication with) three sets of one or more electronic devices for audio output (e.g., smart speakers (e.g., electronic devices 603*a*-603*d*, as discussed further with respect to FIG. 6G)) represented by speaker affordances 606*b*, 606*c*, and 606*d* on home user interface 606. In some embodiments, in response to a set of inputs starting with the selection of speaker affordance 606*b* (e.g., "DINING ROOM SPEAKER"), device 600 displays an external device settings user interface corresponding to the electronic device (e.g., smart speaker) associated with speaker affordance 606*b* (e.g., electronic device 603*b*, "DINING ROOM SPEAKER," of FIG. 6G). In some embodiments, the external device settings user interface includes configurable settings for enabling or disabling voice recognition (e.g., identifying a user after receiving a voice input (e.g., speech input)). In some embodiments, if a speaker has voice recognition disabled, the speaker's voice cannot be used to make personal requests, which are requests that provide information that is unique to the speaker. Personal requests which will be discussed with greater detail below. In some embodiments, similar external device settings user interfaces are displayed in response to selection of speaker affordances 606c and 606d. In some embodiments, device 600 includes one or more features of devices 100, 300, and/or 500. In some embodiments, devices 603a-603d include one or more features of devices 100, 300, 500, and/or 580.

Figure 6B:
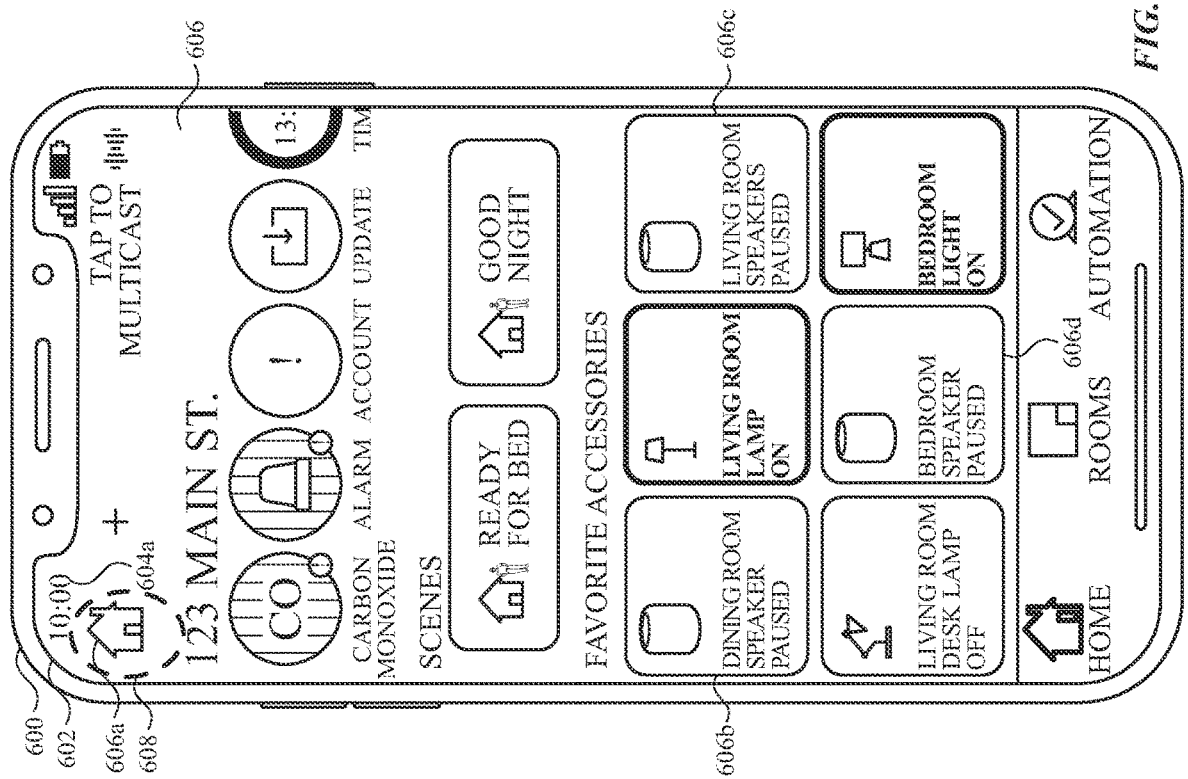

Home user interface 606 of FIG. 6A further includes settings affordance 606a. Device 600 detects tap input 608 corresponding to selection of settings affordance 606a. In response to detecting tap input 608, device 600 displays settings user interface 610, as shown in FIG. 6B. In some embodiments, in response to detecting a tap input corresponding to selection of settings affordance 606a, device 600 displays a menu for navigating to either settings user interface 610 or, if device 600 is authorized to access additional homes (e.g., smart home networks), additional home user interfaces similar to home user interface 606. In some embodiments, device 600 receives a set of tap inputs that includes tap 608 and, in response to receiving the set of tap inputs, displays settings user interface 610.

In FIG. 6B, device 600 displays settings user interface 610 on touchscreen display 602. Settings user interface 610 includes a variety of configurable settings relating to the home network for "123 MAIN ST." In particular, settings user interface 610 includes user affordance 610a, representing that user "JOHN APPLESEED" is a member of the home and user affordance 610b, representing that user "JANE APPLESEED" is also a member of the home. In this example, device 600 and home network "123 MAIN ST." are associated with John (e.g., John is the primary user of home network "123 MAIN ST." John may have initially created home network "123 MAIN ST."). In some embodiments, in response to detecting a set of tap inputs starting on the "INVITE PEOPLE" affordance, device 600 sends invitations to contacts (e.g., family members, friends) to become members of home network "123 MAIN ST." In FIG. 6B, Jane has previously accepted an invitation to become a member of home network "123 MAIN ST.", as indicated by Jane's user affordance 612b shown on settings user interface 610.

Device 600 detects tap input 612 corresponding to selection of John's user affordance 610a. In response to receiving tap input 612, device 600 displays personal settings user interface 614 on touchscreen display 602, as shown in FIG. 6C. Personal settings user interface 614 includes various user settings (e.g., digital assistant settings; media settings; remote access settings; notification settings; and/or home security settings) corresponding to John's user account, including voice recognition setting 614a, shown toggled to the "ON" position, and personal request setting 614b, shown as "OFF." Voice recognition setting 614a and personal request setting 614b are settings that configure how an electronic device (e.g., a device associated with John's user account, such as speaker 603a) processes user interactions within the home network for the displayed user account (e.g., John's user account). In some embodiments, in response to a tap input corresponding to Jane's user affordance 610b, device 600 displays a personal settings user interface corresponding to Jane's user account, similar to personal settings user interface 614 corresponding to John's user account in FIG. 6C.

In FIG. 6C, device 600 detects tap input 616 corresponding to selection of personal request setting 614b. In response to receiving tap input 616, device 600 displays personal request user interface 618 associated with John's user account on touchscreen display 602, as shown in FIG. 6D. Personal request user interface 618 includes speaker affordance 618a (e.g., "BEDROOM SPEAKER"), speaker affordance 618b (e.g., "DINING ROOM SPEAKER"), and speaker affordance 618c (e.g., "LIVING ROOM SPEAKERS"). Each of the speaker affordances correspond to a set of one or more electronic devices (e.g., smart speakers) connected to home network "123 MAIN ST." As shown in FIG. 6D, each of the speaker affordances 618a-618c include toggles that are in the "OFF" position, indicating that the electronic devices (e.g., smart speakers) associated with speaker affordances 618a-618c are not currently configured to perform (e.g., process) personal requests for John (e.g., when the electronic device recognizes that a speech input was from John (e.g., via voice recognition)). In some embodiments, the electronic devices (e.g., smart speakers) associated with speaker affordances 618a-618c shown on personal request user interface 618 have voice recognition enabled and, therefore, can process personal requests. In some embodiments, electronic devices (e.g., smart speakers) that have voice recognition disabled do not have a corresponding speaker affordance shown on personal request user interface 618. In some embodiments, for an electronic device (e.g., smart speaker) that has voice recognition disabled, personal request user interface 618 includes a corresponding speaker affordance that is not configurable (e.g., disabled; cannot be modified (e.g., is shown as grayed out; is shown as blurred)).

In FIG. 6D, device 600 receives tap inputs 620a and 620b corresponding to the selection of the toggles in speaker affordances 618a and 618b, respectively. As shown in FIG. 6E, in response to receiving tap inputs 620a and 620b, device 600 continues displaying personal request user interface 618, now with speaker affordances 618a and 618b including toggles that are in the "ON" position. Speaker affordances 618a and 618b with toggles that are in the "ON" position indicate that the electronic devices (e.g., smart speakers) associated with speaker affordances 618a and 618b are able to perform (e.g., process) personal requests for John (e.g., when the electronic device recognizes that a speech input was from John (e.g., via voice recognition)).

In FIG. 6E, in addition to including speaker affordances 618a-618c, personal request user interface 618 includes activity notification affordance 618d. Activity notification affordance 618d is included on personal request user interface 618 when personal requests are enabled for one or more electronic devices (e.g., smart speakers) for the given user, as currently indicated by speaker affordances 618a and 618b having toggles in the "ON" position. Activity notification affordance 618d includes a toggle that is in the "ON" position, indicating that device 600 will display a notification when a personal request has been performed by the electronic devices (e.g., smart speaker) associated with speaker affordances 618a and 618b. In some embodiments, activity notifications can be enabled per electronic device (e.g., device 600 displays a notification for a personal request completed by the bedroom speaker, but does not display a notification for a personal request completed by the dining room speaker). In some embodiments, activity notifications can provide users with better feedback about requests that are being made for their personal information, which can also improve security and privacy (e.g., by notifying users of unauthorized requests and disclosure of personal information). In FIG. 6E, device 600 detects tap input 622 corresponding to selection of the toggle in activity notification affordance 618d.

As shown in FIG. 6F, in response to receiving tap input 622, device 600 displays, on touchscreen display 602, personal request user interface 618 with the toggle of activity notification affordance 618d in the "OFF" position. Activity notification affordance 618d showing the toggle in the "OFF" position indicates that device 600 will not display a notification (e.g., notifications are disabled) when a personal request has been performed by the electronic devices (e.g., smart speaker) associated with speaker affordances 618a and 618b. In some embodiments, when personal requests are first enabled for an electronic device (e.g., smart speaker), activity notification affordance 618d is shown with the toggle in the "OFF" position, as in FIG. 6F, rather than in the "ON" position shown in FIG. 6E. In some embodiments, selection of the toggle in the "OFF" position in activity notification affordance 618d re-enables notifications.

In some embodiments, an electronic device (e.g., smart phone) belonging to Jane Appleseed displays personal request settings associated with Jane's user account analogous to those configurable in personal request user interface 618 associated with John's user account. In some embodiments, the personal request settings configured for a first user account are independent of the personal request settings configured for a second user account (e.g., John's personal request settings are unaffected by Jane's personal request settings), and therefore, multiple user accounts can have different configurations for their respective personal request settings.

Figure 6G:
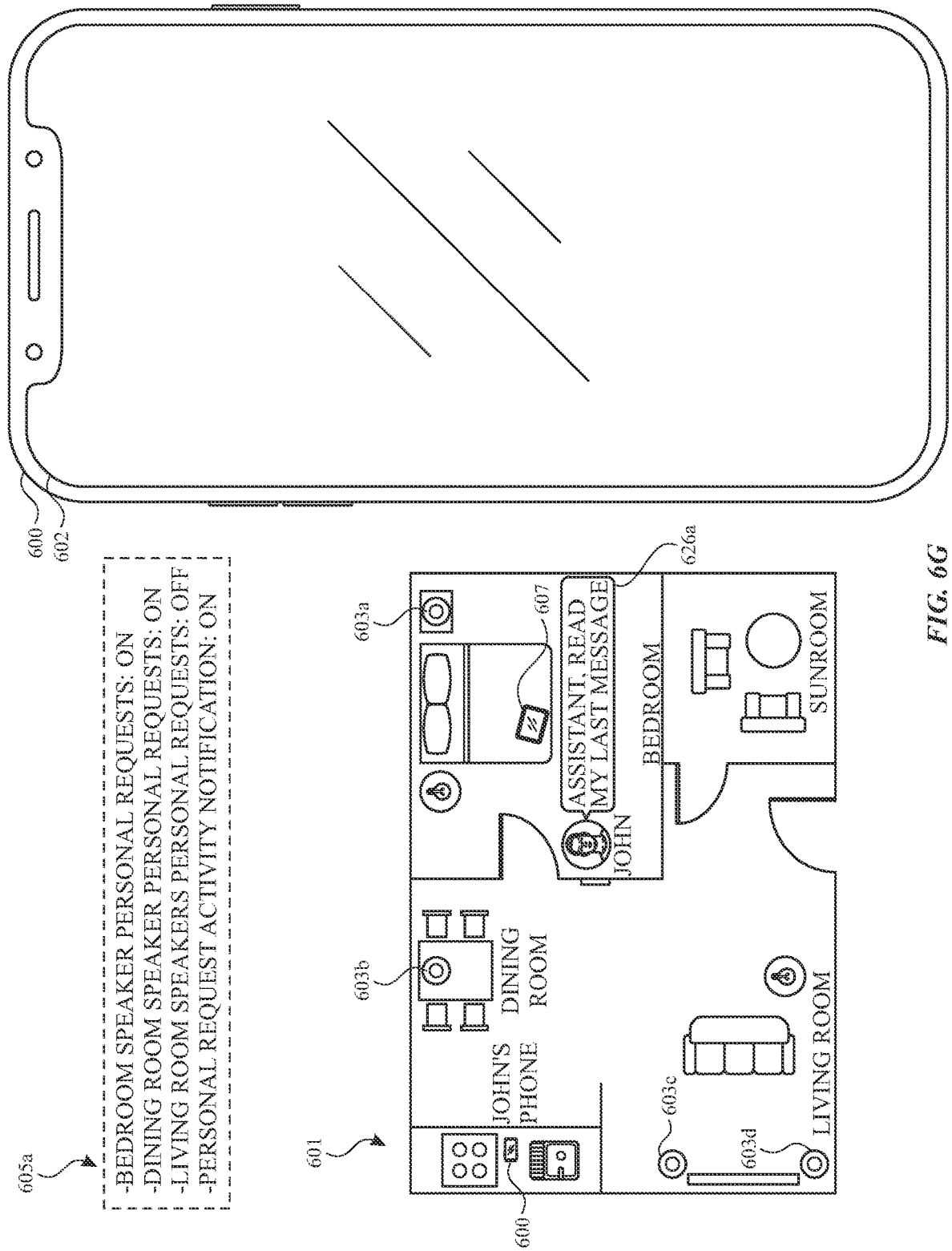
Figure 6H:
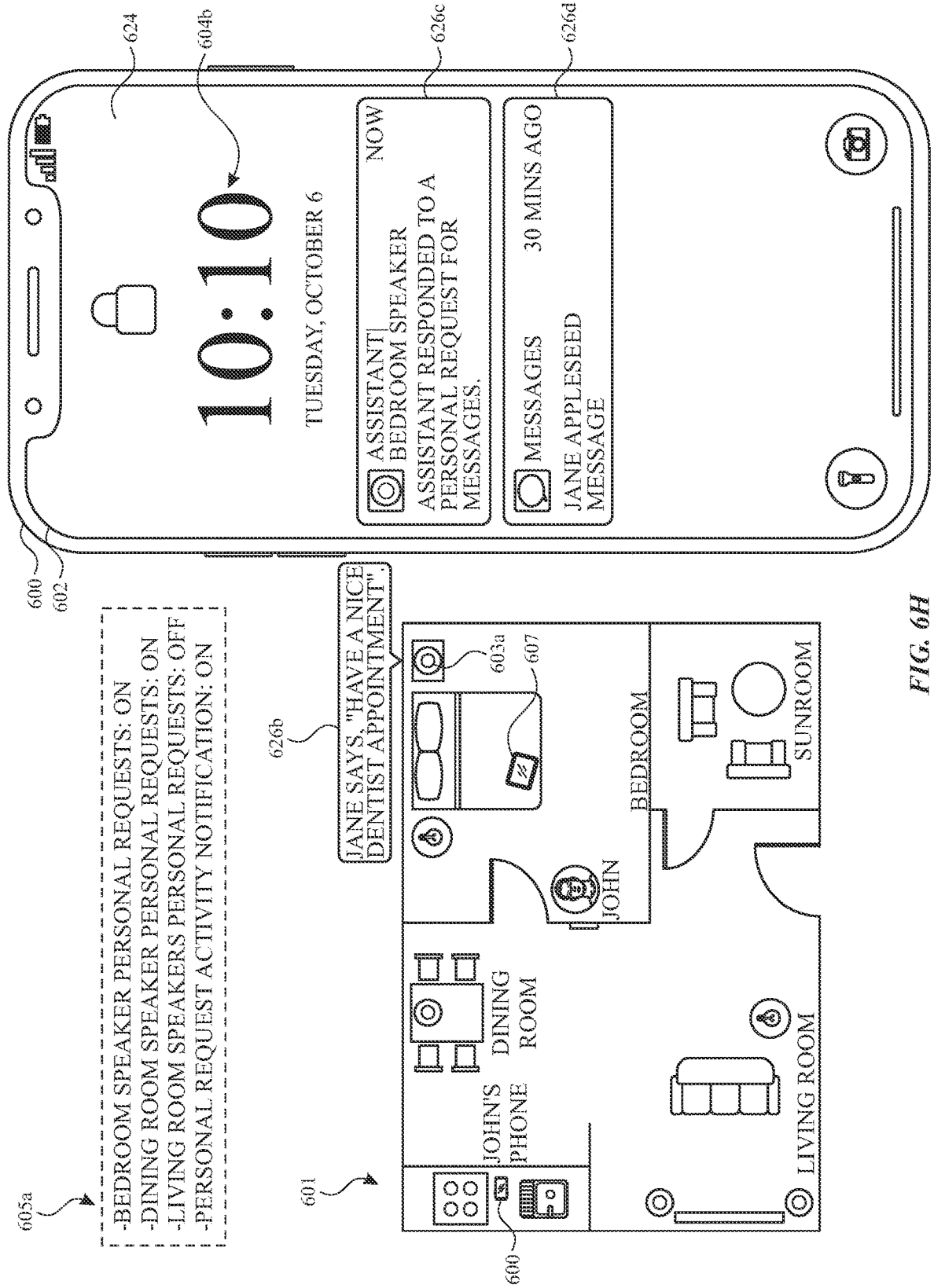
Figure 6I:
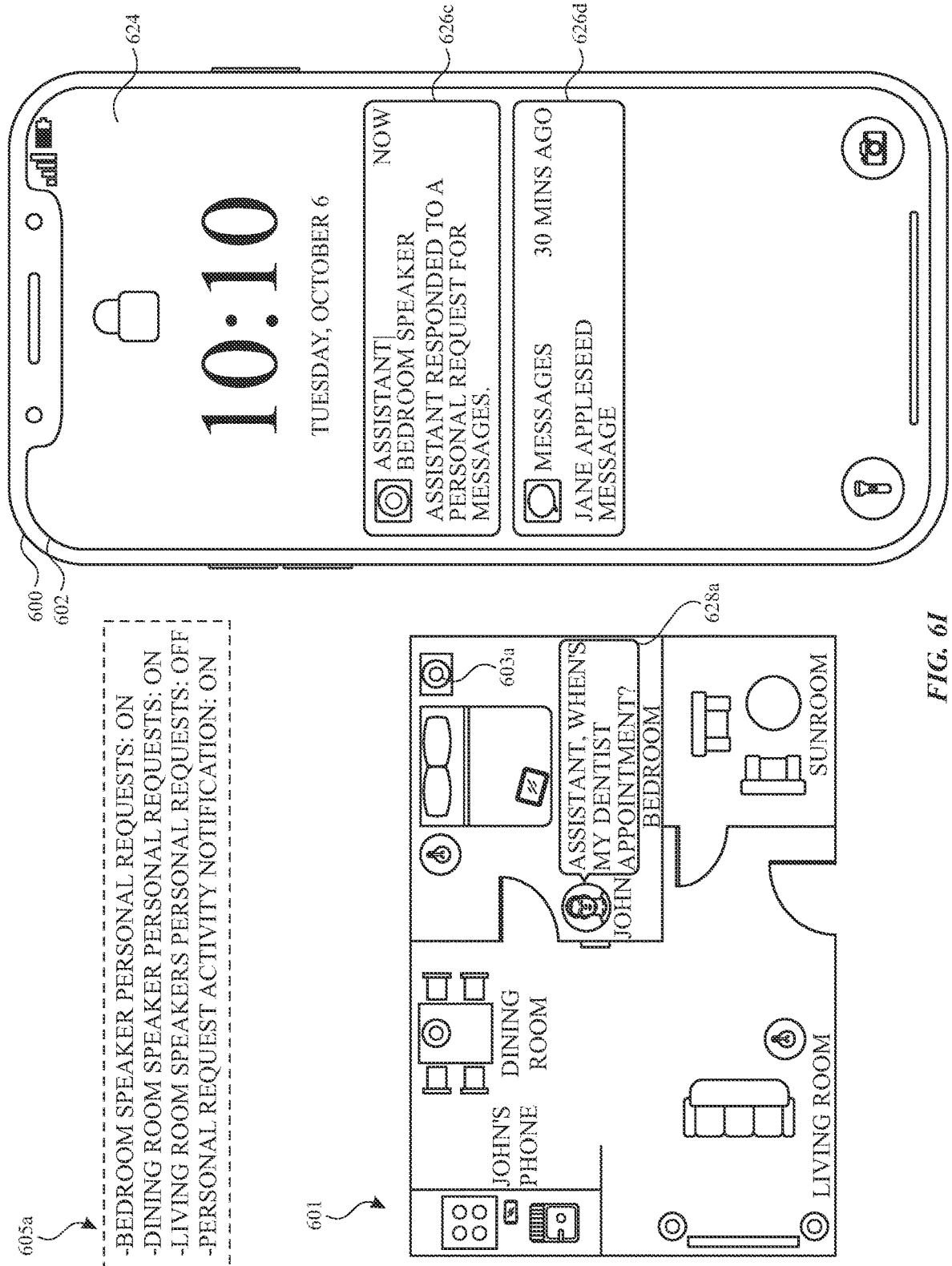
Figure 6J:
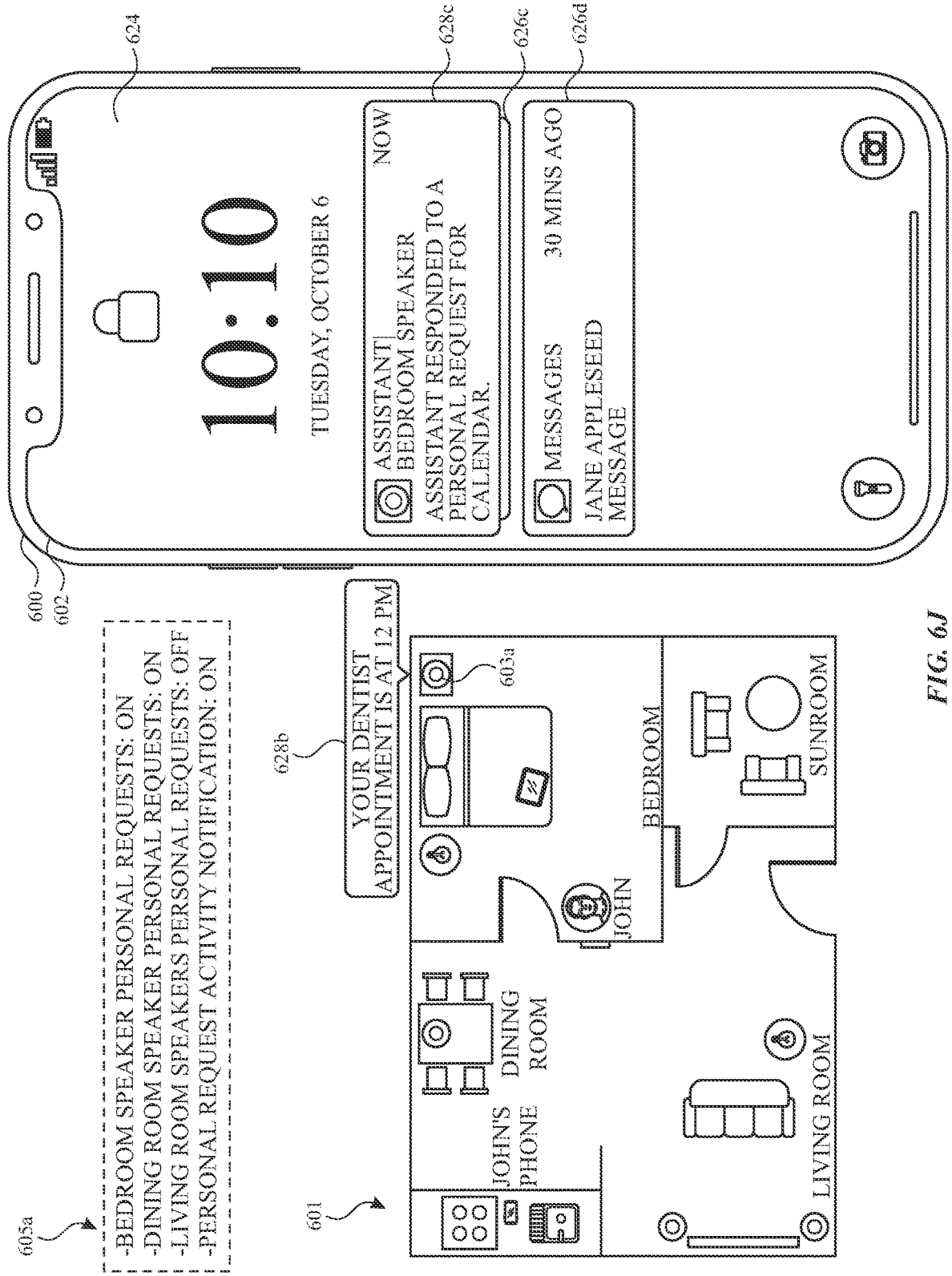
Figure 6K:
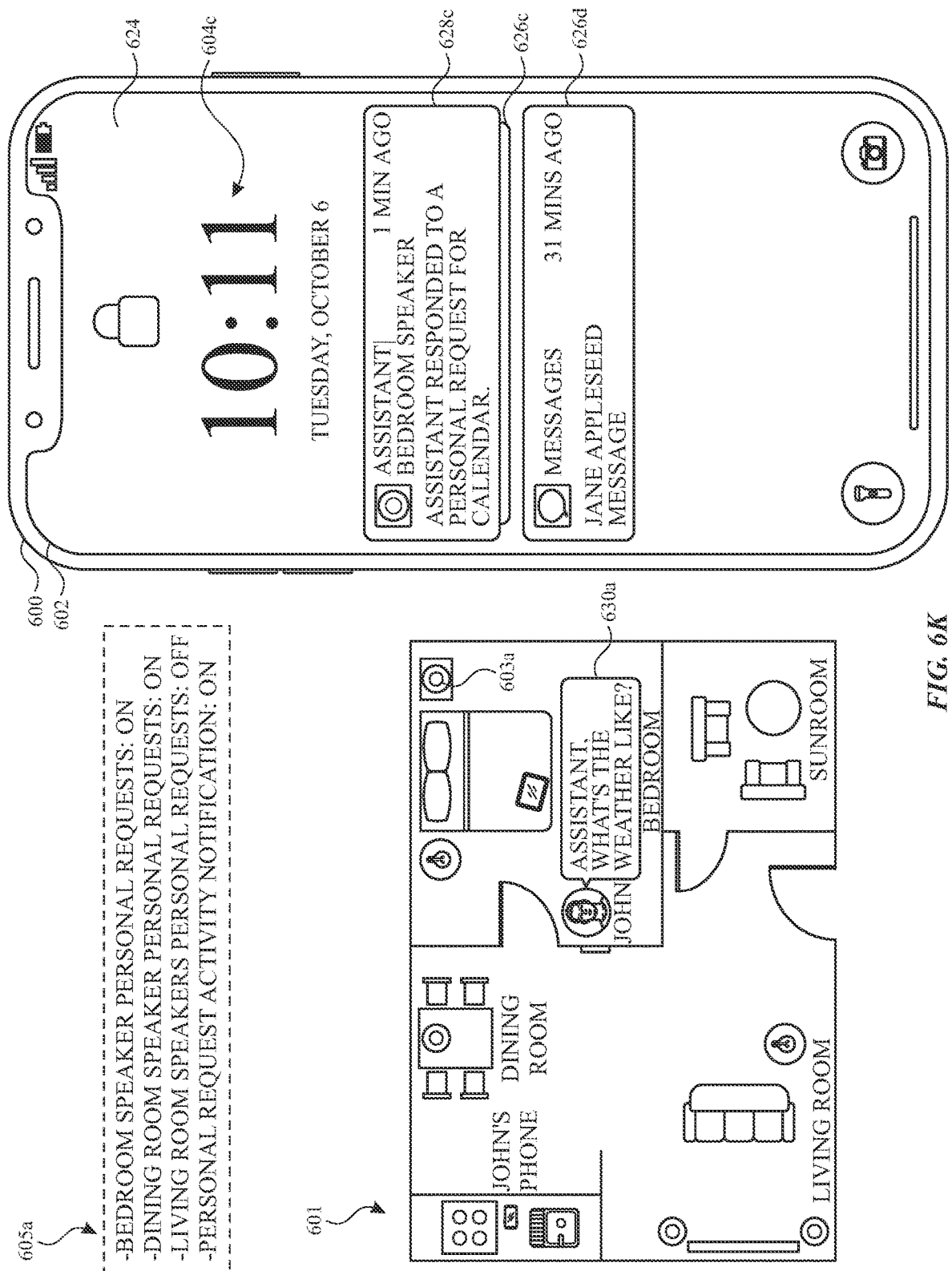
Figure 6L:
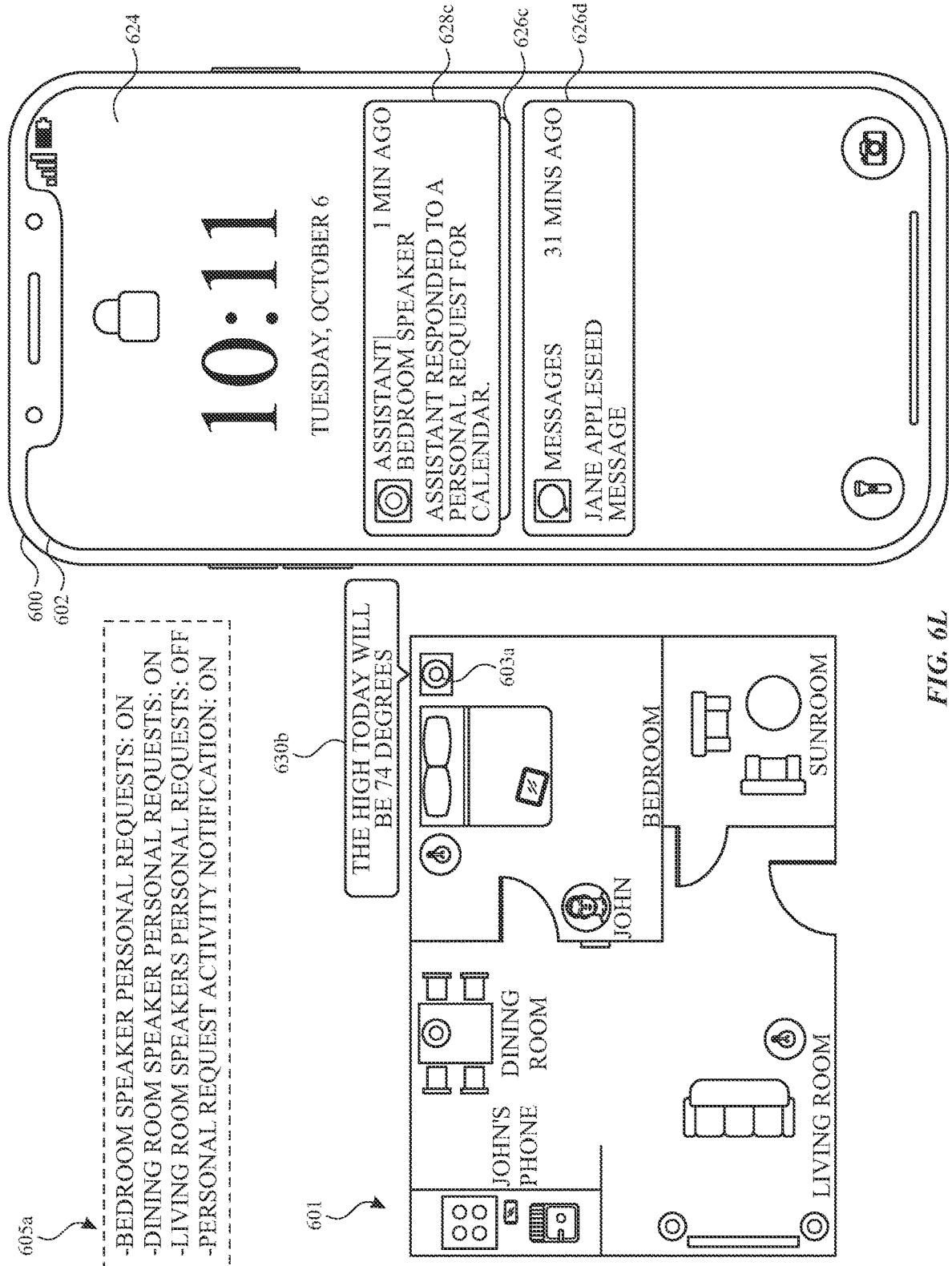
Figure 6M:
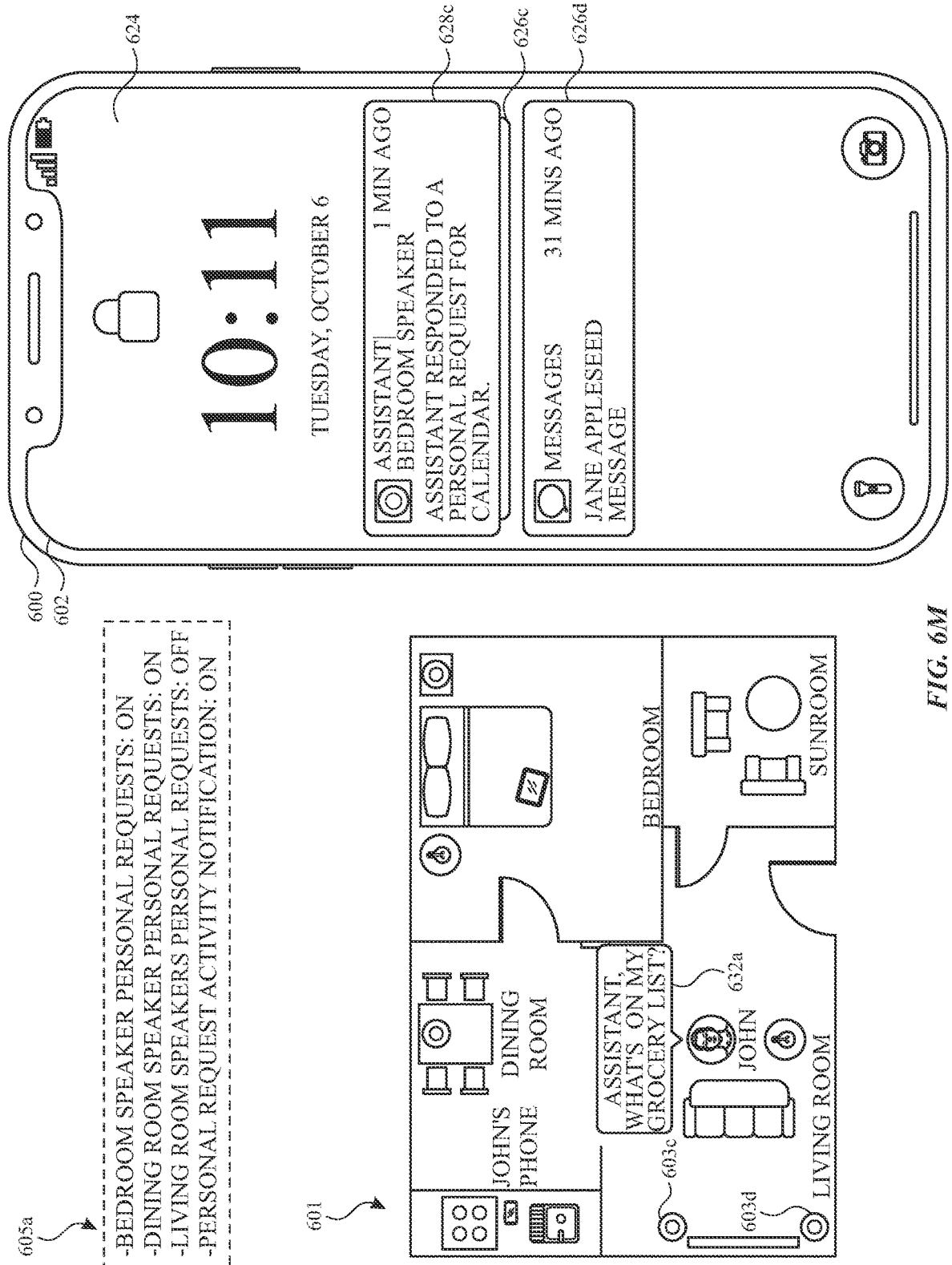
Figure 6N:
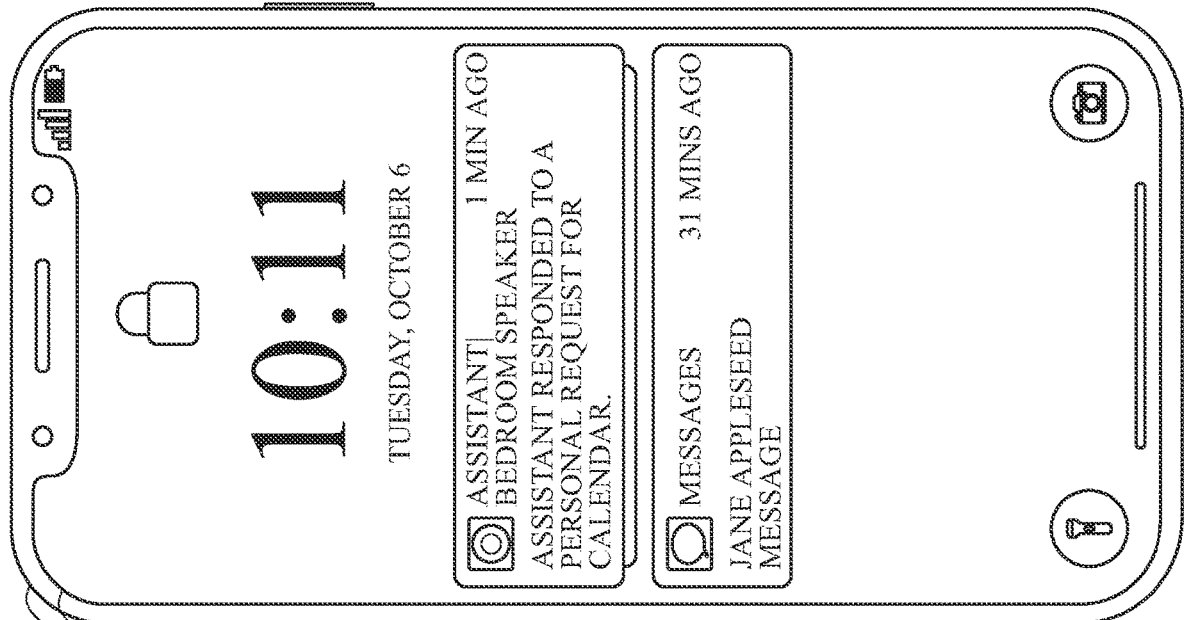
Figure 6N:
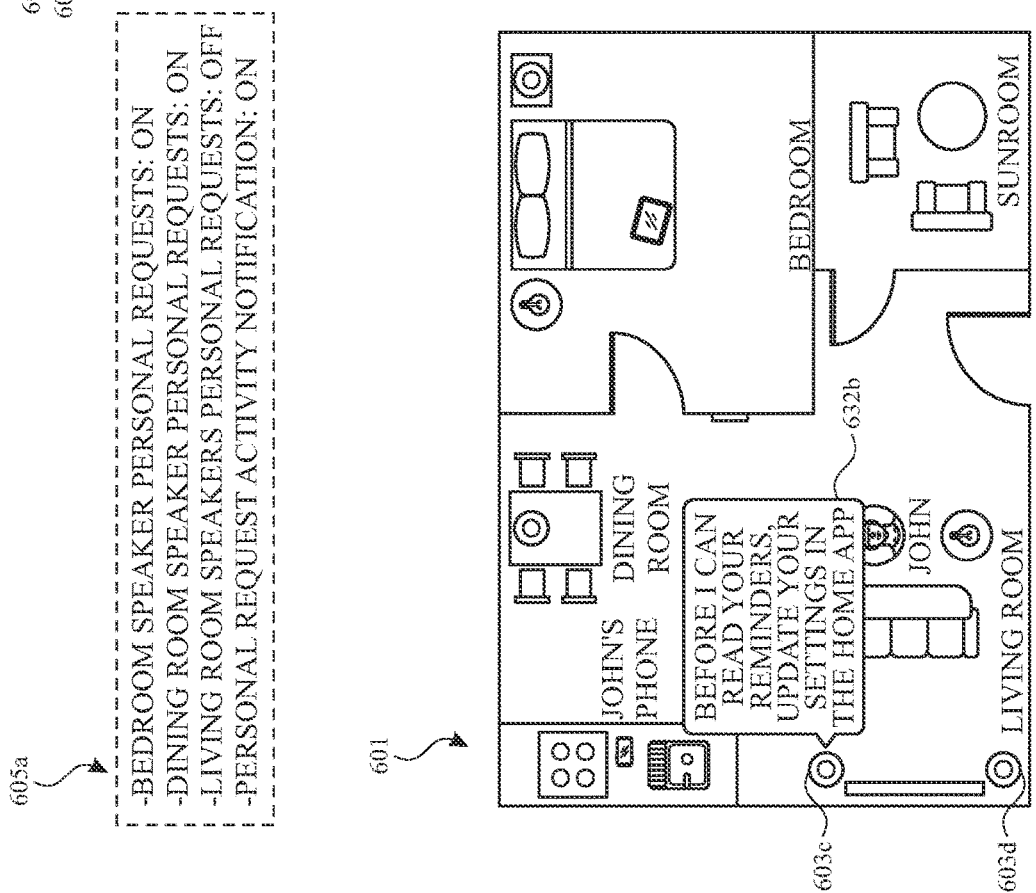
Figure 6O:
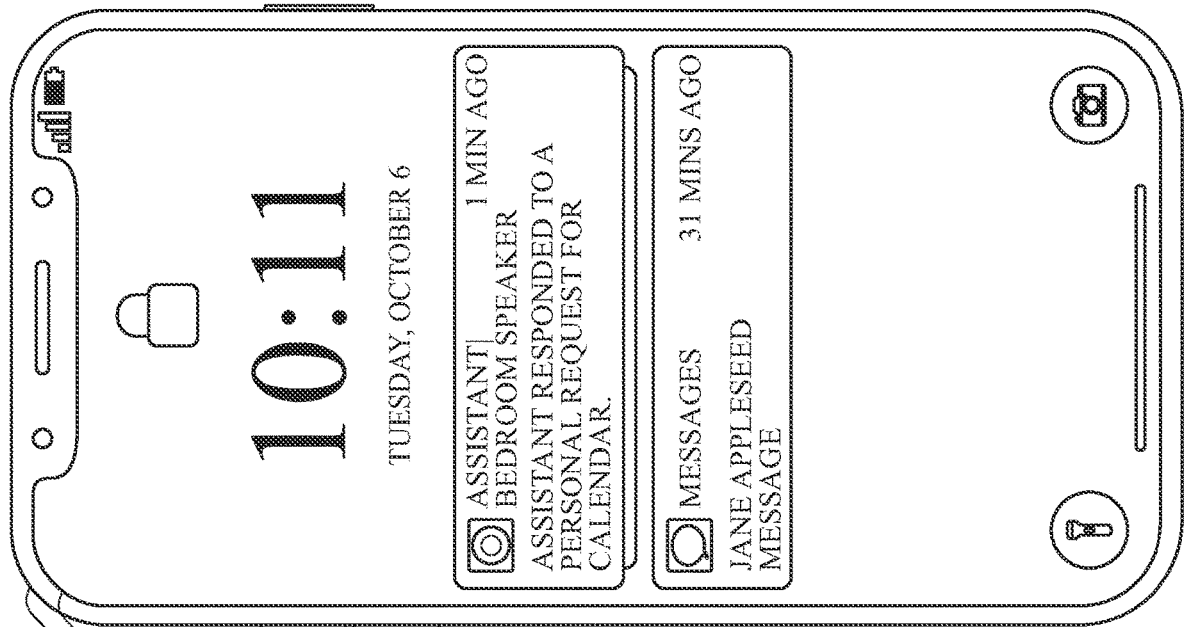
Figure 6O:
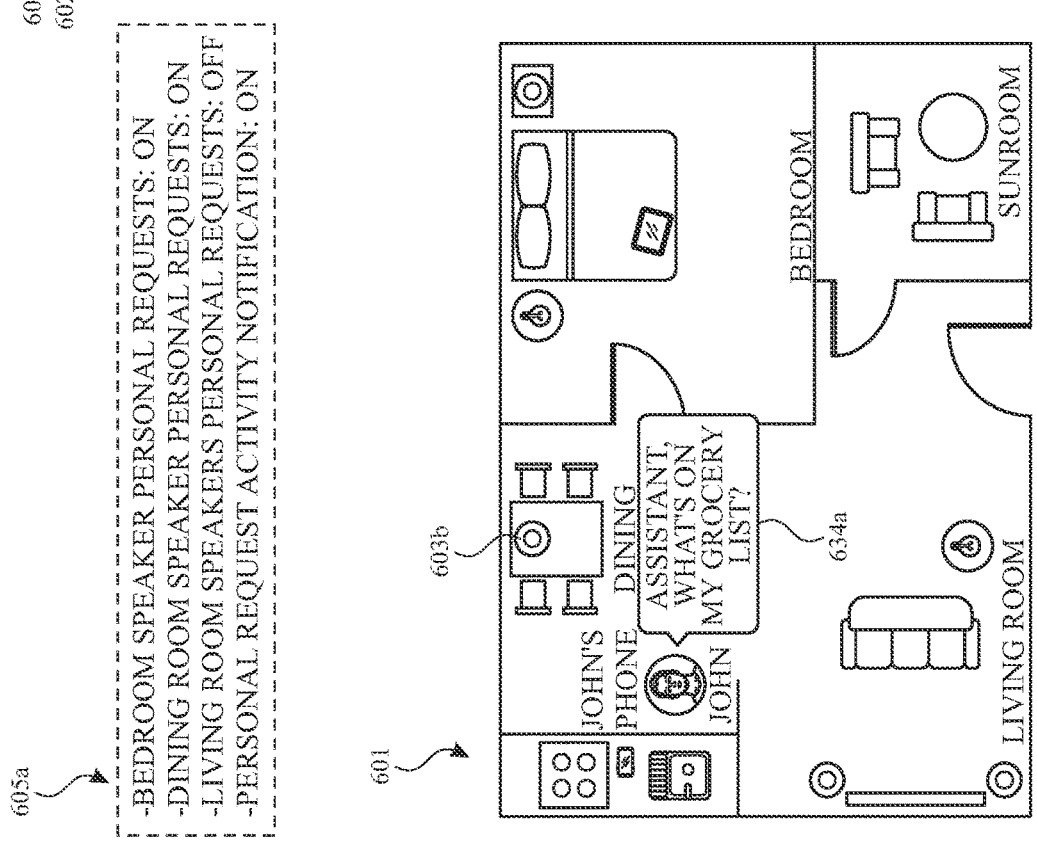
Figure 6P:
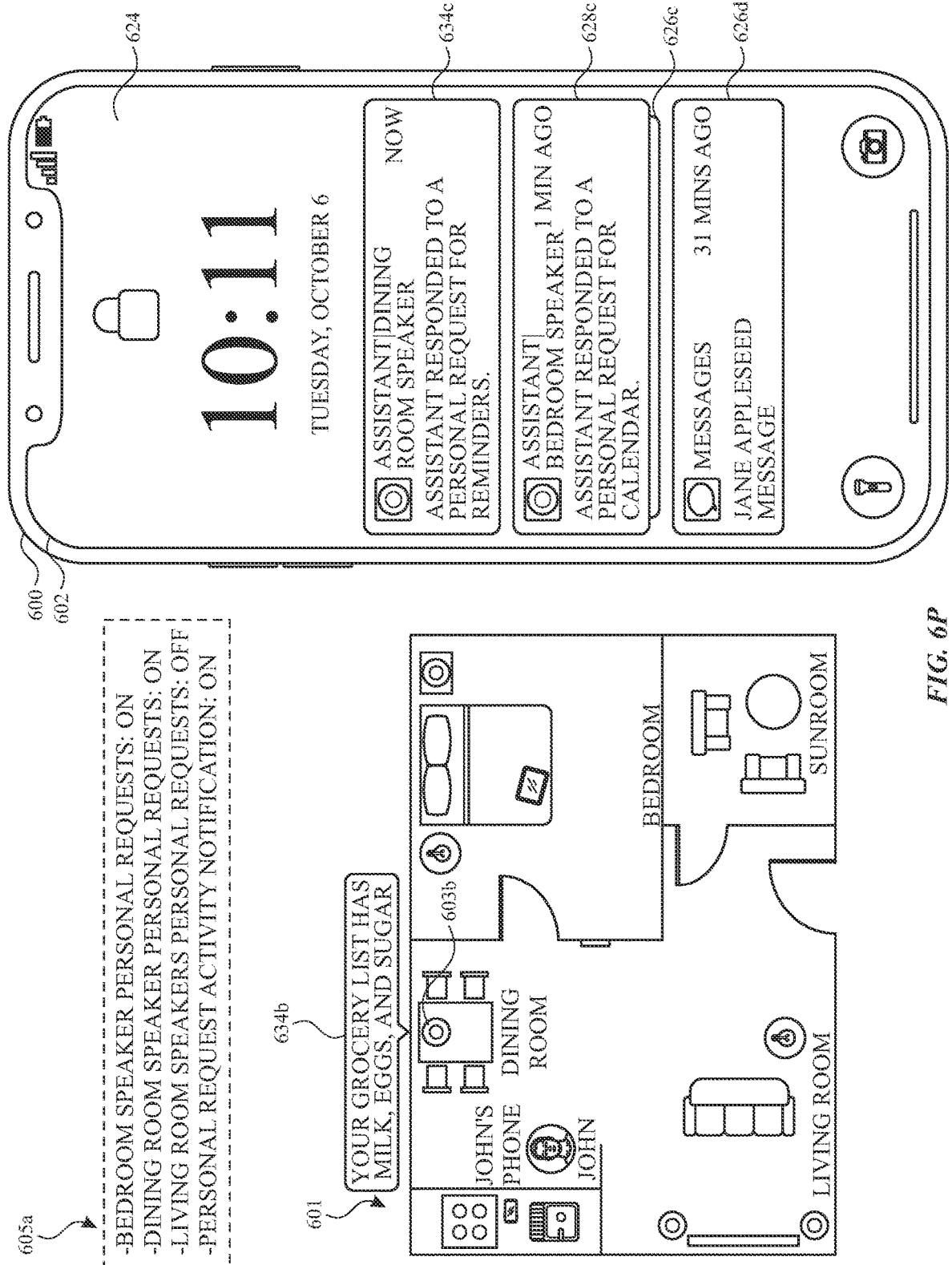
Figure 6S:
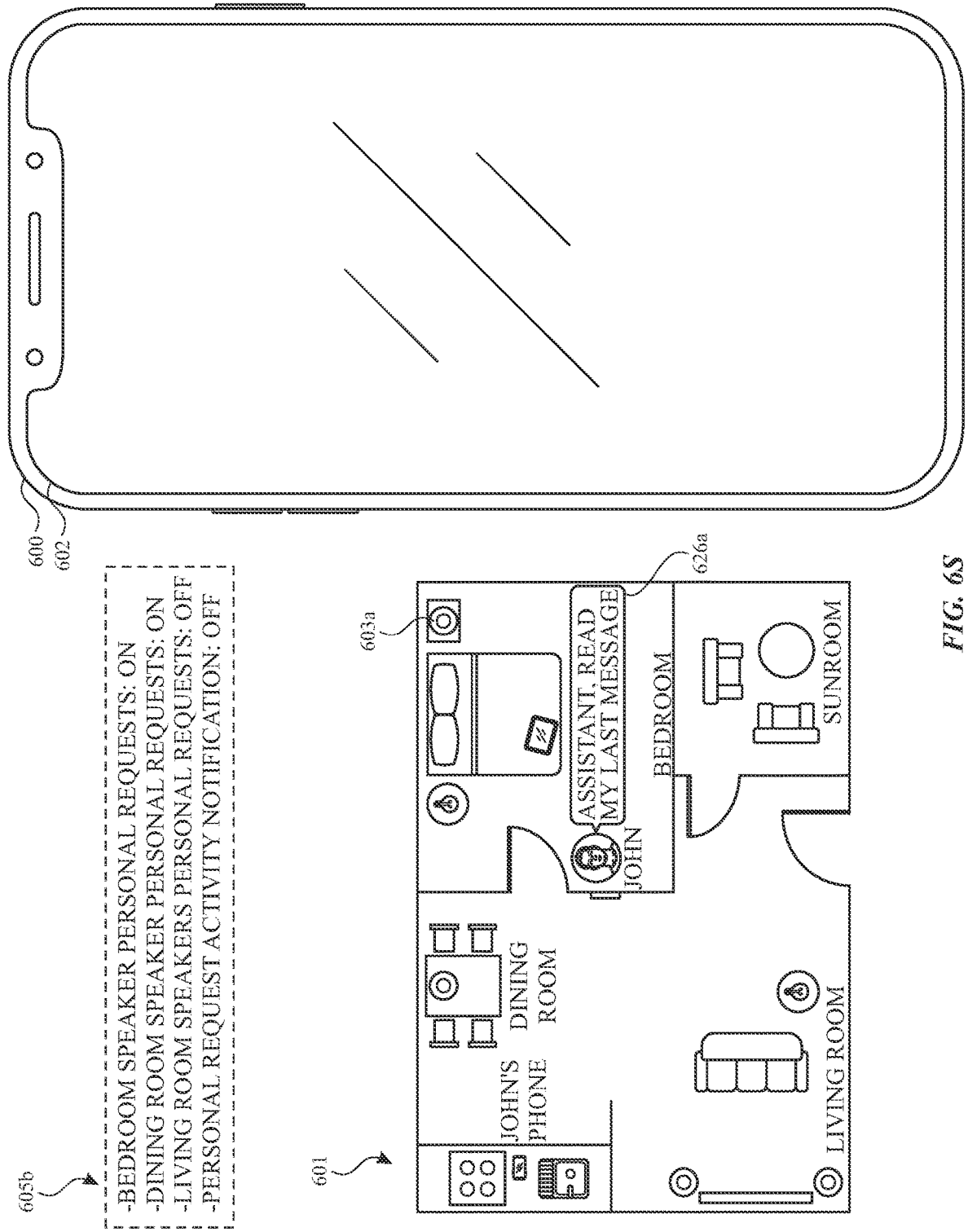
Figure 6T:
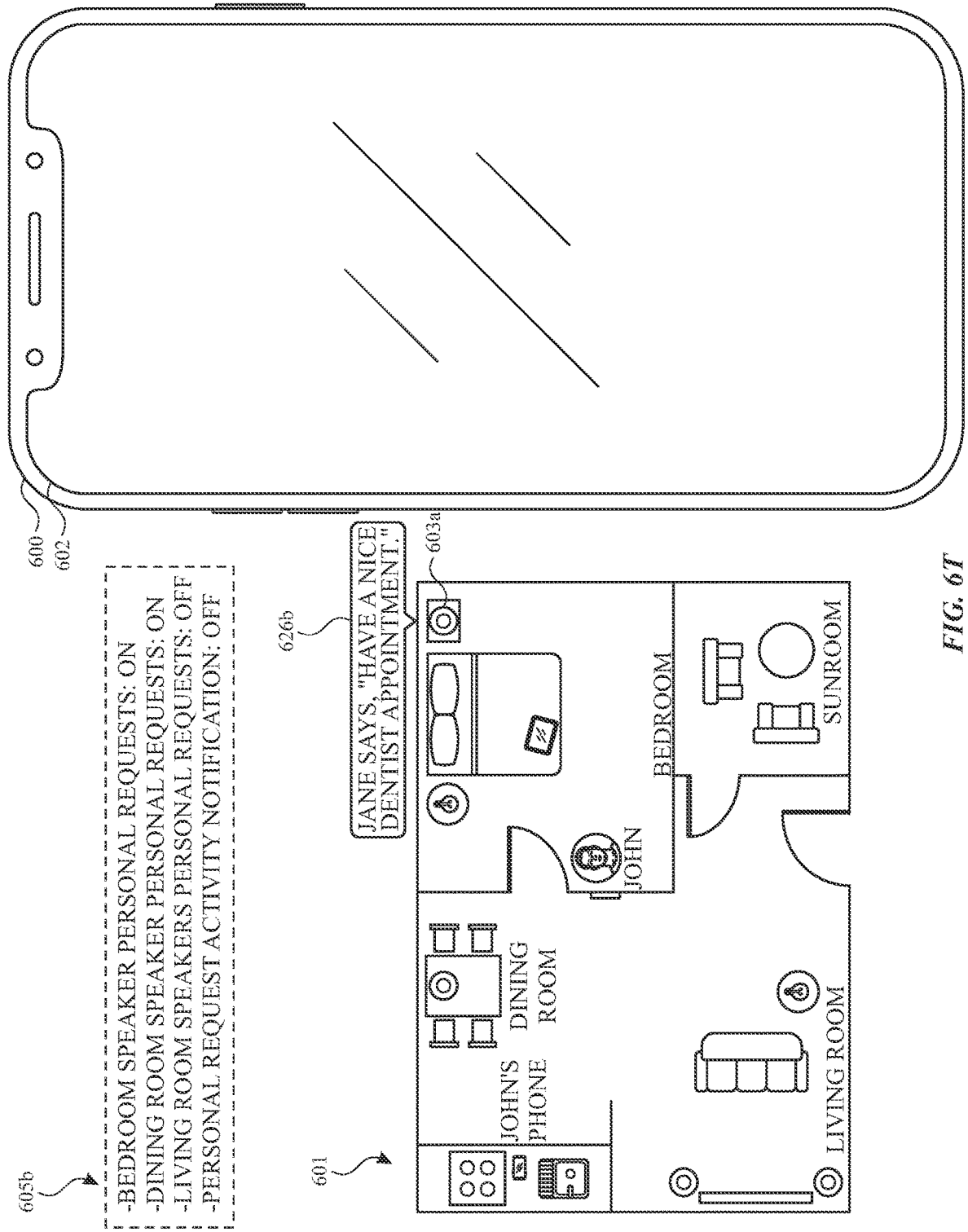
Figure 6U:
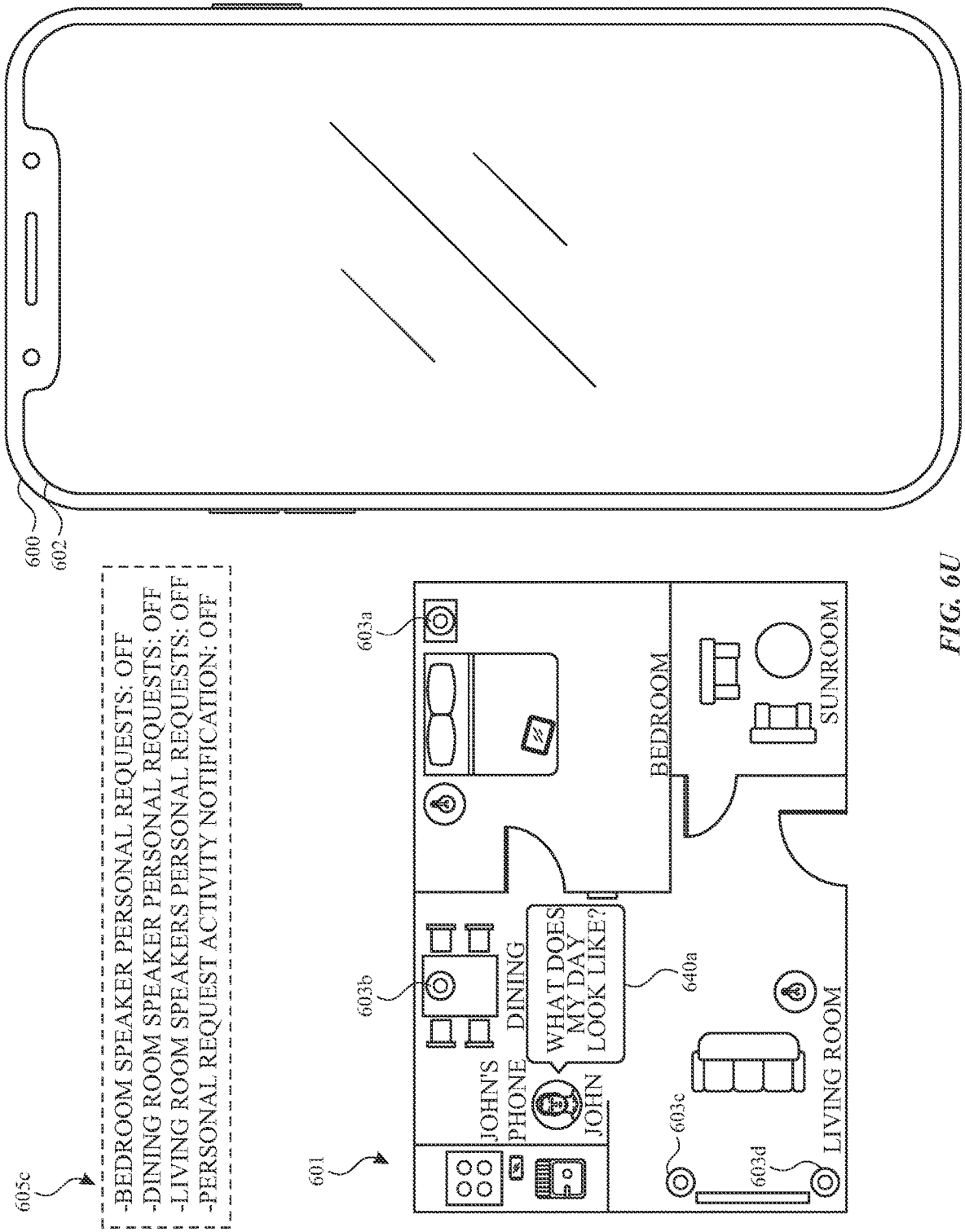
Figure 6V:
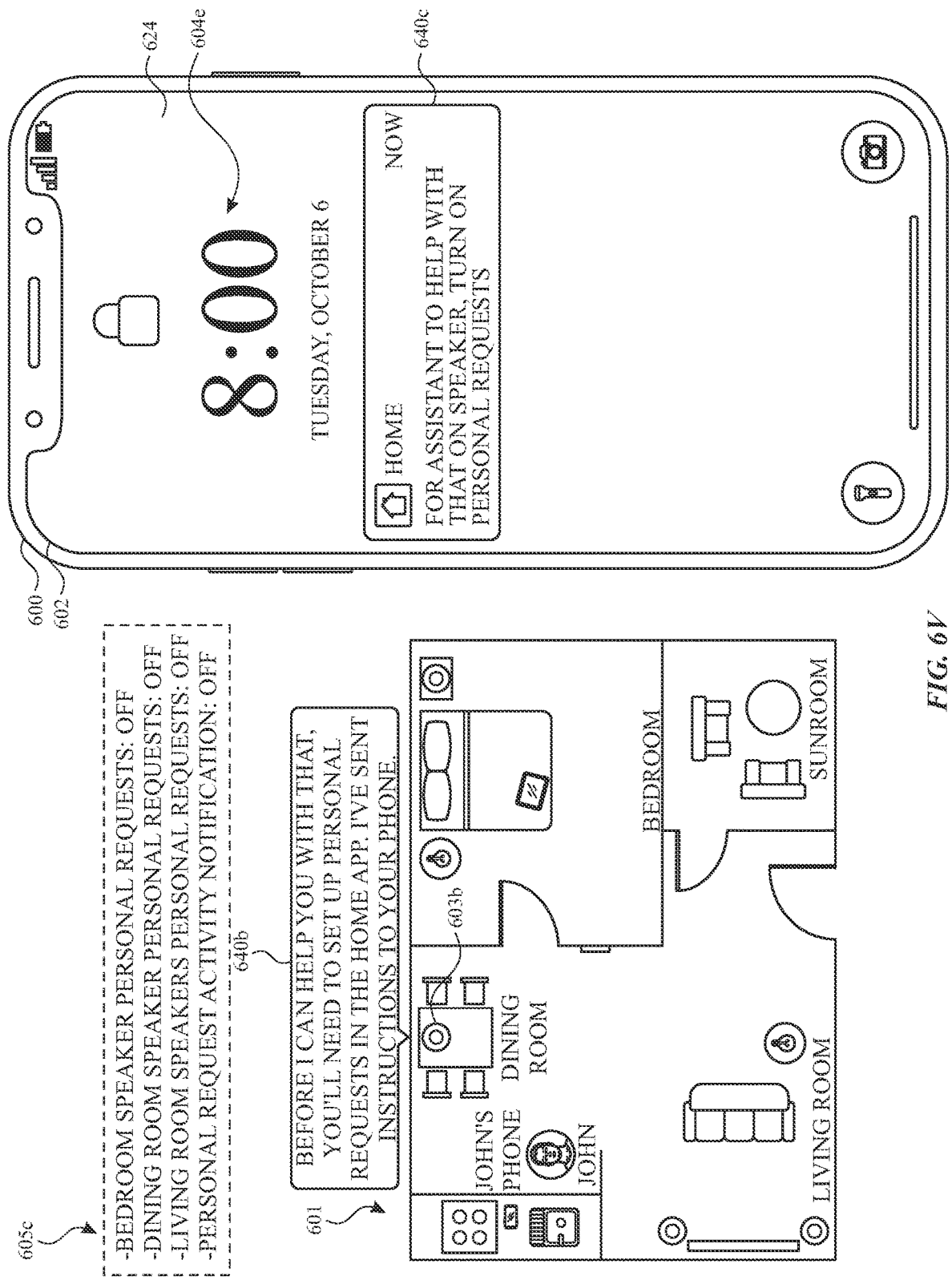
Figure 7:
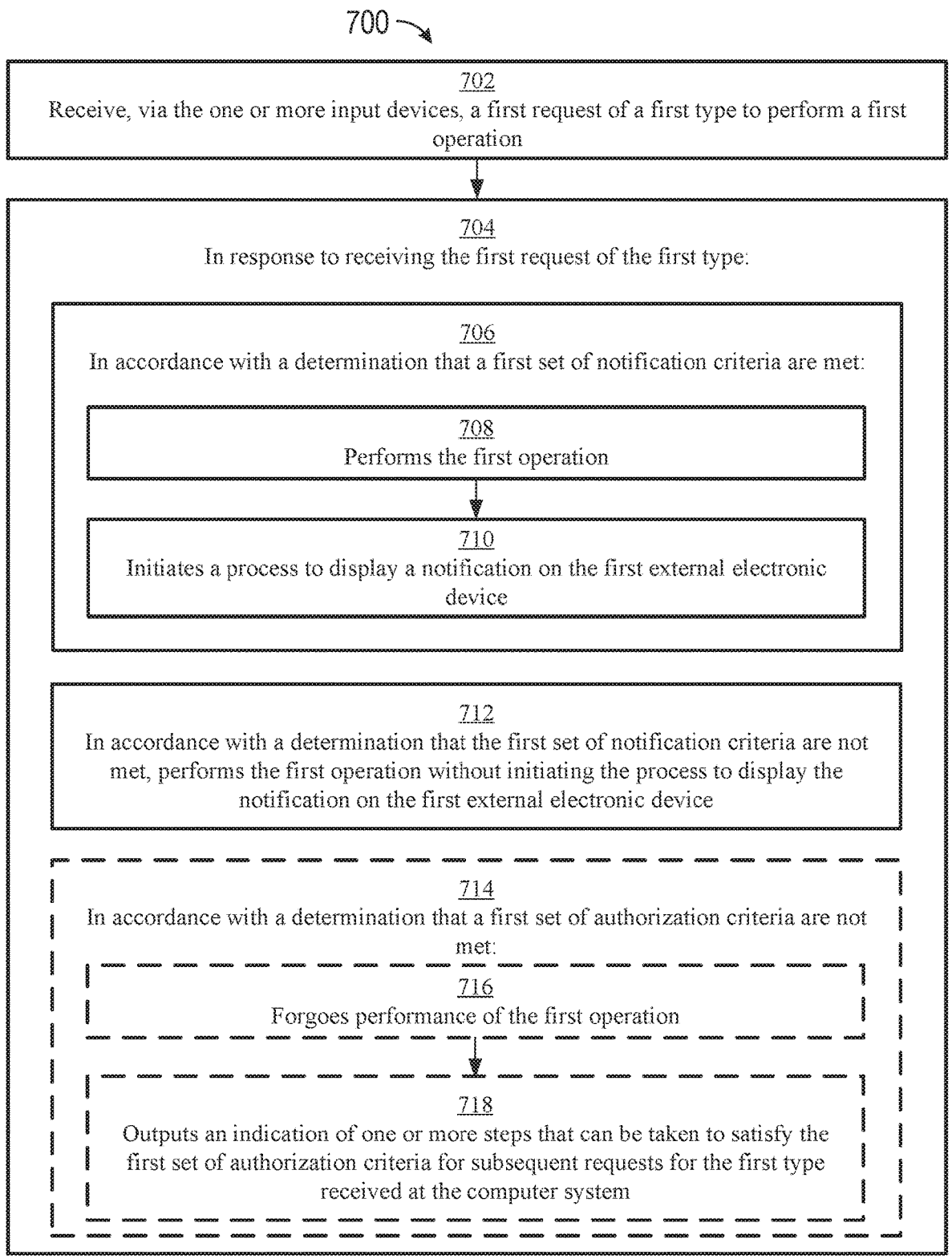
FIG. 7 is a flow diagram illustrating a method for managing user requests for specific operations, in accordance with some embodiments.

Turning now to FIGS. 6G-6V, user interactions with electronic devices (e.g., smart phone, smart speakers) will be described using the various example configurations of personal requests settings described with respect to FIGS. 6D-6F. Starting with FIGS. 6G-6P, settings illustration 605a corresponds to the example personal requests settings configuration shown in FIG. 6E. For FIGS. 6S-6T, settings illustration 605b corresponds to the example personal requests settings configuration shown in FIG. 6F. For FIGS. 6U-6V, settings illustration 605c corresponds to the example personal requests settings configuration shown in FIG. 6D. Most of FIGS. 6G-6V include a schematic diagram of a home (e.g., "123 MAIN ST.") and representations of devices relative to physical properties of the home (e.g., a location of a device relative to a wall or room of the home). The depicted devices are connected to home network "123 MAIN ST." and are in communication with each other via wireless connections. For example, home schematic 601 in FIG. 6G includes a user indication (e.g., a symbol of a person (e.g., John)) at a location within the home (e.g., in the bedroom) for interacting with devices (e.g., device 603a) within a particular room. The figures and schematic diagram are not necessarily to scale and are provided for exemplary purposes only as a visual aid for the description.

FIG. 6G illustrates device 600 with touchscreen display 602 off (e.g., device 600 is in a standby mode; device 600 is not displaying a user interface), along with home schematic 601 and settings illustration 605a, which corresponds to the example personal requests settings configuration shown in FIG. 6E. Home schematic 601 is a representation of the home associated with home network "123 MAIN ST." and includes device 600 (e.g., a smart phone) on a counter in the dining room, device 603a (e.g., a smart speaker) and device 607 (e.g., a tablet, a smart phone) in the bedroom, device 603b (e.g., a smart speaker) in the dining room, and devices 603c and 603d (e.g., smart speakers) in the living room, all of which are connected to home network "123 MAIN ST." In some embodiments, devices 603a-603d include one or more input devices, such as a microphone, and one or more output devices, such as speakers (e.g., electroacoustic speakers). In some embodiments, devices 603a-603d include a digital assistant for receiving and processing user commands (e.g., natural language speech input; input via device 600). Devices 603c and 603d are smart speakers that are paired in a stereo configuration. In some embodiments, speakers in a stereo configuration share the same settings (e.g., both speakers have voice recognition enabled; both speakers have personal requests disabled) and operations (e.g., both speakers are off; both speakers are playing media). Since devices 603c and 603d are paired in a stereo configuration, speaker affordance 606c on home user interface 606 of FIG. 6A provides controls for both devices and speaker affordance 618c on personal request user interface 618 of FIGS. 6D-6F that configures personal request settings for both devices.

In FIG. 6G, as shown in home schematic 601, device 603a receives speech input 626a, "Assistant, read my last message," from John in the bedroom. Speech input 626a is a personal request requiring device 603a to access John's latest text message. In some embodiments, after receiving speech input 626a, device 603a determines the type of request for speech input 626a based on a set of criteria that includes a criterion that is met when the request is for user-specific data (e.g., a personal request (e.g., to access a text message; to access a calendar appointment; to access a reminder; to access a note; to access an e-mail; to access a call log). As shown in FIG. 6H, in response to receiving speech input 626a, device 603a provides natural-language response 626b, "Jane says, 'Have a nice dentist appointment'," because device 603a is enabled to process personal requests for John's user account, as shown in settings illustration 605a. In some embodiments, prior to providing natural-language response 626b and after determining speech input 626a is a personal request, device 603a performs voice recognition operations to identify speech input 626a as matching a voice profile associated with John's user account. In some embodiments, if the voice recognition operations are unsuccessful in matching the speech input with a voice profile associated with a user, device 603a forgoes providing natural-language response 626b and, in some embodiments, provides a selected natural-language response other than the requested operation. In some embodiments, the natural-language response details that the request cannot be completed (e.g., "Sorry, I can't complete that request.") or includes a query for device 603a to identify the user (e.g., "Who's last message?").

In some embodiments, after identifying that the speech input matches the voice profile associated with John's user account, device 603a performs an authentication operation to confirm that device 600 (e.g., John's phone) is within proximity of device 603a (e.g., by confirming device 600 is connected to the same home network as device 603a). In some embodiments, if the authentication operation performed by device 603a is unsuccessful (e.g., device 600 is not within proximity), device 603a forgoes providing natural-language response 626b and, in some embodiments, provides a natural-language response prompting correction of the error (e.g., "Before I can perform your request, please connect your phone to the home network"). In some embodiments, voice recognition operations and/or authentication operations are performed by device 603a on a per-region basis (e.g., location (e.g., within a country)) of the home network. In some embodiments, device 603a will not perform voice recognition operations if the home network is configured in a region that does not offer voice recognition capabilities. In some embodiments, devices 603b, 603c, and 603d perform voice recognition operations and/or authentication operations after receiving a speech input, similar to those detailed with respect to device 603a.

In FIG. 6H, upon device 603a providing natural-language response 626b, device 600 displays lock screen user interface 624 containing bedroom speaker notification 626c on touchscreen display 602. Lock screen user interface 624 includes time indication 604b (showing the current time of 10:10 (e.g., AM)), message notification 626d issued "30 MINS AGO," and bedroom speaker notification 626c issued "NOW." Message notification 626d corresponds to a text message from Jane Appleseed and is the last message received by device 600, as detailed by device 603a in natural-language response 626b in response to speech input 626a, "Assistant, read my last message.," of FIG. 6G. Since device 600 is in a locked state, as indicated by the locked padlock icon on lock screen user interface 624, message notification 626d is also shown in a locked state (e.g., shows the sender (e.g., Jane Appleseed) without including the message content (e.g., "Have a nice dentist appointment.")).

In FIG. 6H, device 600 displays bedroom speaker notification 626c on lock screen user interface 624 because notifications for personal request activity is "ON" for John's user account, as shown in settings illustration 605a and activity notification affordance 618d of FIG. 6E. Bedroom speaker notification 626c is an indication that device 603a (e.g., bedroom speaker) provided a response to speech input 626a, which was determined to be a personal request. Bedroom speaker notification 626c includes a recency indication (e.g., "NOW"), which indicates when the personal request was processed by device 603a and ages as time passes, and text detailing the application that was accessed to complete the personal request (e.g., "MESSAGES").

Home schematic 601 includes electronic device 607 (e.g., a tablet, a smart phone), which is John's tablet that is connected to the home network. In some embodiments, device 607 can be configured to display the same notifications as device 600 and, therefore, displays at least bedroom speaker notification 626c and message notification 626d. However, in some embodiments, despite notification configurations for device 607, device 607 does not display bedroom speaker notification 626c because activity notifications are enabled for a primary device (e.g., device 600; not device 607) that was used to configure the user profile (e.g., John's user profile) and personal request settings. In some embodiments, personal requests and activity notifications are configured at a primary device (e.g., device 600 (e.g., smart phone)) for a specific user and cannot be configured at a secondary device (e.g., device 607 (e.g., tablet)).

Turning now to FIG. 6I, device 600 continues displaying lock screen user interface 624 on touchscreen display 602. In home schematic 601, device 603a receives speech input 628a, "Assistant, when's my dentist appointment?" from John in the bedroom. Speech input 628a is a personal request requiring device 603a to access John's calendar. In FIG. 6J, in response to receiving speech input 628a, device 603a provides natural-language response 628b, "Your dentist appointment is at 12 PM," because device 603a is enabled to process personal requests for John's user account, as shown in settings illustration 605a. In some embodiments, prior to providing natural-language response 628b and after determining speech input 628a is a personal request, device 603a performs voice recognition operations to identify speech input 628a as matching a voice profile associated with John's user account. In some embodiments, if the voice recognition operations are unsuccessful in matching the speech input with a voice profile associated with a user, device 603a forgoes providing natural-language response 628b and, in some embodiments, provides a natural-language response. In some embodiments, the natural-language response details that the request cannot be completed (e.g., "Sorry, I can't complete that request.") or includes a query for device 603a to identify the user (e.g., "Who's last message?").

In FIG. 6J, lock screen user interface 624 is updated to include bedroom speaker notification 628c, along with bedroom speaker notification 626c and message notification 626d. Bedroom speaker notification 628c includes a recency indication (e.g., "NOW") to indicate when the personal request was processed by device 603a and text detailing what application was accessed to complete the personal request (e.g., "CALENDAR"). Bedroom speaker notification 628c and bedroom speaker notification 626c are displayed as a group (e.g., a stack; a cluster) of notifications with bedroom speaker notification 628c overlaid on bedroom speaker notification 626c. Device 600 displays bedroom speaker notification 628c overlaid on bedroom speaker notification 626c to indicate that bedroom speaker notification 628c corresponds to the most recent personal request completed by device 603a (e.g., bedroom speaker). In some embodiments, additional bedroom speaker notifications are included in the notification stack for additional personal requests completed by device 603a (e.g., bedroom speaker).

Turning now to FIG. 6K, device 600 continues to display lock screen user interface 624 on touchscreen display 602 with bedroom speaker notifications 628c and 626c and message notification 626d. One minute has passed, as indicated by time indication 604c (showing the current time of 10:11 (e.g., AM)) and the updated recency indications of bedroom speaker notification 628c (e.g., "1 MIN AGO") and message notification 626d (e.g., "31 MINS AGO"). As shown in home schematic 601, device 603a received speech input 630a, "Assistant, what's the weather like?"

In FIG. 6L, device 603a provides natural-language response 630b, "The high today will be 74 degrees," in response to receiving speech input 630a. Speech input 630a is a non-personal request requiring device 603a to provide a weather forecast. In some embodiments, in response to receiving speech input 630a and prior to providing natural-language response 630b, device 603a determines the type of request for speech input 630a is not a personal request. In some embodiments, if the request is not a personal request, device 603a does not perform voice recognition operations and/or authentication operations.

In FIG. 6L, device 600 continues to display lock screen user interface 624 on touchscreen display 602 without changes. Lock screen user interface 624 includes bedroom speaker notifications 628c and 626c and message notification 626d and does not include a new bedroom speaker notification corresponding to natural-language response 630b. For completion of requests that are determined to be non-personal requests (e.g., speech input 630a, "Assistant, what's the weather like?") by device 603a, a bedroom speaker notification is not issued for display on device 600.

Turning now to FIG. 6M, device 600 maintains display of lock screen user interface 624 on touchscreen display 602 without changes to notifications 628c, 626c, and 626d. In home schematic 601, the user indication for John is shown in the living room. Paired devices 603c and 603d receive speech input 632a, "Assistant, what's on my grocery list?" from John in the living room. Speech input 632a is a personal request requiring paired devices 603c and 603d to access John's reminders. In some embodiments, in response to receiving speech input 632a, paired devices 603c and 603d determine the type of request for speech input 632a is a personal request. In some embodiments, after determining the type of request for speech input 632a is a personal request, paired devices 603c and 603d perform voice recognition operations to identify speech input 632a as matching a voice profile associated with John's user account.

In FIGS. 6M and 6N, according to settings illustration 605a, the living room speakers (e.g., paired devices 603c and 603d) are not currently configured to process personal requests for John's user account. Therefore, in response to receiving speech input 632a, paired devices 603c and 603d provide natural-language response 632b, "Before I can read your reminders, update your settings in the Home App," via device 603c in FIG. 6N. In some embodiments, paired devices 603c and 603d each provide audio output for natural-language response 632b. In some embodiments, devices that are unable to process personal requests for a particular user account provide a natural-language response to update the settings for personal requests for the particular user account. In some embodiments, since user settings are independently configured, devices that are unable to process personal request for a first user (e.g., personal requests for John's user account is disabled on paired devices 603c and 603d) can process personal requests for a second user (e.g., personal requests for Jane's user account can be enabled on paired devices 603c and 603d). In FIGS. 6M and 6N, device 600 does not display a notification corresponding to request 632a because the requested operation was not performed. In some embodiments, a notification is displayed on device 600 in response to request 632a, even though the requested operation was not performed (e.g., to provide John with feedback that a personal request was made).

Turning now to FIG. 6O, device 600 maintains display of lock screen user interface 624 on touchscreen display 602 without changes to notifications 628c, 626c, and 626d. In home schematic 601, the user indication for John is shown in the dining room. Device 603b receives speech input 634a, "Assistant, what's on my grocery list?" from John in the dining room. Speech input 634a is a personal request requiring device 603b to access John's reminders, similar to speech input 632a of FIG. 6M. In FIG. 6P, in response to receiving speech input 634a, device 603b provides natural-language response 634b, "Your grocery list has milk, eggs, and sugar," because device 603b is enabled to process personal requests for John's user account, as shown in settings illustration 605a. In some embodiments, prior to providing natural-language response 634b and after determining speech input 634a is a personal request, device 603b performs voice recognition operations to identify speech input 634a as matching a voice profile associated with John's user account. In some embodiments, if the voice recognition operations are unsuccessful in matching the speech input with a voice profile associated with a user, device 603b forgoes providing natural-language response 634b and, in some embodiments, provides a natural-language response. In some embodiments, the natural-language response details that the request cannot be completed (e.g., "Sorry, I can't complete that request.") or includes a query for device 603b to identify the user (e.g., "Who's last message?").

In FIG. 6P, device 600 displays, on touchscreen display 602, lock screen user interface 624. Lock screen user interface 624 includes new dining room speaker notification 634c, along with bedroom speaker notifications 628c and 626c and message notification 626d. Dining room speaker notification 634c is shown on lock screen user interface 624 because notifications for personal request activity is "ON" for John's user account, as shown in settings illustration 605a and activity notification affordance 618d of FIG. 6E. Dining room speaker notification 634c is an indication that device 603b (e.g., dining room speaker) provided a response to speech input 634a, which was determined to be a personal request, by accessing user data stored in the reminders application (e.g. "REMINDERS"). Dining room speaker notification 634c also includes a recency indication (e.g., "NOW"). Unlike bedroom speaker notification 628c that is overlaid on bedroom speaker notification 626c, dining room speaker notification 634c is shown separately from the bedroom speaker notification stack. In some embodiments, additional personal requests performed at device 603b (e.g., dining room speaker) causes device 600 to display additional dining room speaker notifications in a stacked arrangement. Notifications for personal requests are grouped (e.g., stacked; in a compressed arrangement) based on the device (e.g., device 603a; device 603b) used to complete the personal request, with the most recent notification shown overlaid on prior notification. In some embodiments, all notifications for personal requests (e.g., from all devices) are arranged in a stack (e.g., grouped; compressed). In some embodiments, notifications for personal requests are arranged in a stack (e.g., grouped; compressed) by the application (e.g., messages, calls history, calendar, reminders) accessed to complete the personal request.

FIGS. 6Q-6R illustrate notification behavior in response to user input at device 600. In FIG. 6Q, device 600 displays, on touchscreen display 602, lock screen user interface 624 with dining room speaker notification 634c, bedroom speaker notifications 628c and 626c, and message notification 626d. Lock screen user interface 624 further includes time indication 604d (showing the current time of 10:12 (e.g., AM)) and, for each notification, the recency indications progress by 1 minute. Device 600 is in an unlocked (e.g., authenticated) state, as indicated by the unlocked padlock icon on lock screen user interface 624. When device 600 is in an unlocked state, message notification 626d shows the text message from Jane Appleseed, "Have a nice dentist appointment." Device 600 detects input 636 (e.g., a tap input; a long-press input) corresponding to selection of dining room speaker notification 634c.

As shown in FIG. 6R, in response to input 636 at dining room speaker notification 634c, device 600 displays, on touchscreen display 602, dining room speaker notification 634c and personal request settings affordance 638 overlaid on lock screen user interface 624. In some embodiments, input 636 is a tap input corresponding to selection of dining room speaker notification 634c. In some embodiments, input 636 is a long-press input (e.g., contact with touchscreen display 602 for longer than a threshold amount of time) corresponding to selection of dining room speaker notification 634c. In some embodiments, device 600 displays lock screen user interface 624 with a deemphasizing visual treatment (e.g., blur effect; dim effect). In some embodiments, in response to detecting selection of personal request settings affordance 638, device 600 displays personal request user interface 618, as shown in FIGS. 6D-6F. In some embodiments, in addition to displaying personal request settings affordance 638, device 600 displays other selectable affordances that, when selected, cause device 600 to display various setting user interfaces (e.g., dining room speaker settings; home settings).

Turning back to FIG. 6Q, in some embodiments, in response to detecting a tap input corresponding to selection of the stacked bedroom speaker notifications 628c and 626c, device 600 displays bedroom speaker notifications 628c and 626c in an expanded arrangement such that bedroom speaker notification 628c and bedroom speaker notification 626c are not overlapping and each independently selectable. In such embodiments, in response to selection of either bedroom speaker notification 628c or bedroom speaker notification 626c, device 600 displays a user interface emphasizing the selected bedroom speaker notification with personal request settings affordance 638, analogous to that of FIG. 6R. In some embodiments, in response to in response to detecting a tap input corresponding to selection of the stacked bedroom speaker notifications 628c and 626c, device 600 displays a user interface emphasizing bedroom speaker notification 628c with personal request settings affordance 638, analogous to that of FIG. 6R. In some embodiments, in response to detecting a long-press (e.g., tap and hold) input corresponding to selection of the stacked bedroom speaker notifications 628c and 626c, device 600 displays a user interface emphasizing bedroom speaker notification 628c with personal request settings affordance 638, analogous to that of FIG. 6R.

FIGS. 6S-6T illustrate a scenario when personal request activity notifications are turned "OFF" for John's user account, as shown in settings illustration 605b. Settings illustration 605b corresponds to the configuration described with respect to FIG. 6F. Except for the change in settings from 605a to 605b, FIG. 6S is the same as FIG. 6G. In FIG. 6S, the touchscreen display 602 of device 600 is off (e.g., device 600 is in a standby mode; device 600 is not displaying a user interface). In home schematic 601, the user indication for John is shown in the bedroom. Device 603a receives speech input 626a, "Assistant, read my last message," from John in the bedroom. Speech input 626a is a personal request requiring device 603a to access John's latest text message. In some embodiments, after receiving speech input 626a, device 603a determines the type of request for speech input 626a is a personal request. As shown in FIG. 6T, in response to receiving speech input 626a, device 603a provides natural-language response 626b, "Jane says, 'Have a nice dentist appointment'," because device 603a is enabled to process personal requests for John's user account, as shown in settings 605b. In some embodiments, prior to providing natural-language response 626b and after determining speech input 626a is a personal request, device 603a performs voice recognition operations and/or authorization operations, as discussed in greater detail with respect to FIGS. 6G-6H.

In FIG. 6T, since personal request activity notifications are disabled (e.g., turned off) for John's user account, device 600 remains in standby mode with touchscreen display 602 off. Unlike FIG. 6H (in which device 600 displayed bedroom speaker notification 626c), device 600 forgoes display of a bedroom speaker notification indicating that a personal request was completed (e.g., processed) by device 603a (e.g., bedroom speaker).

FIGS. 6U-6V illustrate a scenario when personal requests have not yet been configured for a particular user (e.g., after setting up a new external device (e.g., smart speaker); after updating software)). As shown on FIG. 6V, device 600 displays lock screen user interface 624 with time indication 604e (showing the current time of 8:00 (e.g., AM)), which is prior to the time indications throughout FIGS. 6A-6R and, therefore, occurs before personal requests are configured on device 600 for John's user account. In FIG. 6U, settings 605c indicate personal requests are "OFF" (e.g., disabled; not yet setup) for all sets of one or more speakers in home schematic 601, and personal request activity notifications are "OFF." In some embodiments, the devices (e.g., 603a-603d) must be configured to perform specific operations (e.g., voice identification operations; authentication operations) prior to being able to process personal requests from users within a home network.

In FIG. 6U, touchscreen display 602 of device 600 is off (e.g., device 600 is in a standby mode; device 600 is not displaying a user interface). In home schematic 601, the user indication for John is shown in the dining room. Device 603b receives speech input 640a, "Assistant, what does my day look like?" from John in the dining room. Speech input 640a is a personal request requiring device 603b to access John's user data in one or more applications (e.g., calendar, reminders).

In FIG. 6V, in response to receiving speech input 640a, device 603b provides natural-language response 640b, "Before I can help you with that, you'll need to set up personal requests in the Home App. I've sent instructions to your phone," as shown in home schematic 601. Device 600 displays, on touchscreen display 602, lock screen user interface 624 with setup notification 640c. In some embodiments, in response to selection (e.g., via a set of one or more user inputs (e.g., tap input, long-press input)) corresponding to setup notification 640c, device 600 displays personal request user interface 618 of FIG. 6D. In some embodiments, in response to selection (e.g., via tap input; via long-press inputs) corresponding to setup notification 640c, device 600 displays an onboarding user interface similar to onboarding user interface 806 of FIG. 8A. Initial onboarding for personal requests will be discussed further with respect to FIGS. 8A-8B.

FIG. 7 is a flow diagram illustrating a method for 700 using an electronic device in accordance with some embodiments. Method 700 is performed at a device (e.g., device 100, 300, 500, 580, 600, or 603a-603d) that is in communication with one or more input devices and a first external electronic device (e.g., device 100, 300, 500, 600). Some operations in method 700 are, optionally, combined, the orders of some operations are, optionally, changed, and some operations are, optionally, omitted.

In some embodiments, the electronic device (e.g., 603a) is a computer system. The computer system is optionally in communication (e.g., wired communication, wireless communication) with a display generation component and with one or more input devices. The display generation component is configured to provide visual output, such as display via a CRT display, display via an LED display, or display via image projection. In some embodiments, the display generation component is integrated with the computer system. In some embodiments, the display generation component is separate from the computer system. The one or more input devices are configured to receive input, such as a touch-sensitive surface receiving user input. In some embodiments, the one or more input devices are integrated with the computer system. In some embodiments, the one or more input devices are separate from the computer system. Thus, the computer system can transmit, via a wired or wireless connection, data (e.g., image data or video data) to an integrated or external display generation component to visually produce the content (e.g., using a display device) and can receive, a wired or wireless connection, input from the one or more input devices.

As described below, method 700 provides an intuitive way for managing user requests for specific operations. The method reduces the cognitive burden on a user for managing user requests for specific operations, thereby creating a more efficient human-machine interface. For battery-operated computing devices, enabling a user to provide user requests for specific operations faster and more efficiently conserves power and increases the time between battery charges.

The computer system (e.g., device 603a, 603b, 603c, or 603d) receives (702), via the one or more input devices (e.g., microphone 113 of device 603a), a first request (e.g., 626a, 628a, 630a, 632a, 634a) (e.g., a spoken request, a natural language utterance from a user of the system) of a first type (e.g., a request to perform a specific type of operation (e.g., a request to output personal data (e.g., a request for content (e.g., media; voicemail; messages; events; to-do items/lists) associated with one or more specific users (e.g., an auto-generated playlist of a user's most played songs; a user-generated playlist; serialized media (e.g., an audiobook, a podcast series); media that varies depending on the identity of the user) to perform a first operation (e.g., a data output operation that is performed using one or more output devices (e.g., an integrated audio speaker; a display) that are in communication with the computer system) (in some embodiments, the first operation is audibly outputting data corresponding to messages (e.g., voicemail, email, text messages) associated with a specific user).

The computer system, in response (704) to receiving the first request of the first type and in accordance (706) with a determination that a first set of notification criteria (e.g., activity notifications setting toggled on) are met (in some embodiments, and in accordance with a determination that a first set of authorization criteria are met): performs (708) the first operation (e.g., outputs 626b, 628b, or 634b); and initiates (710) a process to display a notification (e.g., 626c, 628c, 634c) on the first external electronic device (e.g., 600). In some embodiments, initiating a process to display the notification includes generating the notification and/or transmitting an indication that the first request was received to the first external electronic device or to a second external electronic device (e.g., an alert or notification server; an event-logging server in communication with a notification server) that causes display of the notification at the first external electronic device.

The computer system, in response to receiving the first request of the first type and in accordance with a determination that the first set of notification criteria (e.g., activity notifications setting toggled off) are not met (in some embodiments, and in accordance with a determination that a first set of authorization criteria are met), performs (712) the first operation (e.g., output 626b) without initiating the process to display the notification on the first external electronic device (e.g., or any other electronic device) (e.g., as seen in FIGS. 6S and 6T). In some embodiments, additional settings must be enabled to perform the first operation (e.g., the computer system is configured to recognize user voices; personal requests setting enabled for the requesting user). In some embodiments, a request is a request of a first type if the request meets additional criteria, such as being from a known (e.g., identified via voice recognition) user (e.g., from a set of known users). In some embodiments, the computer system receives a second request of a second type (e.g., a request for data that is not personalized; a request for data that is generic/non-variable for different users) to perform a second operation, and, in response to the second request, the computer system performs the second operation without initiating the process to display the notification on the first external electronic device (e.g., the second operation is performed without initiating the process to display the notification regardless of whether the first set of notification criteria are met). Performing the first operation with or without initiating a process to display a notification based on a set of criteria allows a user make requests of the first type, with or without the additional operation of initiating display of a notification, without requiring further inputs. In some implementations, this process seamlessly allows a user to make a request for personal information and obtain that information without additional authorization. When the process to display notifications is automatically initiated in response to requests of the first type, e.g., a personal request, privacy and security are enhanced for a user because the user is informed, on a separate device, that the computer system has provided information in response to a request. The request and information provided may be about personal information. By notifying the user about the provided personal information, the user has a chance to review the information and subsequently manage settings in order to determine how and when to allow personal information to be given out by the computer system. Performing an optimized operation when a set of conditions are met without requiring further input and improving security and privacy aspects of interactions enhances the operability of the device and makes the user-device interface more efficient (e.g., by helping the user to provide proper inputs and reducing user mistakes when operating/interacting with the device or by restricting unauthorized inputs) which, additionally, reduces power usage and improves battery life of the device by enabling the user to use the device more quickly and efficiently.

In some embodiments, the computer system is in communication with one or more output devices (e.g., speaker 111) (e.g., an audio speaker; a display); the first request of the first type is a request to output personalized data (e.g., data corresponding to 626b, 628b, 634b) corresponding to a respective user associated with the request (e.g., that has been determined and/or identified (e.g., via voice recognition) as having made the first request); and performing the first operation includes: in accordance with a determination that the respective user associated with the first request is a first user (e.g., 610a) (e.g., a user associated with a first user account that corresponds to a first set of user-specific data), outputting, via the one or more output devices, a representation (e.g., audio outputs 626b, 628b, 634b) (e.g., an audio output; graphical output; a textual output) of first data that is associated with the first user; and in accordance with a determination that the respective user associated with the first request is a second user (e.g., 610b) (e.g., a user associated with a second user account that corresponds to a second set of user-specific data), different from the first user, outputting, via the one or more output devices, a representation (e.g., an audio output; graphical output; a textual output) of second data (e.g., and that is not associated with the first user), different from the first data, that is associated with the second user (in some embodiments, without outputting the first data). Conditionally initiating a process to display a notification based on a set of criteria in response to a request for personalized data that varies by user provides users with additional control over when such notifications are provided, without having to provide additional inputs with each request. Moreover, when the process to display notifications is automatically initiated in response to requests of the first type (e.g., personal requests), security and privacy is enhanced by informing the user, on a separate device, that a request of the first type has been processed at the computer system. By notifying the user about the provided personal information, the user has a chance to review the information and subsequently manage settings in order to determine how and when to allow personal information to be given out by the computer system. Performing an optimized operation when a set of conditions are met without requiring further input, providing users with more control, improving security, and enhancing privacy all enhance the operability of the device and makes the user-device interface more efficient (e.g., by helping the user to provide proper inputs and reducing user mistakes when operating/interacting with the device or by restricting unauthorized inputs) which, additionally, reduces power usage and improves battery life of the device by enabling the user to use the device more quickly and efficiently.

In some embodiments, the first data is selected from the group consisting of an email associated with the first user, a text message associated with the first user (e.g., 626b), a voicemail associated with the first user, a calendar event associated with the first user (e.g., 628b), media (e.g., a personalized playlist) associated with the first user, a reminder associated with the first user (e.g., 634b), and a combination thereof.

In some embodiments, the first set of notification criteria includes a criterion that is met when (in some embodiments, the first set of notification criteria are met when) a first notification setting (e.g., as seen in 605a) associated with the first external electronic device (e.g., associated with a user of the first external electronic device; associated with a user account that is associated with the first external device) is enabled. In some embodiments, the first set of notification criteria are not met when the first notification setting is disabled. In some embodiments, the first external electronic device is associated with a first user account that is also associated with the computer system and the first request is determined to have been made by a user associated with the first user account. Conditionally initiating a process to display a notification based on a user-selectable notification setting provides users with additional control over when such notifications are provided, without having to provide additional inputs with each request. Moreover, doing so provides the user with the option to balance security and privacy with notification frequency. By notifying the user about the provided personal information, the user has a chance to review the information and subsequently manage settings in order to determine how and when to allow personal information to be given out by the computer system. Performing an optimized operation when set of conditions are met without requiring further input, providing users with more control, enhancing privacy, and improving security all enhance the operability of the device and makes the user-device interface more efficient (e.g., by helping the user to provide proper inputs and reducing user mistakes when operating/interacting with the device or by restricting unauthorized inputs) which, additionally, reduces power usage and improves battery life of the device by enabling the user to use the device more quickly and efficiently.

In some embodiments, the first notification setting affects (e.g., controls; permits or prohibits) whether a plurality of computer systems (e.g., 603a, 603b) (e.g., computer systems configured to perform the first operation in response to requests of the first type; computer systems sharing the same hardware and/or software configuration and/or capabilities) initiate a process to display a notification on the first external device in response to receiving requests of the first type, wherein the plurality of computer systems includes the computer system. Conditionally initiating a process to display a notification based on a user-selectable notification setting that affects multiple devices provides users with additional control over when such notifications are provided for multiple devices, without having to provide additional inputs for each device and/or with each request. Moreover, doing so provides the user with the option to balance security and privacy with notification frequency for multiple devices. By notifying the user about the provided personal information, the user has a chance to review the information and subsequently manage settings in order to determine how and when to allow personal information to be given out by the computer system. Performing an optimized operation when set of conditions are met without requiring further input, providing users with more control, enhancing privacy, and improving security all enhance the operability of the device and makes the user-device interface more efficient (e.g., by helping the user to provide proper inputs and reducing user mistakes when operating/interacting with the device or by restricting unauthorized inputs) which, additionally, reduces power usage and improves battery life of the device by enabling the user to use the device more quickly and efficiently.

In some embodiments, the first notification setting was enabled via a user input (e.g., an input received while displaying a settings user interface for managing the output of requests for personalized data associated with the user of the first external electronic device) received at the first external electronic device (e.g., at device 600 as seen in FIG. 6E). Providing notifications at a specific device at which a relevant setting was enabled provides improved user feedback by increasing the likelihood that the user will notice the notification and improves security and privacy, when then notification may indicate unauthorized access or unintentional disclosure of private information. Providing improved visual feedback to the user, enhancing privacy, and improving security all enhance the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first electronic device (e.g., 600) is configured to: in accordance with a determination (e.g., a determination made at the computer a system; a determination made at a notification server in communication with the computer system) that a first set of notification-handling criteria are met, wherein the first set of notification-handling criteria includes a criterion that is met when a first previous notification (e.g., 626c) corresponding to the computer system (e.g., the first set of notification-handling criteria are met when the first previous notification remains unread and/or has not been dismissed at the first external electronic device) is currently available for display (e.g., currently being displayed), configure the notification (e.g., 628c) for display (e.g., displaying the notification or setting the notification for display in response to a subsequent request to display notifications) in a group (e.g., the group of FIG. 6J) with the first previous notification (e.g., as a stack; as a single, graphical notification with an indication that the notification is associated with a plurality of notification events (e.g., a badged notification)); and in accordance with a determination (e.g., a determination made at the computer a system; a determination made at a notification server in communication with the computer system) that a second set of notification-handling criteria are met, wherein the second set of notification-handling criteria includes a criterion that is met when a second previous notification (e.g., 626c, 628c) corresponding to a second computer system (e.g., initiated in response to a second request of the first type that was received at the second computer system), different than the computer system, is currently available for display, configure the notification (e.g., 634*c*) to be displayed separately from the second previous notification (e.g., not in a group; not in a stack; as a discrete, separate notification that is displayed concurrently with the second previous notification (e.g., if the second previous notification remains unread)) (e.g., as seen in FIG. 6P). Conditionally displaying a notification as part of a group or separately, based on a set of criteria, provides improved feedback to users as to the relationship of the notification to existing notifications. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first electronic device is configured to: display the notification on a display (e.g., 602) of the first electronic device; receive, via an input device (e.g., a touch sensitive surface of display 602) (e.g., a touch-sensitive surface) of the first electronic device, a set of one or more inputs that includes an input corresponding to the notification (e.g., 636); and in response to receiving the set of one or more inputs that includes an input corresponding to the notification (e.g., a tap, a press-and-hold gesture), display a configuration user interface that includes a first selectable user interface object (e.g., 618*a*, 618*b*, 618*c*) that, when selected, modifies a setting that affects (e.g., disables and/or enables the handling of requests of the first type; affects whether the first set of notification criteria are met in response to receiving requests of the first type) processing of requests of the first type at the computer system. Providing the user with the ability to affect settings pertaining to requests of a type that generated the notification, from the notification, gives the user improved control options and reduces the number of inputs required to access the relevant settings. Providing improved control options enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, when the notification is grouped with one or more additional notifications, an input directed to the group of notifications causes the group to separate into discrete notifications, including displaying the notification as a discrete notification, separate from the one or more additional notifications).

In some embodiments, the first electronic device is configured to display the notification as a grouped notification (e.g., group of 626*c* and 628*c* of FIG. 6M) that corresponds to the notification and one or more additional notifications that correspond to one or more additional requests of the first type that were received by the computer system.

In some embodiments, the notification (e.g., 626*c*), when displayed at the first external electronic device, includes an indication (e.g., a textual indication; a graphical indication) (e.g., "request for messages" in 626*c*) that identifies one or more characteristics of the first operation (e.g., a type of data/content (e.g., media; voicemail; messages; events; to-do items/lists) outputted by the first operation; an application that performed the first operation). Including information that identifies one or more characteristics of the operation that was performed in response to the request provides the user with improved feedback as to the nature of the request and the operation that was performed. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system, in response to receiving the first request of the first type and in accordance (714) with a determination that a first set of authorization criteria are not met (e.g., as seen in FIGS. 6M and 6N): forgoes performance (716) of the first operation; and outputs (718) an indication (e.g., 632*b*) (e.g., an audio indication; a graphical indication; a textual indication) of one or more steps that can be taken to satisfy the first set of authorization criteria for subsequent requests for the first type received at the computer system (e.g., "enable personal requests on your smart phone"). Providing the user with guidance on what steps can be taken to permit performance of the operation provides the user with feedback that the computer system is not currently configured to perform the requested operations and promotes further user-system interactions. Providing improved feedback and promoting further interactions enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 700 (e.g., FIG. 7) are also applicable in an analogous manner to the methods described below. For example, method 900 optionally includes one or more of the characteristics of the various methods described above with reference to method 700. For example, method 900 can be used to enable personal data requests that are handled according to method 700. For brevity, these details are not repeated below.

FIGS. 8A-8D illustrate exemplary user interfaces for configuring the management of user requests for specific operations, in accordance with some embodiments. The user interfaces in these figures are used to illustrate the processes described below, including the processes in FIG. 9.

Figures 8A, 8B:
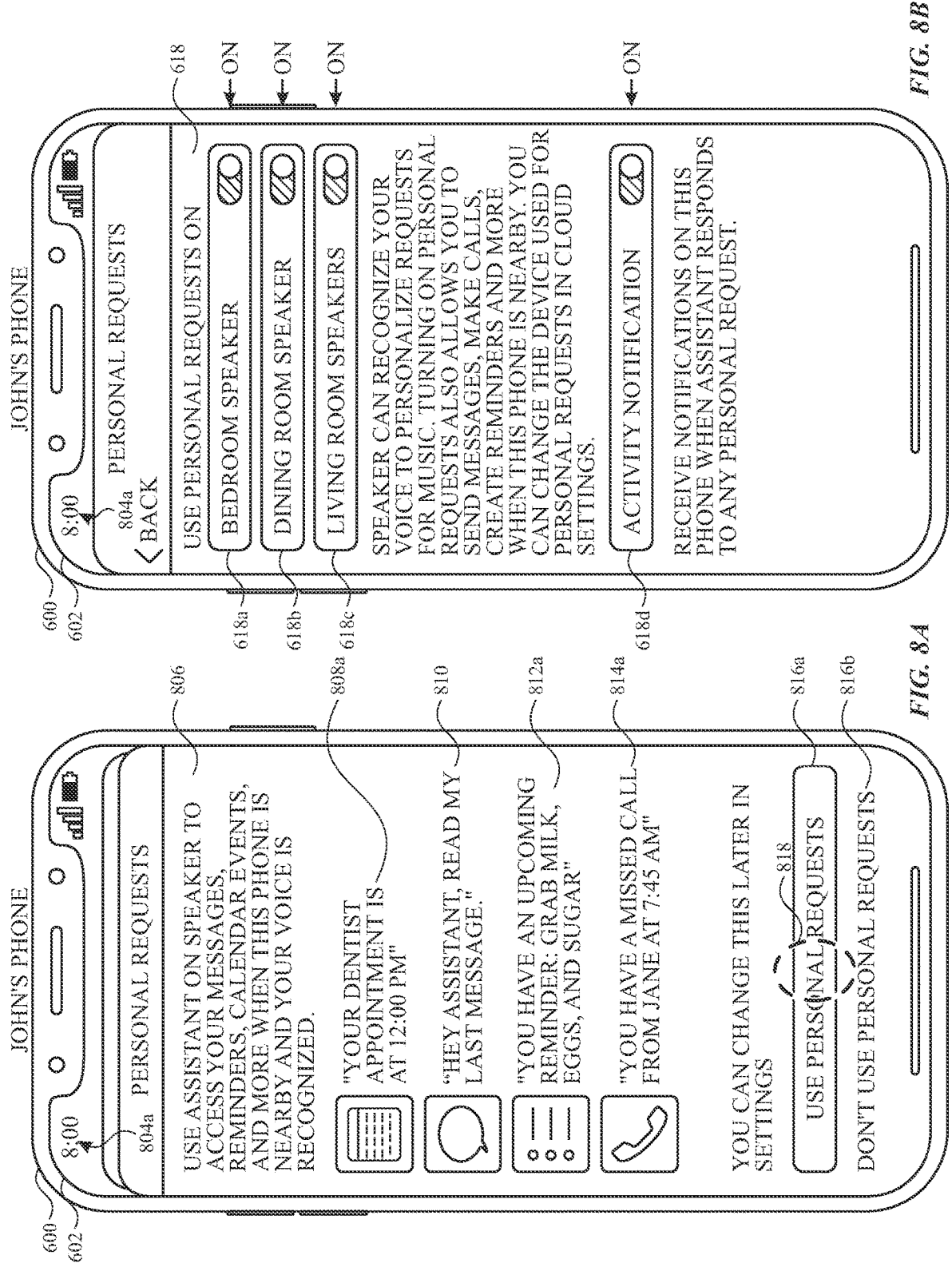

FIGS. 8A-8D illustrate exemplary user interfaces displayed during onboarding of user accounts to use personal requests on devices (e.g., smart speaker) having a digital assistant. FIGS. 8A-8C illustrate device 600, John's phone, as discussed above. FIG. 8D illustrates device 800, which is user Jane Appleseed's phone. In some embodiments, device 800 includes one or more features of devices 100, 300, 500, and/or 600.

In FIG. 8A, device 600 (e.g., John's phone) displays, on touchscreen display 602, time indication 804*a* (showing the current time of 8:00 (e.g., AM)) and onboarding user interface 806. In some embodiments, device 600 displays onboarding user interface 806 in response to receiving a user input corresponding to selection of setup notification 640*c* of FIG. 6V. In some embodiments, device 600 displays a set of one or more user interfaces, including onboarding user interface 806, upon accessing the Home application (e.g., the application depicted by home user interface 606 of FIG. 6A) for the first time after completing a software update (e.g., for device 600, for an external device (e.g., smart speaker)). In some embodiments, device 600 displays a set of one or more user interfaces, including onboarding user interface 806, during setup of a new external device (e.g., smart speaker). In some embodiments, onboarding user interface 806 is shown on most of touchscreen display 602. In some embodiments, onboarding user interface 806 is shown on a portion of touchscreen display 602.

In the scenario illustrated by FIGS. 8A-8B, onboarding user interface 806 is displayed prior to the scenarios described with respect to FIGS. 6A-6V. As shown in FIG. 8A, onboarding user interface 806 generally includes example personal requests (e.g., message request 810), example responses (e.g., calendar response 808a; reminders response 812a; call log response 814a), enable affordance 816a, and cancel affordance 816b. Example personal requests and example responses are dynamic examples using data specific to the user based on when onboarding user interface 806 is surfaced on device 600. In some embodiments, the example personal requests and example responses are from any application storing personal user data (e.g., call log, voicemail, email, chat applications (e.g., messages), calendar, reminders, notes, banking (e.g., wallet), health, contacts). In some embodiments, the example requests and requests provide the user with feedback as to what personal data can be requested and what personalized responses can be provided in response to such requests.

In FIG. 8A, device 600 displays onboarding user interface 806 for enabling personal requests on John's user account at 8:00 (e.g., AM), as shown by time indication 804a. Calendar response 808a reads, "Your dentist appointment is at 12:00 PM," which aligns with the scenario illustrated by FIGS. 6I-6J, when John is asking for his next appointment at 10:10 (e.g., AM) and device 603a provides output, "Your dentist appointment is at 12:00 PM." Reminder response 812a reads, "You have an upcoming reminder: grab milk, eggs, and sugar," which aligns with the scenario illustrated by FIGS. 6O-6P, when John is asking for his grocery list at 10:11 (e.g., AM) and device 603b provides output, "Your grocery list has milk, eggs, and sugar." Call log response 814a reads, "You have a missed call from Jane at 7:45 AM," which is data generated for John's user account 15 minutes prior to device 600 displaying onboarding user interface 806. Onboarding user interface 806 also includes message request 810, "Hey Assistant, read my last message," as an example personal request for accessing a user's text messages. In some embodiments, any combination of example requests and example responses are shown on onboarding user interface 806. In some embodiments, device 600 uses a generic (e.g., canned; non-specific to a user) example in place of a personalized example if the user account does not have user-specific data for an application (e.g., for a user who does not use the reminders application, show an example reminder response of "You have a reminder to pay bills.")

In FIG. 8A, device 600 detects tap input 818 corresponding to selection of enable affordance 816a. As shown in FIG. 8B, in response to tap input 818, device 600 enables personal requests for all electronic devices (e.g., smart speakers) connected to the home network and activity notifications for John's user account and displays personal request user interface 618 associated with John's user account on touchscreen display 602. As discussed in detail with respect to FIGS. 6D-6F, personal request user interface 618 includes speaker affordance 618a (e.g., "BEDROOM SPEAKER"), speaker affordance 618b (e.g., "DINING ROOM SPEAKER"), and speaker affordance 618c (e.g., "LIVING ROOM SPEAKERS") with toggles that are in the "ON" position, indicating that the electronic devices (e.g., smart speakers) associated with speaker affordances 618a-618c are able to perform (e.g., process) personal requests for John (e.g., when the electronic device recognizes that a speech input was from John (e.g., via voice recognition)). Personal request user interface 618 of FIG. 8B includes activity notification affordance 618d with a toggle that is in the "ON" position, indicating that device 600 will receive notifications whenever a device corresponding to speaker affordances 618a-618c perform personal requests using John's user account. In some embodiments, in response to additional user inputs, device 600 shows a customized personal request configuration for John's user account, similar to those shown in FIG. 6E and FIG. 6F. In some embodiments, in response to selection of enable affordance 816a, instead of displaying personal request user interface 618 with all toggles in the "ON" position, device 600 displays personal request user interface 618 as shown in FIG. 6D, with all toggles in the "OFF" position.

Turning back to FIG. 8A, in some embodiments, instead of receiving a tap input at enable affordance 816a, device 600 detects a tap input at cancel affordance 816b and, in response, device 600 ceases display of onboarding user interface 806. After 8 hours, in FIG. 8C, device 600 redisplays on touchscreen display 602 (e.g., in response to John selection of setup notification 640c of FIG. 6V at the later time), onboarding user interface 806 for enabling personal requests on John's user account at 4:00 (e.g., PM), as shown by time indication 804b. Onboarding user interface 806 of FIG. 8C now includes different example responses (e.g., calendar response 808b; reminders response 812b; call log response 814b) from those in FIG. 8A, which are now outdated.

Now that the time is currently 4:00 PM and John's 12:00 PM dentist appointment already occurred, calendar response 808b reads, "Your next appointment is at 5:00 PM." In some embodiments, calendar response 808b is another appointment scheduled for John's user account. In some embodiments, calendar response 808b is a canned example for a calendar response if John's user account does not include additional appointments. Similarly, John completed his grocery shopping for milk, eggs, and sugar and updated his reminders application, so reminder response 812b reads, "You have one reminder for today: Pay power bill." In some embodiments, reminder response 812b is another reminder listed for John's user account. In some embodiments, reminder response 812b is a canned example for a reminder response if John's user account does not include additional reminders. As the day progresses, device 600 receives additional phone calls for John, and now, call log response 814b reads, "You have two missed calls from Grandpa Appleseed." Onboarding user interface 806 includes message request 810, "Hey Assistant, read my last message," which is unchanged from onboarding user interface 806 of FIG. 8A. In some embodiments, example personal requests and example responses include varying levels of detail (e.g., "You have a missed call from Jane at 7:45 AM;" "You have two missed calls from Grandpa Appleseed;" "You have two missed calls"). As seen in FIG. 8C, the example requests and responses can dynamically update, depending on the current personalized data associated with user John.

In some embodiments, one or more example personal requests and example responses are the same between two instances of accessing the onboarding user interface 806. In some embodiments, one or more example personal requests and example responses change between two instances of accessing the onboarding user interface 806 based on a period of time (e.g., minutes, hours, days). In some embodiments, one or more example personal requests and example responses change between two instances of accessing the onboarding user interface 806 based on user data (e.g., completion of a reminder; received calls; received messages).

In addition to dynamically changing over time and based on user data for a particular user, onboarding user interface 806 can vary between different users, based on their different personalized data. In FIG. 8D, device 800 (e.g., Jane's phone) displays, on touchscreen display 802, onboarding user interface 806 for enabling personal requests on Jane's user account at 4:00 (e.g., PM), as shown by time indication 804b. Onboarding user interface 806 of FIG. 8D includes example personal requests (e.g., message request 810), example responses (e.g., calendar response 808c; reminders response 812c; call log response 814c), enable affordance 816a, and cancel affordance 816b. Message request 810 is unchanged between onboarding user interface 806 for Jane's user account and onboarding user interface 806 of FIGS. 8A and 8C for John's user account. In some embodiments, example personal requests or example responses are the same between different users. Calendar response 808c, reminders response 812c, call log response 814c corresponding to Jane's user account are all different from those shown in FIGS. 8A and 8C for John's user account.

FIG. 9 is a flow diagram illustrating a method for configuring management of user requests for specific operations using an electronic device in accordance with some embodiments. Method 900 is performed at a device (e.g., 100, 300, 500, 600) with a display generation component (e.g., 602). Some operations in method 900 are, optionally, combined, the orders of some operations are, optionally, changed, and some operations are, optionally, omitted.

In some embodiments, the electronic device (e.g., 600) is a computer system. The computer system is optionally in communication (e.g., wired communication, wireless communication) with a display generation component and with one or more input devices. The display generation component is configured to provide visual output, such as display via a CRT display, display via an LED display, or display via image projection. In some embodiments, the display generation component is integrated with the computer system. In some embodiments, the display generation component is separate from the computer system. The one or more input devices are configured to receive input, such as a touch-sensitive surface receiving user input. In some embodiments, the one or more input devices are integrated with the computer system. In some embodiments, the one or more input devices are separate from the computer system. Thus, the computer system can transmit, via a wired or wireless connection, data (e.g., image data or video data) to an integrated or external display generation component to visually produce the content (e.g., using a display device) and can receive, a wired or wireless connection, input from the one or more input devices.

As described below, method 900 provides an intuitive way for configuring management of user requests for specific operations. The method reduces the cognitive burden on a user for configuring management of user requests for specific operations, thereby creating a more efficient human-machine interface. For battery-operated computing devices, enabling a user to configure management of user requests for specific operations faster and more efficiently conserves power and increases the time between battery charges.

The computer system (e.g., 600) displays (902), via the display generation component (e.g., 602), a first configuration user interface (e.g., 806) associated with a process for configuring data request operations (e.g., a request to perform a specific type of operation (e.g., a request to output personal data (e.g., a request for content (e.g., media; voicemail; messages; events; to-do items/lists) associated with one or more specific users (e.g., an auto-generated playlist of a user's most played songs; a user-generated playlist; serialized media (e.g., an audiobook, a podcast series); media that varies depending on the identity of the user) for a respective user (e.g., John Appleseed), wherein the first configuration user interface includes a set of one or more indications (e.g., 808a, 810, 812a, 814a) (e.g., indications of exemplary operation request inputs that can be made; indications of exemplary outputs that are provided in response to data request operations; graphical and/or textual indications), personalized for the respective user, that includes a first indication (e.g., 808b, 808c), wherein: in accordance (904) with a determination that the respective user is a first user (e.g., John Appleseed) (e.g., a user associated with a first user account that corresponds to a first set of user-specific data), the first indication includes a representation (e.g., 808b) (e.g., a graphical representation; a textual representation) of first data (e.g., data corresponding to an upcoming calendar appointment for the first user (e.g., "Team dinner at 6:00 PM"); recent call log; recently received messages; outstanding reminders (e.g., "Pick up dry cleaning")) that is associated with the first user; and in accordance (906) with a determination that the respective user is a second user (e.g., Jane Appleseed) (e.g., a user associated with a second user account, different from the first user account, that corresponds to a second set of user-specific data), different from the first user, the first indication includes a representation (e.g., 808c) of second data, different from the first data, that is associated with the second user (e.g., and that is not associated with the first user). In some embodiments, in accordance with the respective user being a second user, the first indication (in some embodiments, the first configuration user interface as a whole) does not include the representation of the first data. Providing the user with personalized/customized indications provides the user with feedback as to what data the system has access to and what requests can be made to the system and/or what responses can result and also promotes further user-system interactions. These personalized examples can alert the user to the private information that may be shared by the computer system. By viewing personal examples of real information that may be shared, the user can make an informed decision about whether the user wants to share the personal information or protect the information from being disclosed by the system. This process therefore allows the user to maintain privacy and gives the user more control over personal information. Providing improved feedback and promoting further interactions enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the representation of the first data is: in accordance with a determination that the first configuration user interface is displayed at a first time (e.g., 8 AM as seen in FIG. 8A) (e.g., initially displayed at the first time; displayed in response to a request received at the first time), a representation of data (e.g., 808a) associated with the first user that is relevant (e.g., based on the first time; determined and/or identified using the first time) to the first time (e.g., an upcoming (e.g., next) appointment that is closest in time to the first time); and in accordance with a determination that the first configuration user interface is displayed at a second time (e.g., 4 PM), different than the first time (e.g. later than the first time (e.g., 6 PM with the first time being 3 PM), a representation of data (e.g., 808b) associated with the first user that is relevant to the second time (e.g., that is not relevant to the first time) (in some embodiments, without displaying the representation of data associated with the first user that is relevant to the first time), wherein the representation of data associated with the first user that is relevant to the first time is different than the representation of data associated with the first user that is relevant to the second time. In some embodiments, the first configuration user interface includes different indications for a user, depending on the time at which the interface is displayed. Providing the user with time-relevant indications provides the user with feedback as to the current time and as to what data the system has access to at the current time and also promotes further user-system interactions. Providing improved feedback and promoting further interactions enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the representation of the first data includes: in accordance with a determination that the first user is associated with a first set of personalized data (e.g., media; voicemails; messages; calendar events; to-do items/lists) that includes third data (e.g., data corresponding to 808a) (e.g., a first calendar event), a representation of the third data (e.g., 808a); and in accordance with a determination that the first user is associated with a second set of personalized data (e.g., data corresponding to 808b) that is different than the first set of personalized data and that includes fourth data (e.g., a second calendar event, different from the first calendar event) (in some embodiments, the second set of personalized data does not include the third data), a representation of the fourth data (e.g., 808b). In some embodiments, the first configuration user interface includes different indications for a user, depending on the personalized data associated with that user. Providing the user with indications that are personalized to the user's current data set provides the user with feedback as to what data the system has access to and also promotes further user-system interactions. Providing improved feedback and promoting further interactions enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first indication corresponds to a first category of indications (e.g., 808a (calendar events) (e.g., indications corresponding to calendar events); and the set of one or more indications includes a second indication (e.g., 812a (reminders)), corresponding to a second category of indications, different from the first category of indications (e.g., indications corresponding to reminders), that: in accordance with a determination that the respective user is associated with personalized data of the second category, includes a representation of fifth data (e.g., 812a) that is associated with the respective user (e.g., that is specific to the respective user; that is identified from a set of personalized data associated with the respective user); and in accordance with a determination that the respective user is not associated with personalized data of the second category (e.g., the respective user does not have reminders), includes a representation of sixth data that is not associated with the respective user (e.g., is not specific to the respective user; is common to multiple/all users; is a generic indication that is displayed for any user that does not have personalized data of the second category).

In some embodiments, the first indication is a representation of a request for output (e.g., 810) of personalized data associated with the respective user that can be provided to (e.g., provided as an input to) a second computer system (e.g., a computer system in communication with the computer system). In some embodiments, the first indication is a representation of an output that is provided in response to a request for output of personalized data associated with the respective user that can provided to a second computer system. Providing the user with indications of types of requests that can be made provides the user with feedback as to what requests the system can process and also promotes further user-system interactions. Providing improved feedback and promoting further interactions enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 900 (e.g., FIG. 9) are also applicable in an analogous manner to the methods described above. For example, method 900 optionally includes one or more of the characteristics of the various methods described above with reference to method 700. For example, Prior to handling requests according to method 700, a device can be configured to handle requests using method 900. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the handling of user requests for specific operations. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve the handling of user requests for specific operations. Accordingly, use of such personal information data enables users to have calculated control of the handling of user requests for specific operations. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of handling of user requests for specific operations, the present technology can be configured to allow users to select to "opt in" or "opt out" of participation in the collection of personal information data during registration for services or anytime thereafter. In another example, users can select not to provide notification-preference data for targeted content delivery services. In yet another example, users can select to limit the length of time notification-preference data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content (e.g., notifications) can be selected and delivered to users by inferring preferences based on non-personal information data or a bare minimum amount of personal information, such as the content being requested by the device associated with a user, other non-personal information available to the notification delivery services, or publicly available information.

What is claimed is:

1. A computer system configured to be in communication with one or more input devices, one or more output devices, and a first external electronic device, comprising:
   one or more processors;
   memory storing one or more programs configured to be executed by the one or more processors, the one or more programs including instructions for:
      receiving, via the one or more input devices, a first request to perform a respective operation; and
      in response to receiving the first request:
         in accordance with a determination that the first request is a request to access first content associated with a first user account associated with the computer system, and a determination that a first set of notification criteria are met and a first set of request criteria are met, wherein the first set of request criteria includes a first criterion that is met when the computer system is enabled to output content associated with a respective user account:
            performing a first operation including outputting a first representation of data that includes the first content associated with the first user account via a first output device of the one or more output devices; and
            initiating a process to display a notification on the first external electronic device, wherein the notification includes an indication that the respective operation was performed;
         in accordance with a determination that the first request is a request to access second content associated with a second user account associated with the computer system, and a determination that the first set of notification criteria are met and the first set of request criteria are met:

performing a second operation including outputting a second representation of data that includes the second content associated with the second user account via the first output device of the one or more output devices; and
initiating the process to display the notification;
in accordance with a determination that the first request is the request to access first content associated with the first user account associated with the computer system, and a determination that a first set of notification criteria are met and the first set of request criteria are not met:
performing a third operation including outputting a third representation of data that does not include the first content associated with the first user account via a first output device of the one or more output devices; and
initiating a process to display a notification on the first external electronic device; and
in accordance with a determination that the first request is a request to access third content, different from the first content and the second content, that is not associated with the first user account or the second user account associated with the computer system, performing a fourth operation, different from the first operation and the second operation, including outputting the third content via the same first output device without initiating the process to display the notification, wherein performing the third operation includes outputting a representation of the third content that is non-variable for different users associated with the request.

2. The computer system of claim 1, wherein the first content associated with the first user account is selected from a group consisting of an email associated with the first user account, a text message associated with the first user account, a voicemail associated with the first user account, a calendar event associated with the first user account, media associated with the first user account, a reminder associated with the first user account, and a combination thereof.

3. The computer system of claim 1, wherein:
the process to display the notification is a process for displaying the notification on the first external electronic device; and
the first set of notification criteria includes a criterion that is met when a first notification setting associated with the first external electronic device is enabled.

4. The computer system of claim 3, wherein the first notification setting affects whether a plurality of computer systems initiate a process to display a notification on the first external electronic device in response to receiving requests to access respective content associated with the first user account associated with the computer system, wherein the plurality of computer systems includes the computer system.

5. The computer system of claim 3, wherein the first notification setting was enabled via a user input received at the first external electronic device.

6. The computer system of claim 1, wherein:
the process to display the notification is a process for displaying the notification on the first external electronic device; and
the first external electronic device is configured to:
in accordance with a determination that a first set of notification-handling criteria are met, wherein the first set of notification-handling criteria includes a criterion that is met when a first previous notification corresponding to the computer system is currently available for display, configure the notification for display in a group with the first previous notification; and
in accordance with a determination that a second set of notification-handling criteria are met, wherein the second set of notification-handling criteria includes a criterion that is met when a second previous notification corresponding to a second computer system, different than the computer system, is currently available for display, configure the notification to be displayed separately from the second previous notification.

7. The computer system of claim 1, wherein:
the process to display the notification is a process for displaying the notification on the first external electronic device; and
the first external electronic device is configured to:
display the notification on a display of the first external electronic device;
receive, via an input device of the first external electronic device, a set of one or more inputs that includes an input corresponding to the notification; and
in response to receiving the set of one or more inputs that includes an input corresponding to the notification, display a configuration user interface that includes a first selectable user interface object that, when selected, modifies a setting that affects processing of requests to access respective content associated with the first user account associated with the computer system.

8. The computer system of claim 7, wherein:
the process to display the notification is a process for displaying the notification on the first external electronic device; and
the first external electronic device is configured to display the notification as a grouped notification that corresponds to the notification and one or more additional notifications that correspond to one or more additional requests to perform operations of a first type that were received by the computer system.

9. The computer system of claim 1, wherein:
the process to display the notification is a process for displaying the notification on the first external electronic device; and
the notification, when displayed at the first external electronic device, includes an indication that identifies one or more characteristics of the respective operation.

10. The computer system of claim 1, the one or more programs further including instructions for:
in response to receiving the first request and in accordance with the determination that the first request is the request to access the first content associated with the first user account associated with the computer system:
in accordance with a determination that a first set of authorization criteria are not met:
forgoing performing the first operation; and
outputting an indication of one or more steps that can be taken to satisfy the first set of authorization criteria for subsequent requests to access respective content associated with the first user account associated with the computer system.

11. A non-transitory computer-readable storage medium storing one or more programs configured to be executed by one or more processors of a computer system that is in communication with one or more input devices, one or more output devices, and a first external electronic device, the one or more programs including instructions for:

receiving, via the one or more input devices, a first request to perform a respective operation; and in response to receiving the first request:

in accordance with a determination that the first request is a request to access first content associated with a first user account associated with the computer system, and a determination that a first set of notification criteria are met and a first set of request criteria are met, wherein the first set of request criteria includes a first criterion that is met when the computer system is enabled to output content associated with a respective user account:

performing a first operation including outputting a first representation of data that includes the first content associated with the first user account via a first output device of the one or more output devices; and initiating a process to display a notification on the first external electronic device, wherein the notification includes an indication that the respective operation was performed;

in accordance with a determination that the first request is a request to access second content associated with a second user account associated with the computer system, and a determination that the first set of notification criteria are met and the first set of request criteria are met:

performing a second operation including outputting a second representation of data that includes the second content associated with the second user account via the first output device of the one or more output devices; and initiating the process to display the notification;

in accordance with a determination that the first request is the request to access first content associated with the first user account associated with the computer system, and a determination that a first set of notification criteria are met and the first set of request criteria are not met:

performing a third operation including outputting a third representation of data that does not include the first content associated with the first user account via a first output device of the one or more output devices; and initiating a process to display a notification on the first external electronic device; and in accordance with a determination that the first request is a request to access third content, different from the first content and the second content, that is not associated with the first user account or the second user account associated with the computer system, performing a fourth operation, different from the first operation and the second operation, including outputting the third content via the same first output device without initiating the process to display the notification, wherein performing the third operation includes outputting a representation of the third content that is non-variable for different users associated with the request.

12. The non-transitory computer-readable storage medium of claim 11, wherein the first content associated with the first user account is selected from a group consisting of an email associated with the first user account, a text message associated with the first user account, a voicemail associated with the first user account, a calendar event associated with the first user account, media associated with the first user account, a reminder associated with the first user account, and a combination thereof.

13. The non-transitory computer-readable storage medium of claim 11, wherein:

the process to display the notification is a process for displaying the notification on the first external electronic device; and the first set of notification criteria includes a criterion that is met when a first notification setting associated with the first external electronic device is enabled.

14. The non-transitory computer-readable storage medium of claim 13, wherein the first notification setting affects whether a plurality of computer systems initiate a process to display a notification on the first external electronic device in response to receiving requests to access respective content associated with the first user account associated with the computer system, wherein the plurality of computer systems includes the computer system.

15. The non-transitory computer-readable storage medium of claim 13, wherein the first notification setting was enabled via a user input received at the first external electronic device.

16. The non-transitory computer-readable storage medium of claim 11, wherein:

the process to display the notification is a process for displaying the notification on the first external electronic device; and the first external electronic device is configured to:

in accordance with a determination that a first set of notification-handling criteria are met, wherein the first set of notification-handling criteria includes a criterion that is met when a first previous notification corresponding to the computer system is currently available for display, configure the notification for display in a group with the first previous notification; and in accordance with a determination that a second set of notification-handling criteria are met, wherein the second set of notification-handling criteria includes a criterion that is met when a second previous notification corresponding to a second computer system, different than the computer system, is currently available for display, configure the notification to be displayed separately from the second previous notification.

17. The non-transitory computer-readable storage medium of claim 11, wherein:

the process to display the notification is a process for displaying the notification on the first external electronic device; and the first external electronic device is configured to:

display the notification on a display of the first external electronic device;

receive, via an input device of the first external electronic device, a set of one or more inputs that includes an input corresponding to the notification; and in response to receiving the set of one or more inputs that includes an input corresponding to the notification, display a configuration user interface that includes a first selectable user interface object that, when selected, modifies a setting that affects processing of requests to access respective content associated with the first user account associated with the computer system.

18. The non-transitory computer-readable storage medium of claim 17, wherein:
- the process to display the notification is a process for displaying the notification on the first external electronic device; and
- the first external electronic device is configured to display the notification as a grouped notification that corresponds to the notification and one or more additional notifications that correspond to one or more additional requests to perform operations of a first type that were received by the computer system.

19. The non-transitory computer-readable storage medium of claim 11, wherein:
- the process to display the notification is a process for displaying the notification on the first external electronic device; and
- the notification, when displayed at the first external electronic device, includes an indication that identifies one or more characteristics of respective first operation.

20. The non-transitory computer-readable storage medium of claim 11, the one or more programs further including instructions for:
- in response to receiving the first request and in accordance with the determination that the first request is the request to access the first content associated with the first user account associated with the computer system:
- in accordance with a determination that a first set of authorization criteria are not met:
  - forgoing performing the first operation; and
  - outputting an indication of one or more steps that can be taken to satisfy the first set of authorization criteria for subsequent requests to access respective content associated with the first user account associated with the computer system.

21. A method comprising:
at a computer system that is in communication with one or more input devices, one or more output devices, and a first external electronic device:
- receiving, via the one or more input devices, a first request to perform a respective operation; and
- in response to receiving the first request:
  - in accordance with a determination that the first request is a request to access first content associated with a first user account associated with the computer system, and a determination that a first set of notification criteria are met and a first set of request criteria are met, wherein the first set of request criteria includes a first criterion that is met when the computer system is enabled to output content associated with a respective user account:
    - performing a first operation including outputting a first representation of data that includes the first content associated with the first user account via a first output device of the one or more output devices; and
    - initiating a process to display a notification on the first external electronic device, wherein the notification includes an indication that the respective operation was performed;
  - in accordance with a determination that the first request is a request to access second content associated with a second user account associated with the computer system, and a determination that the first set of notification criteria are met and the first set of request criteria are met:
    - performing a second operation including outputting a second representation of data that includes the second content associated with the second user account via the first output device of the one or more output devices; and
    - initiating the process to display the notification;
  - in accordance with a determination that the first request is the request to access first content associated with the first user account associated with the computer system, and a determination that a first set of notification criteria are met and the first set of request criteria are not met:
    - performing a third operation including outputting a third representation of data that does not include the first content associated with the first user account via a first output device of the one or more output devices; and
    - initiating a process to display a notification on the first external electronic device; and
  - in accordance with a determination that the first request is a request to access third content, different from the first content and the second content, that is not associated with the first user account or the second user account associated with the computer system, performing a fourth operation, different from the first operation and the second operation, including outputting the third content via the same first output device without initiating the process to display the notification, wherein performing the third operation includes outputting a representation of the third content that is non-variable for different users associated with the request.

22. The method of claim 21, wherein the first content associated with the first user account is selected from a group consisting of an email associated with the first user account, a text message associated with the first user account, a voicemail associated with the first user account, a calendar event associated with the first user account, media associated with the first user account, a reminder associated with the first user account, and a combination thereof.

23. The method of claim 21, wherein:
- the process to display the notification is a process for displaying the notification on the first external electronic device; and
- the first set of notification criteria includes a criterion that is met when a first notification setting associated with the first external electronic device is enabled.

24. The method of claim 23, wherein the first notification setting affects whether a plurality of computer systems initiate a process to display a notification on the first external electronic device in response to receiving requests to access respective content associated with the first user account associated with the computer system, wherein the plurality of computer systems includes the computer system.

25. The method of claim 23, wherein the first notification setting was enabled via a user input received at the first external electronic device.

26. The method of claim 21, wherein:
- the process to display the notification is a process for displaying the notification on the first external electronic device; and
- the first external electronic device is configured to:
  - in accordance with a determination that a first set of notification-handling criteria are met, wherein the first set of notification-handling criteria includes a criterion that is met when a first previous notification corresponding to the computer system is currently available for display, configure the notification for display in a group with the first previous notification; and in accordance with a determination that a second set of notification-handling criteria are met, wherein the second set of notification-handling criteria includes a criterion that is met when a second previous notification corresponding to a second computer system, different than the computer system, is currently available for display, configure the notification to be displayed separately from the second previous notification.

27. The method of claim 21, wherein:

the process to display the notification is a process for displaying the notification on the first external electronic device; and the first external electronic device is configured to:
 display the notification on a display of the first external electronic device;
 receive, via an input device of the first external electronic device, a set of one or more inputs that includes an input corresponding to the notification; and
 in response to receiving the set of one or more inputs that includes an input corresponding to the notification, display a configuration user interface that includes a first selectable user interface object that, when selected, modifies a setting that affects processing of requests to access respective content associated with the first user account associated with the computer system.

28. The method of claim 27, wherein:

the process to display the notification is a process for displaying the notification on the first external electronic device; and the first external electronic device is configured to display the notification as a grouped notification that corresponds to the notification and one or more additional notifications that correspond to one or more additional requests to perform operations of a first type that were received by the computer system.

29. The method of claim 21, wherein:

the process to display the notification is a process for displaying the notification on the first external electronic device; and the notification, when displayed at the first external electronic device, includes an indication that identifies one or more characteristics of the respective operation.

30. The method of claim 21, further comprising:

in response to receiving the first request and in accordance with the determination that the first request is the request to access the first content associated with the first user account associated with the computer system:
 in accordance with a determination that a first set of authorization criteria are not met:
  forgoing performing the first operation; and
  outputting an indication of one or more steps that can be taken to satisfy the first set of authorization criteria for subsequent requests to access respective content associated with the first user account associated with the computer system.

\* \* \* \* \*